FIRE ALARM SIGNAL STATION BOX

Filed Oct. 30, 1950 12 Sheets-Sheet 1

INVENTORS
LEO L. VERKUIL
JAMES E. RUSSO
BY
William T Kniesner
ATTORNEY

INVENTORS
LEO L. VERKUIL
JAMES E. RUSSO
BY William T. Kuesner
ATTORNEY

April 29, 1952 L. L. VERKUIL ET AL 2,594,369

FIRE ALARM SIGNAL STATION BOX

Filed Oct. 30, 1950 12 Sheets-Sheet 3

INVENTORS
LEO L. VERKUIL
JAMES E. RUSSO

BY William T Kresna

ATTORNEY

INVENTORS
LEO L. VERKUIL
JAMES E. RUSSO
BY
William T. Kriener
ATTORNEY

FIRE ALARM SIGNAL STATION BOX

Filed Oct. 30, 1950

INVENTORS
LEO L. VERKUIL
JAMES E. RUSSO
BY William T. Kriesman
ATTORNEY

FIRE ALARM SIGNAL STATION BOX

Filed Oct. 30, 1950 12 Sheets-Sheet 6

INVENTORS
LEO L. VERKUIL
JAMES E. RUSSO
BY William T Kuesena
ATTORNEY

FIRE ALARM SIGNAL STATION BOX

INVENTORS
LEO L. VERKUIL
JAMES E. RUSSO
BY William T Kruesner
ATTORNEY

April 29, 1952 L. L. VERKUIL ET AL 2,594,369

FIRE ALARM SIGNAL STATION BOX

Filed Oct. 30, 1950 12 Sheets-Sheet 8

INVENTORS
LEO L. VERKUIL
JAMES E. RUSSO

BY William T Kruesner

ATTORNEY

FIRE ALARM SIGNAL STATION BOX

Filed Oct. 30, 1950 12 Sheets-Sheet 9

INVENTORS
LEO L. VERKUIL
JAMES E. RUSSO
BY William T Kuresner
ATTORNEY

INVENTORS
LEO L. VERKUIL
JAMES E. RUSSO
BY William T. Kraemer
ATTORNEY

April 29, 1952 L. L. VERKUIL ET AL 2,594,369

FIRE ALARM SIGNAL STATION BOX

Filed Oct. 30, 1950 12 Sheets-Sheet 11

INVENTORS
LEO L. VERKUIL
JAMES E. RUSSO

BY William T. Kriesner

ATTORNEY

INVENTORS
LEO L. VERKUIL
JAMES E. RUSSO
BY William T. Kniener
ATTORNEY

Patented Apr. 29, 1952

2,594,369

UNITED STATES PATENT OFFICE 2,594,369

FIRE ALARM SIGNAL STATION BOX

Leo L. Verkuil and James E. Russo, Norwalk, Conn., assignors to Edwards Company, Inc., Norwalk, Conn., a corporation of New York Application October 30, 1950, Serial No. 192,977

80 Claims. (Cl. 177—377)

This invention relates to fire alarm signalling apparatus or call stations.

One of the objects of this invention is to provide a compact, dependable, and easily operable manually-controlled fire alarm signalling station, mechanism, and installation. Another object is to provide a station of the above-mentioned character so constructed as to facilitate manufacture and assembly, and also of installation, particularly where the physical conditions for installation may differ or vary. Another object is to provide a fire alarm signalling apparatus so constructed and so capable of assembly or modification that a wide variety of the requirements of practical use may be readily met.

Another object is to provide an alarm signalling station and mechanism of the above-mentioned character in which, for such purposes as manufacture and assembly or to meet changed or subsequently arising conditions, setting of the mechanism and of its drive-controls can be quickly and dependably effected in a simple, efficient, and time-saving manner. Another object is to provide, in such apparatus, a gear train mechanism and drive-controls for it so constructed that a wide variety of possible varying conditions met with in course of manufacture or assembly can be speedily compensated for, and even as a matter of routine assembly, in a simple, reliable, and easily-practiced manner. Another object is to provide, in a mechanism or signalling station of the above-mentioned character, for facility and ease of meeting a wide range of required time-periods, and more particularly to carry out this object with a mechanism embodying a speed control of the mechanism that is simple in construction and reliable in action, while permitting facility of setting throughout a wide range, all without sacrificing compactness, dependability, and ease of access.

Another object is to provide a fire alarm signalling station and mechanism that will greatly facilitate inspection, testing, maintenance, and, where necessary, also alteration or modification to meet changing or changed requirements. Another object is to provide a fire alarm signalling station in which testing, maintenance, and inspection can be effected in a simple, practical, easily understandable, and practically foolproof manner.

Another object is to provide a fire alarm signalling station that will be simple and uncomplicated for the layman to actuate manually, not infrequently under the excitement or stress of the emergency, and that has dependable safeguards against manipulation as would fail to transmit the proper signal or as would garble a signal in course of transmission. Another object is to provide an apparatus of the above-mentioned kind which, for purposes of drill signals sounded locally, as in a school building, the layman in authority for such purposes can actuate in a simple, uncomplicated, and easily understandable way to sound only the local building alarm and at the same time minimize or avoid any risk of even inadvertently causing a central station signal to be sounded. Another object is to provide a fire alarm signalling station of the above-mentioned kind in which dependable and simple safeguards are provided against tampering.

Other objects will be in part obvious or in part pointed out hereinafter.

The invention accordingly consists in the features of construction, combinations of elements, and arrangement of parts, all as will be illustratively described herein, and the scope of the application of which will be indicated in the following claims.

In the accompanying drawings, in which are shown by way of illustration several of the various possible embodiments of this invention and in which similar reference characters refer to similar parts throughout:

Figures 1, 2, 3, 3A:
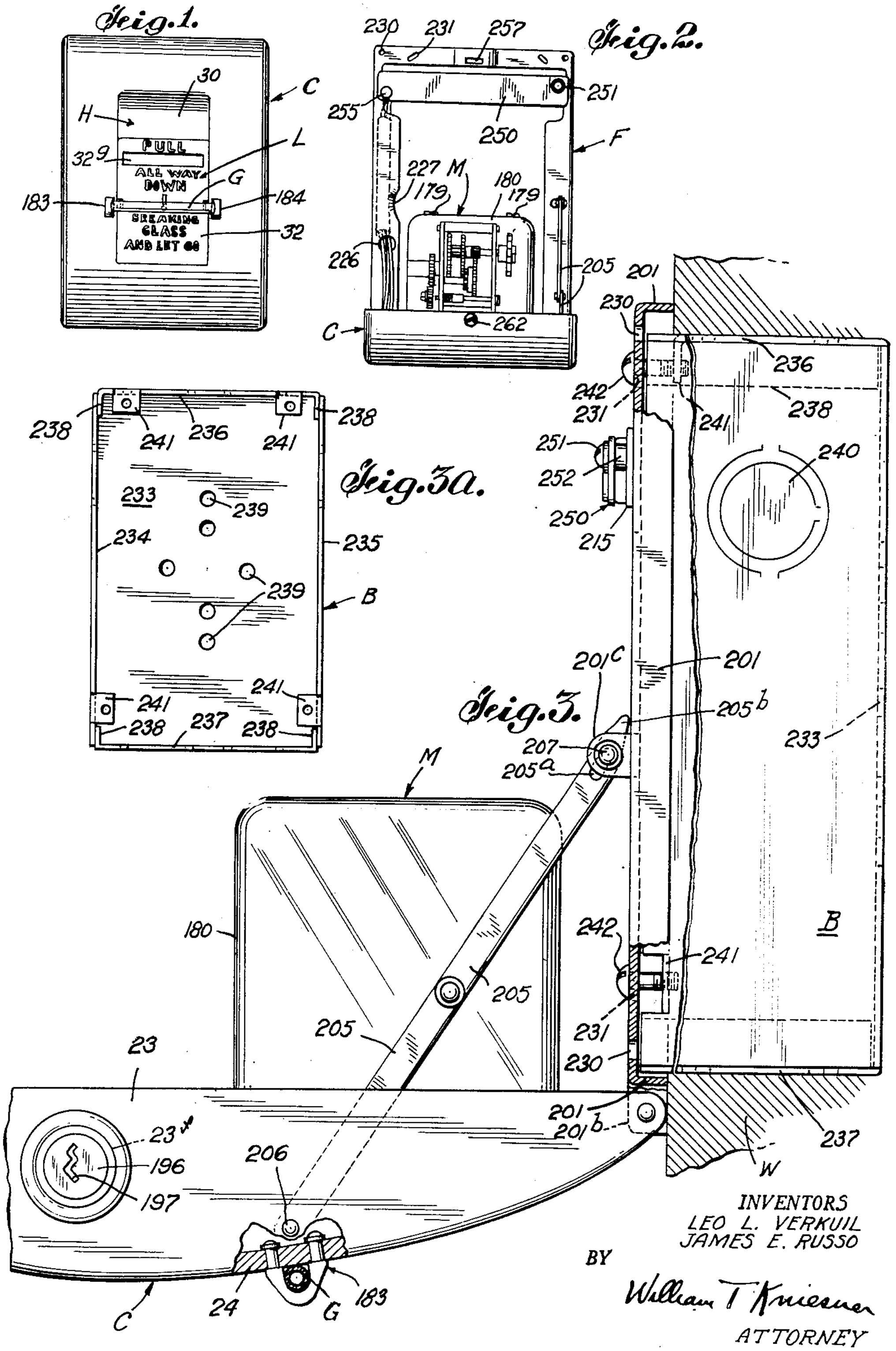
Figure 1 is a front elevation of the fire alarm box or signalling station, as it appears when installed and ready for use.
Figure 2 is a front elevation thereof as it appears when opened, as for testing, inspection, etc., certain parts being omitted.
Figure 3 is a side elevation as seen from the right in Figure 2, partly in section and partly broken away, illustrating a wall-recessed installation.
Figures 4, 4A:
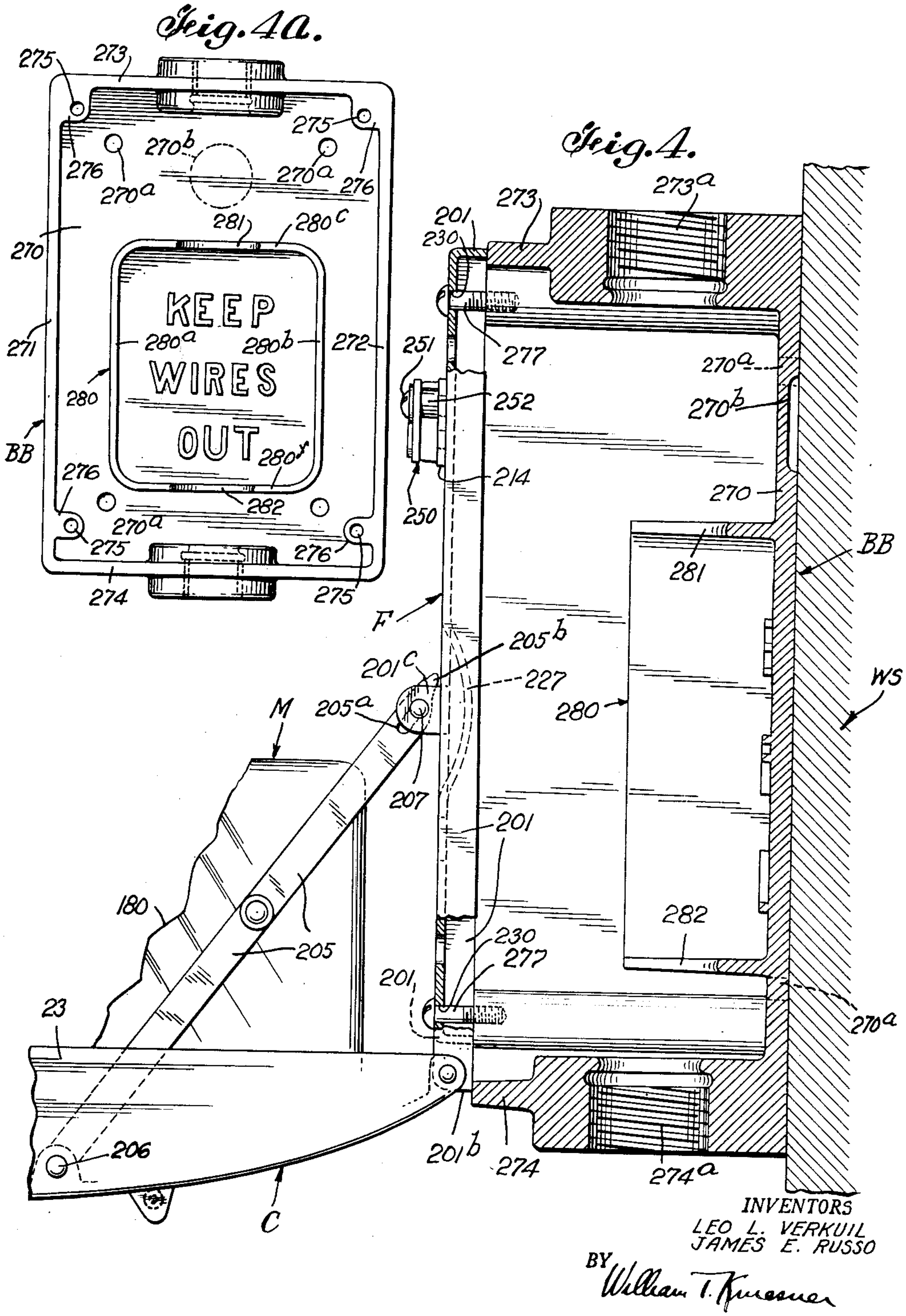
Figure 5:
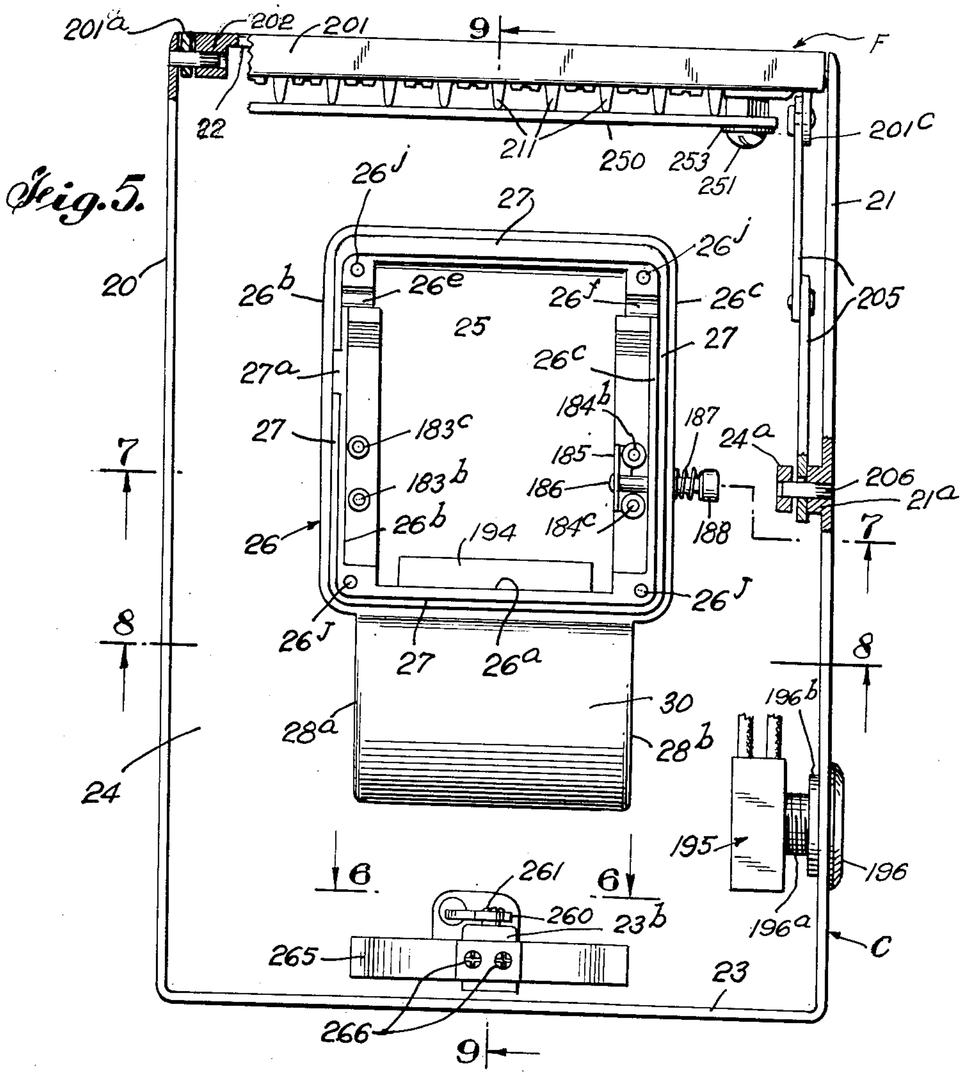
Figure 6:
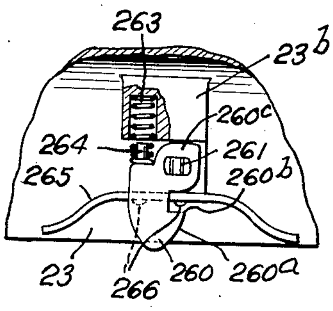
Figures 7, 7A, 7B, 8, 9:
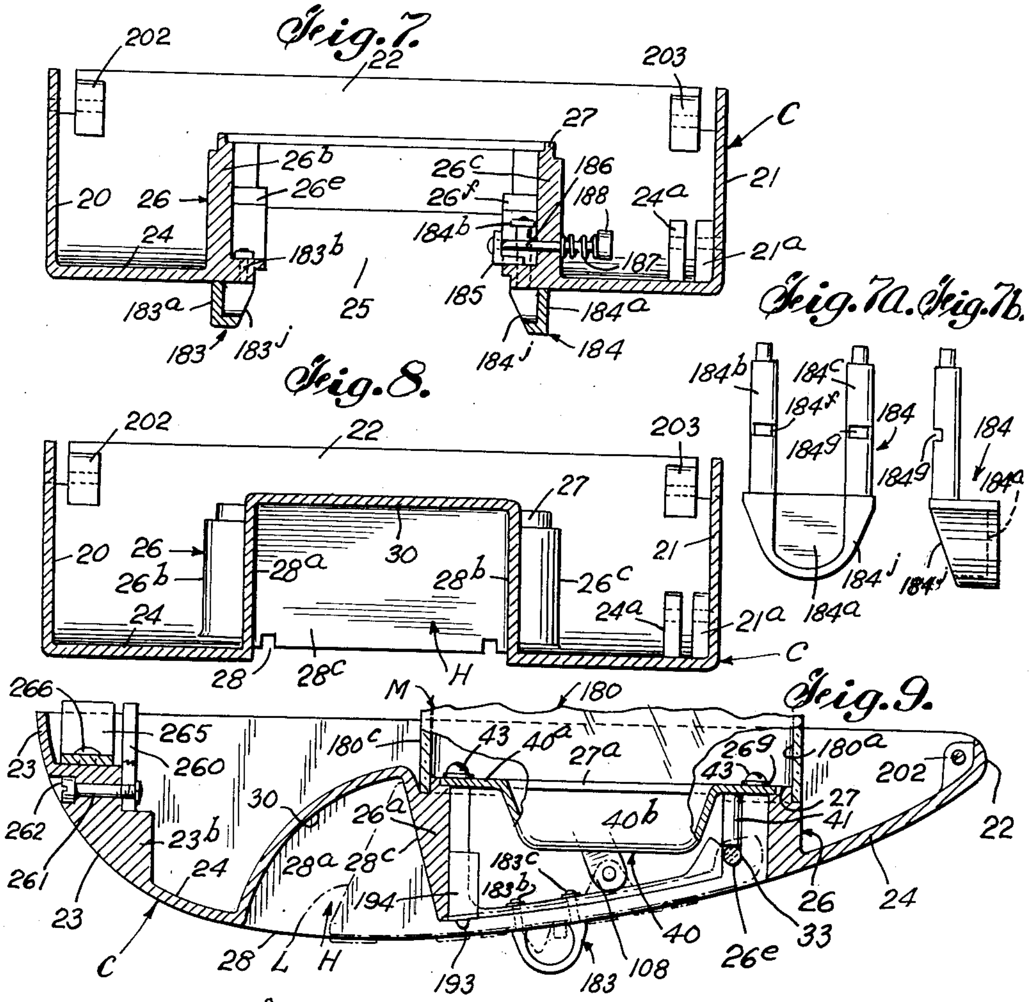
Figure 10:
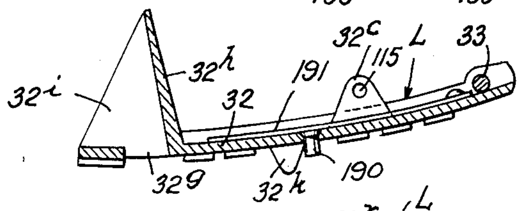
Figure 11:
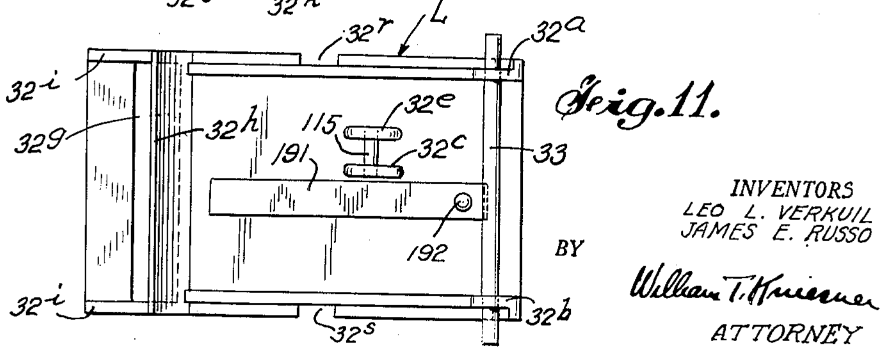
Figures 12, 13, 14:
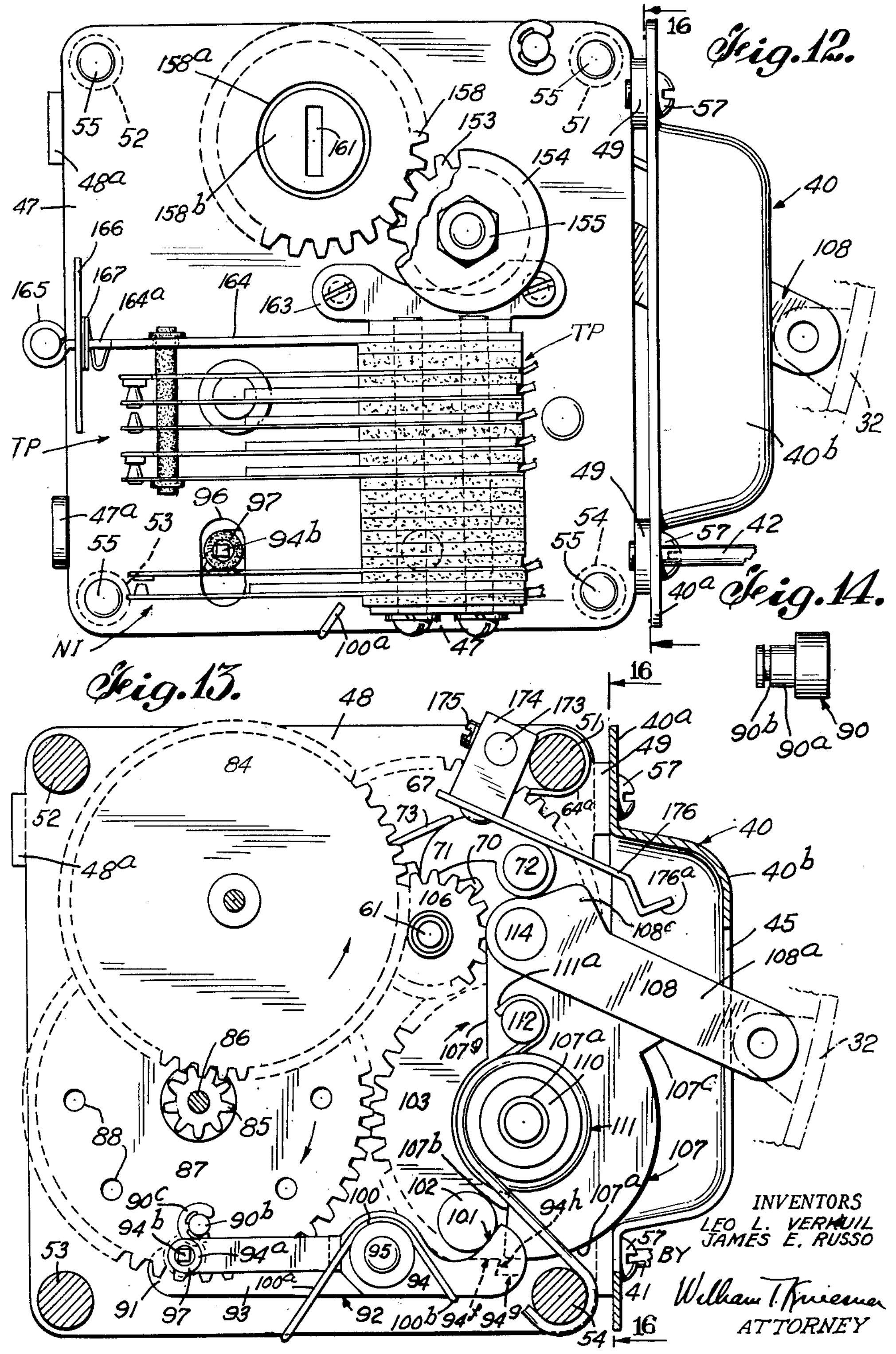
Figure 15:
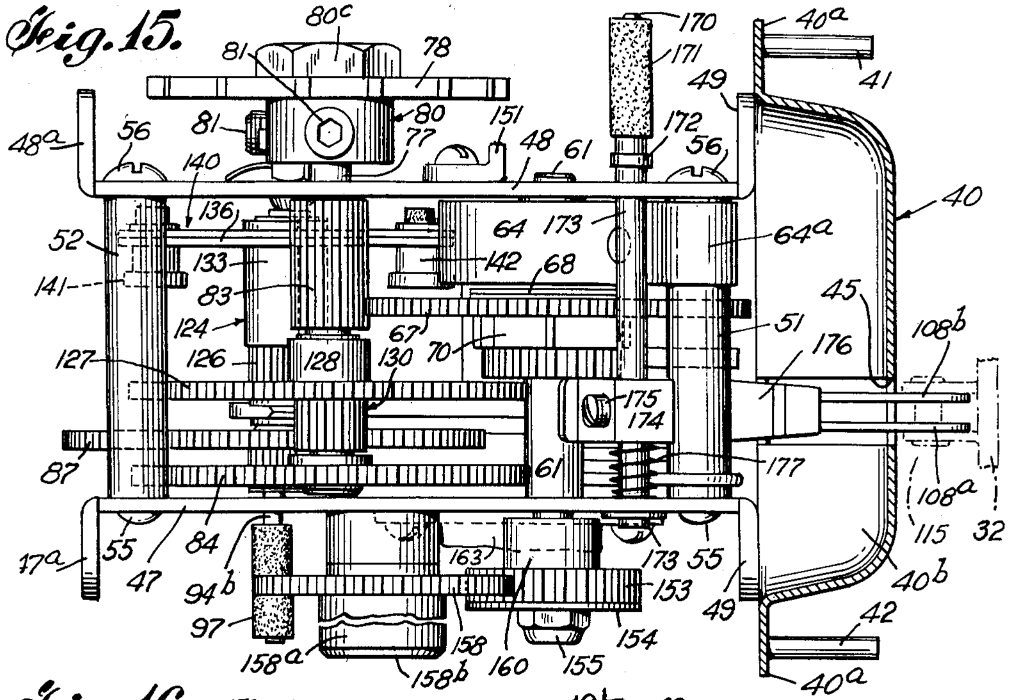
Figure 16:
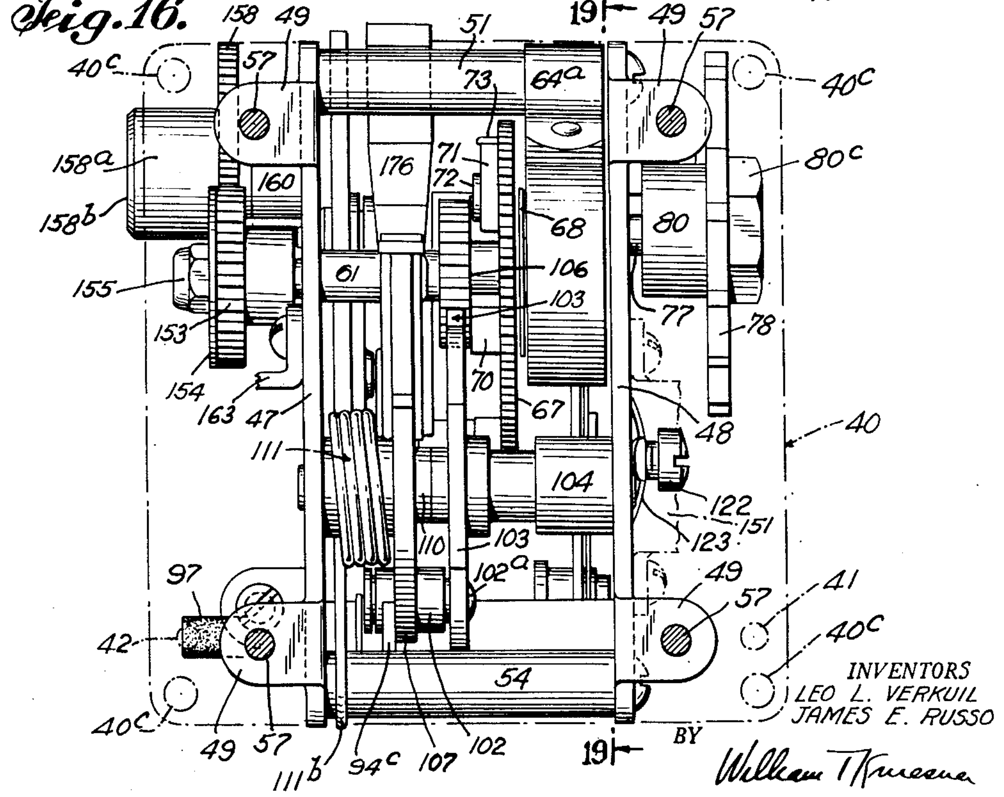
Figure 17:
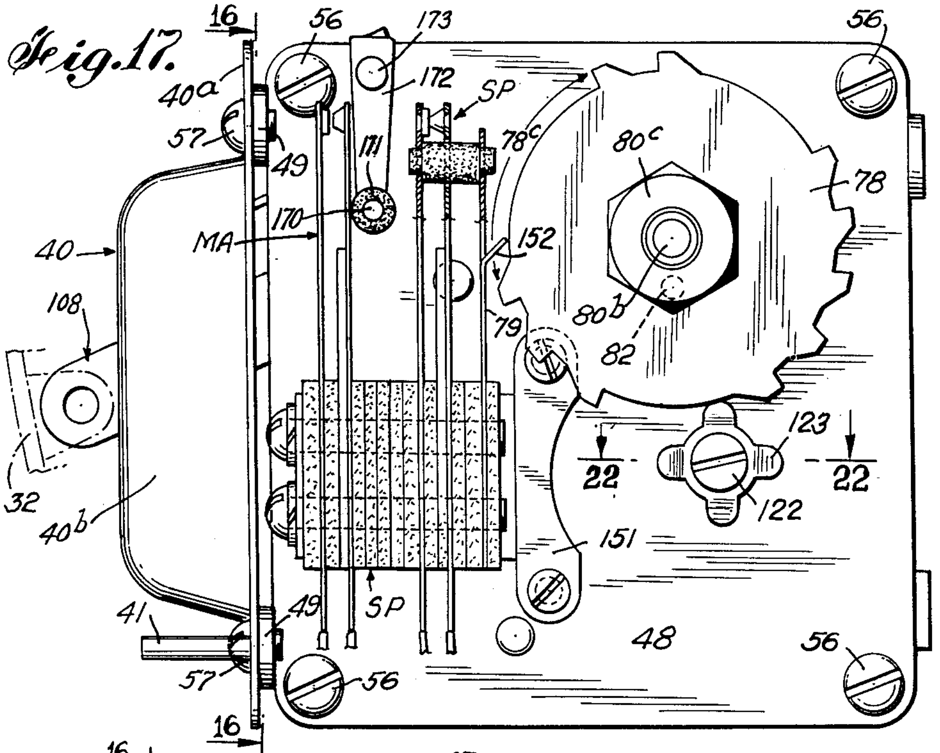
Figure 18:
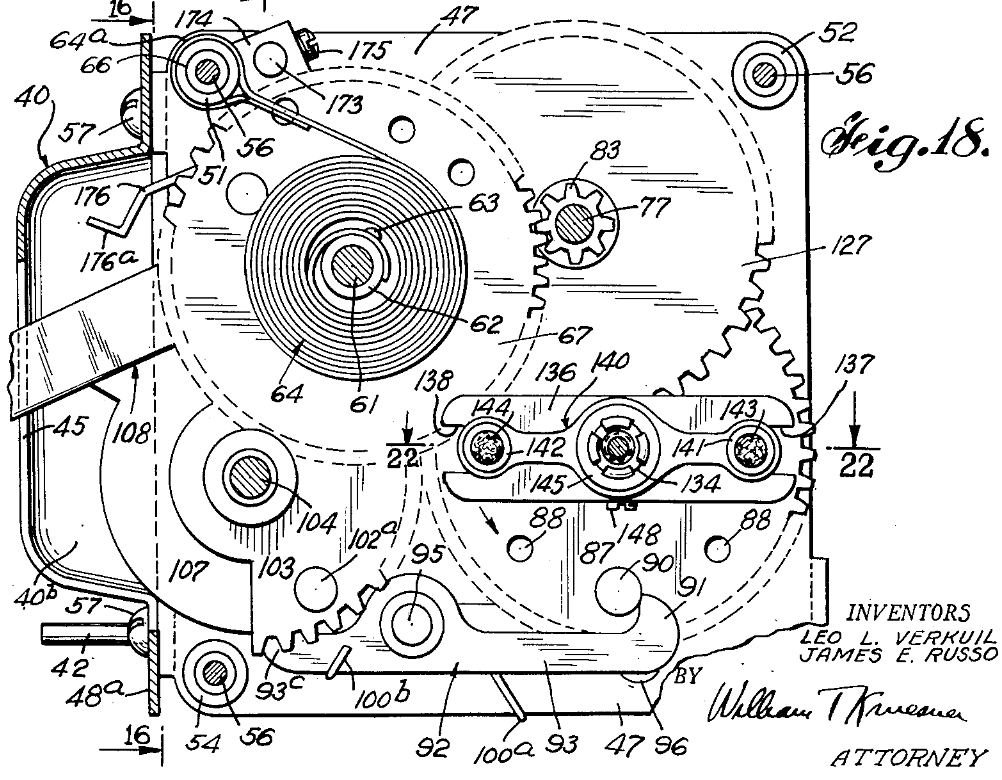
Figure 19:
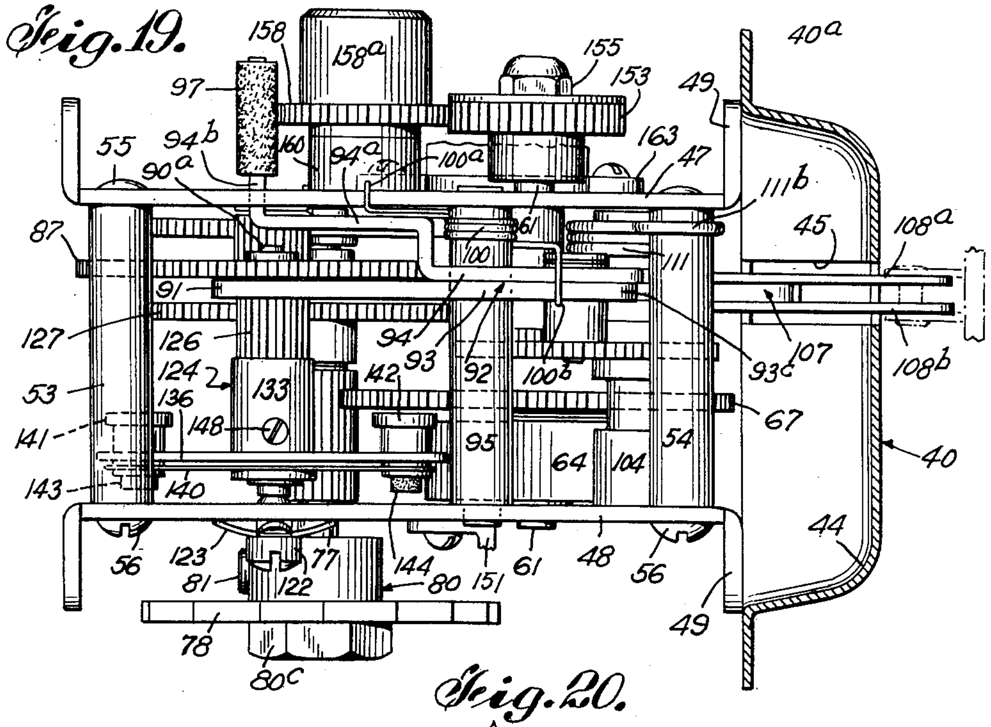
Figure 20:
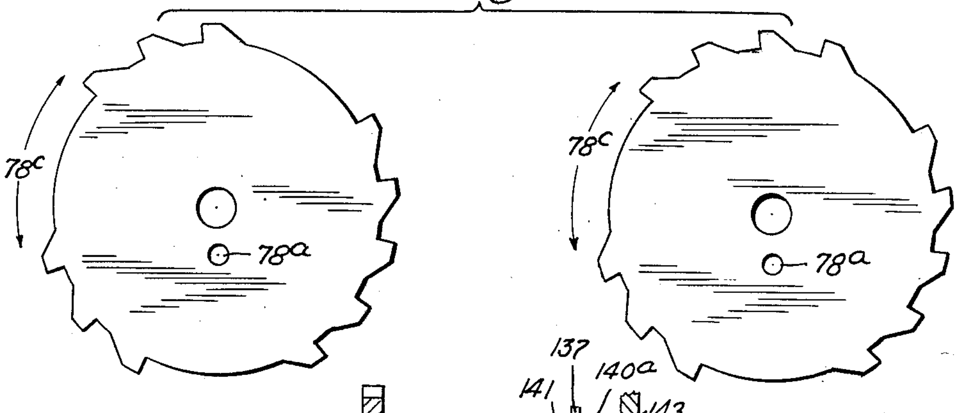
Figure 21:
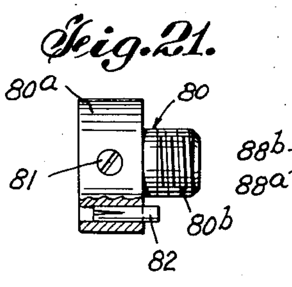
Figure 22:
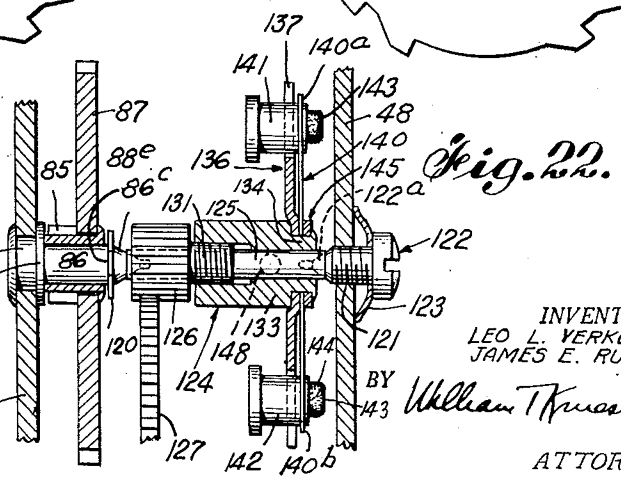
Figure 24:
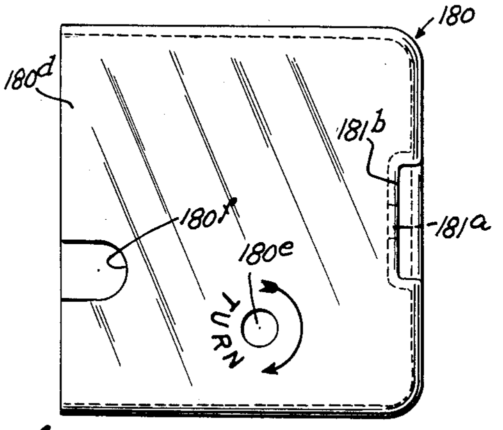
Figure 23:
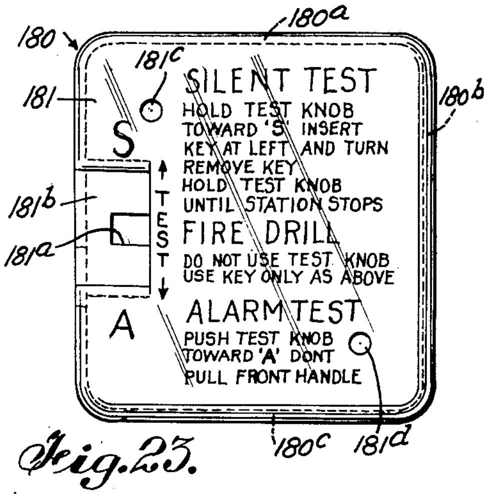
Figures 25, 26:
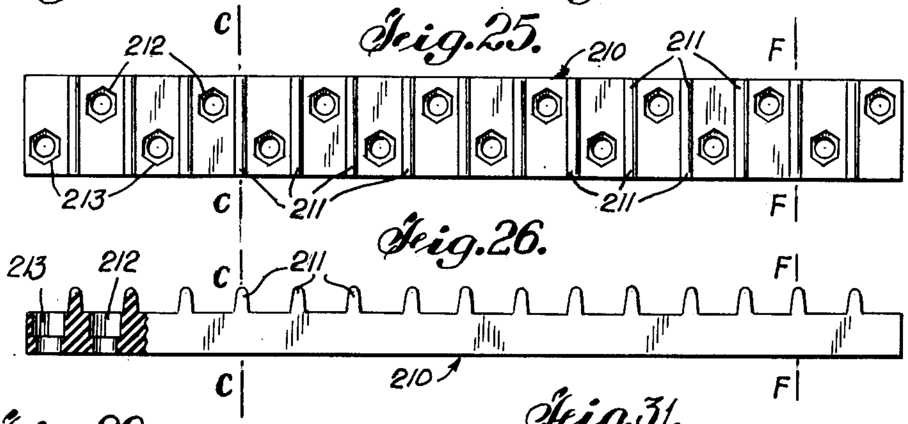
Figures 29, 30, 31, 32:
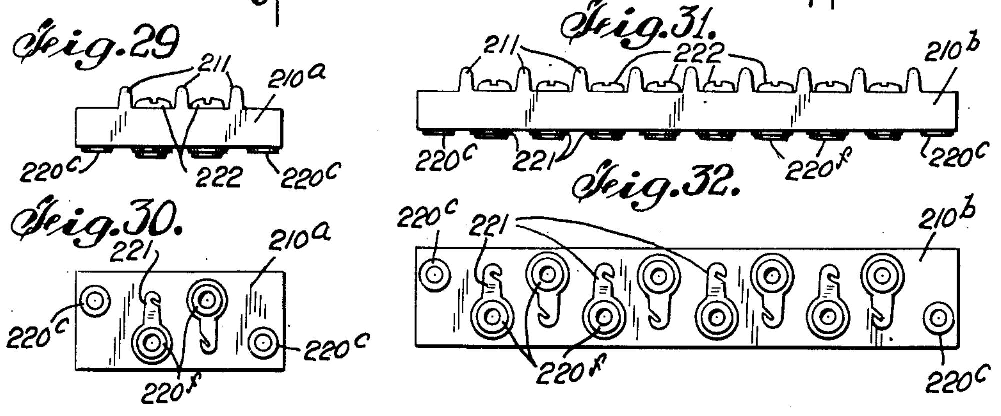
Figure 33:
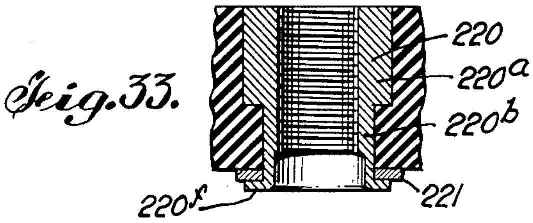
Figure 27:
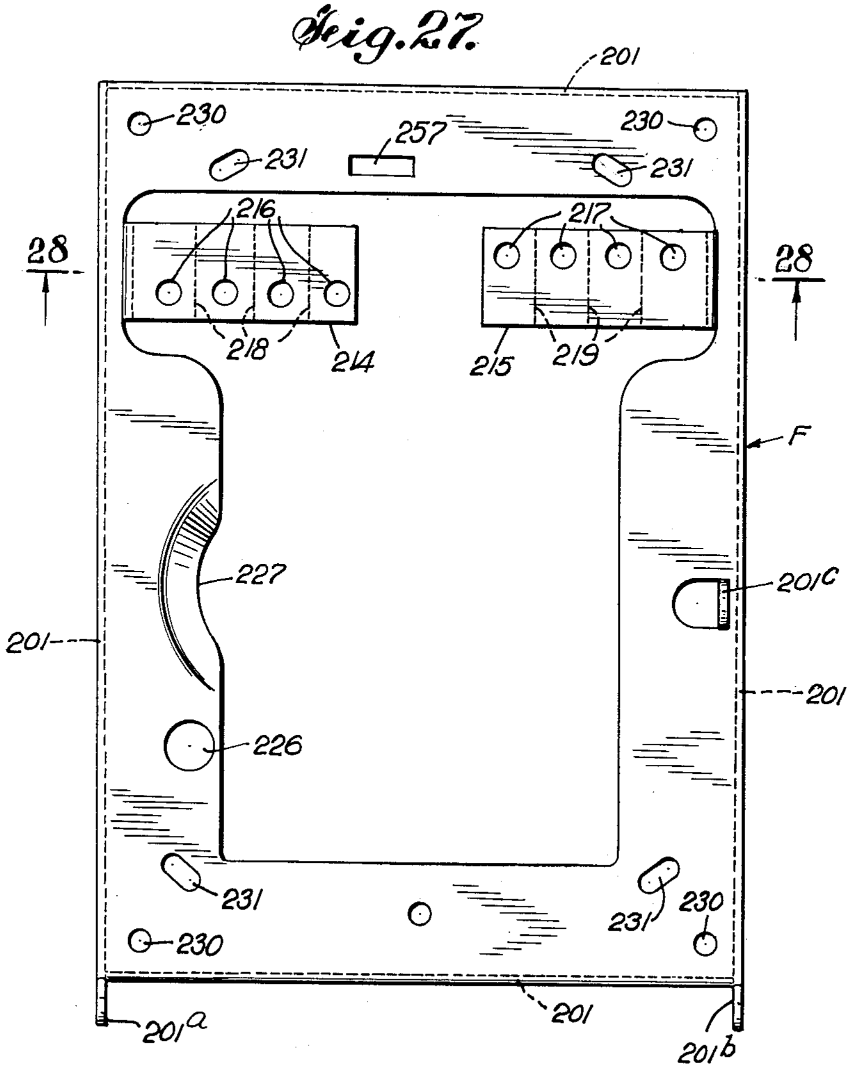
Figure 28:
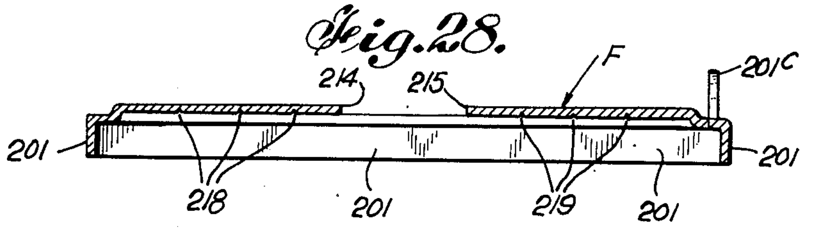
Figure 34:
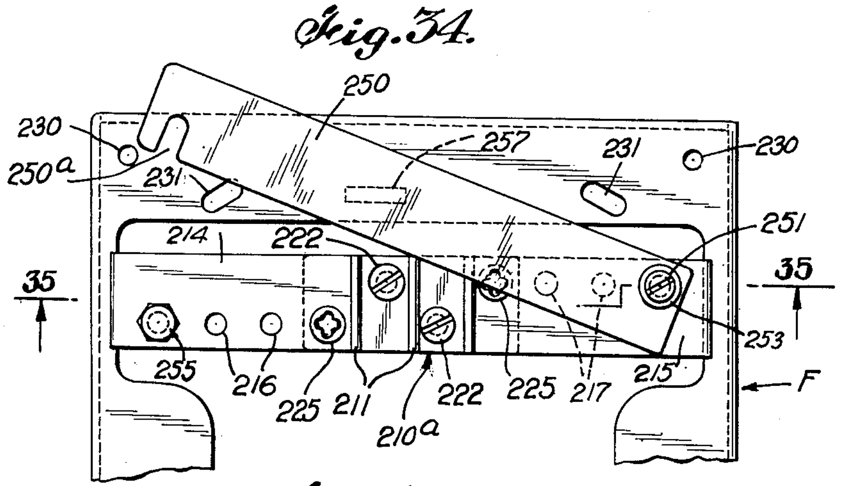
Figure 35:
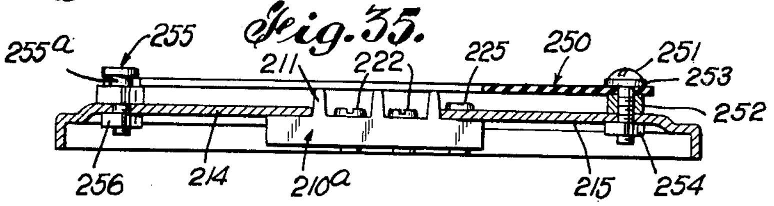
Figure 36:
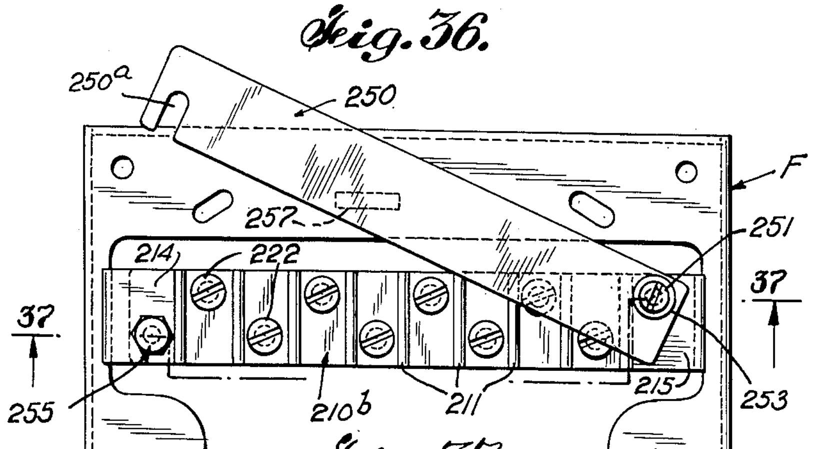
Figure 37:
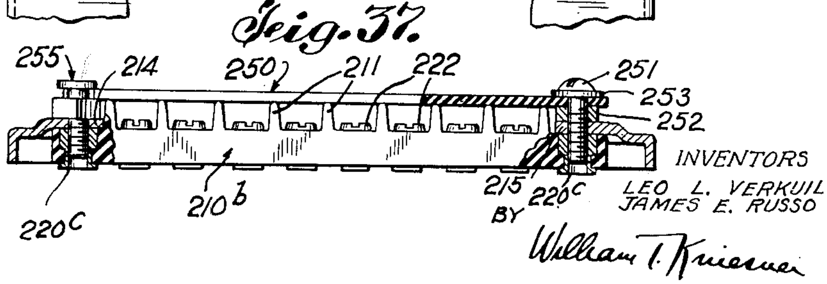

Figure $3^a$ is a front view, on a greatly reduced scale and as seen along the line A—A of Figure 3, of the wall-recessed casing part of the installation of Figure 3;

Figure 4 is an elevation as seen from the right in Figure 2, partly in section and partly broken away, illustrating a surface-mounted installation, with certain other parts that are duplications of parts shown in Figure 3 being also broken away;

Figure $4^a$ is a front view, on a greatly reduced scale and as seen along the line B—B of Figure 4, of the surface-mounted casing part of the installation of Figure 4;

Figure 5 is a plan view as seen from the top in Figure 2, certain parts being broken away or omitted and others shown in horizontal section;

Figure 6 is a detached elevation as seen along the line 6—6 of Figure 5, showing certain details, partly in section, of a latch construction;

Figure 7 is a transverse vertical sectional view of the front casing part as seen on the line 7—7 of Figure 5;

Figure 7a is a detached elevational view of a glass-holder element as it would be seen from the left in Figure 7;

Figure 7b is an elevation as seen from the right in Figure 7a;

Figure 8 is a transverse vertical sectional view of the front casing part as seen along the line 8—8 of Figure 5, certain parts being omitted;

Figure 9 is a central longitudinal sectional view of the front casing part as seen along the line 9—9 of Figure 5, certain parts being omitted;

Figure 10 is a central longitudinal sectional view of the hand lever as detached from Figure 9 and also as seen along the line 9—9 of Figure 5;

Figure 11 is a detached rear elevation of the manual or hand lever carried in the front casing part and as it is seen from above in Figure 10;

Figure 12 is a detached side elevation on an enlarged scale, with certain parts broken away or omitted, of the signal transmitting mechanism and its drive, showing it in the position it normally occupies, that is, with the front closure part of the casing in closed position, being a view as seen interiorly of the casing and from the left in Figure 1;

Figure 13 is a similar detached side elevation like that of Figure 12, being in effect a view as seen from the front in Figure 12 but with an end frame plate removed to show more clearly certain of the internal mechanism and gearing, certain parts being in section;

Figure 14 is a detached elevation on an enlarged scale of a stud or pin mounted in one of the gears shown in Figure 13;

Figure 15 is a view as seen from the top in Figure 12;

Figure 16 is an elevation as seen along the lines 16—16 of Figures 12, 13, 17, and 18, showing the signal transmitting mechanism or unit as it would be seen from the front in Figure 2 or from the left in Figures 3 and 4, certain parts being omitted or shown in section and others shown in phantom;

Figure 17 is an elevation as seen from the rear in Figure 12;

Figure 18 is a view or elevation like that of Figure 17, showing the mechanism as seen with the frame plate of Figure 17 removed, certain parts being in section;

Figure 19 is a view as seen form the bottom in Figures 12 and 13;

Figure 20 shows in elevation two code wheels of a possible series of code wheels;

Figure 21 is an elevation, partly in section, showing a mounting hub for the code wheel;

Figure 22 is a sectional view as seen along the line 22—22 of Figures 17 and 18, showing a speed governor device embodied in the signal-transmitting mechanism;

Figure 23 is a detached top or plan view, on a smaller scale, of a transparent box-like enclosure for the signal-transmitting mechanism unit as seen from above in Figure 2;

Figure 24 is a side elevation as seen from the left in Figure 23;

Figure 25 is a plan view of a length of preformed insulating bar for making terminal blocks;

Figure 26 is a front elevation thereof as seen from the bottom in Figure 25;

Figure 27 is a plan view of a frame plate before assembly to it of other parts;

Figure 28 is a transverse sectional view as seen on the line 28—28 of Figure 27;

Figures 29 and 31 are front elevations, and Figures 30 and 32 are, respectively, bottom elevations, of two illustratively different lengths of terminal block assemblies as prepared for assembly to the frame of Figure 27;

Figure 33 is a detached cross-sectional view on an enlarged scale showing certain features of construction of the terminal blocks of Figures 29–32;

Figure 34 is a fragmentary front elevation of the frame of Figure 27 with a short terminal block and other parts assembled thereto;

Figure 35 is a transverse sectional view along the line 35—35 of Figure 34;

Figure 36 is a fragmentary front elevation of the frame of Figure 27 with a long terminal block and other parts assembled thereto;

Figure 37 is a transverse sectional view as seen along the line 37—37 of Figure 36; and Figures 38–43 are circuit diagrams showing illustratively several of the many possible electrical combinations and circuit arrangements of the apparatus.

There are widely varying or different conditions which have to be met in fire alarm signalling stations, depending upon which, and how many, are called for; these in turn are affected by such factors as the location of the particular fire alarm station or stations, the type of circuit or system with which it is to be associated, the type of audible or other signalling device that is to be actuated and whether local or remote, facility of access for inspection or for testing either of the mechanism in the station or of the signal transmission or both, facility to sound a local drill alarm signal without sounding the central station alarm, tell-tale signalling of tampering, non-interfering controls, deterrents to malicious operation of the station, external foolproof construction, and others. Of these illustrative and numerous requirements, only a few are met with, for example, in certain types of installations, and others or more are met with in other types of installations, and thus a wide variety of combinations of such requirements have to be fulfilled. For example, a fire alarm system installed in a school building should meet the requirement that the central station alarm and local alarms be sounded from any of the stations distributed throughout the school building, while for purposes of fire drills the local alarm only is to be sounded and no alarm transmitted to the central station. Even in such an illustrative case various other requirements have to be met, such as deterrents to malicious tampering, and facility for inspection, testing, and the like.

One of the dominant aims of this invention is to provide a local alarm signalling or transmitting station so constructed that, in the course of manufacture or assembly appropriate instrumentalities may readily be omitted or added or substituted or selectively constructed as sub-units for incorporation into the station mechanism, so that it will be possible, by the employment of certain correlated fundamental sub-assemblies that can be common to all station types, to produce economically and in the desired quantities, stations to meet any of the variable number of specified requirements. It is also an aim of this invention to provide an alarm signalling station mechanism that will embody a wide range of flexibility of adaptation without impairment of the manifold advantages of maintaining identity of fundamental structures involved, for purposes of facilitating manufacture, assembly, installation, inspection, and replacement. It is another object of this invention to provide such a signalling station for transmitting coded signals in which, with a given type of fundamental spring motor drive, the extremely wide range of code wheel speeds which depend upon the kind of central station signal that is actuated, can be dependably achieved to meet any speed requirement, without impairment of simplicity of selection or adjustment, compactness and dependability of construction, and reliability of action for any required code wheel speed.

In the illustrative and preferred embodiments of this invention, the alarm station preferably comprises a number of sub-assemblies arranged so that individually they may be readily constructed and then such of them brought together and assembled, with such added or modified instrumentalities, as are needed to meet any particular requirement or to suit the particular type of circuit or system involved. Indicated in the drawings are sub-units or sub-assemblies comprising a casing or closure part C, a companion casing or enclosure part B which is preferably in the form of a socalled outlet box that can be recessed into a wall, an alternative companion casing or enclosure part BB in the form of a box mounted on the face of a wall or other support, a frame, and connector panel sub-assembly F which also coacts to correlate the parts C and B or the parts C and BB to form a complete enclosure for the code signal transmitting mechanism which, in the drawings, is indicated at M, also in the form of a sub-assembly that is correlated to the closure part C, all as later described; these sub-assemblies may include added sub-units or interchangeable sub-units, according to the particular specification or requirement to be met. For example, sub-assembly C may include a sub-unit L in the form of a manual operating lever carried by the closure part C for coacting with the latter and with the code mechanism M, and it is constructed or assembled to coact with still other parts where such are required in the system, as is later described.

These and other sub-assemblies are interrelated, in preferred relationships about to be described, to achieve the above-mentioned and other objects and advantages of the invention from viewpoints of manufacture, assembly, installation, operation, fool-proofness, inspection, and maintenance. The casing part C, which may be a casting, is preferably relatively shallow, whereas the companion casing part B (Figure 3) is preferably of relatively substantial depth so that when set into a recess in a wall, substantially only the casing part C projects forwardly from the face of the wall surfacing. In some installations, recessing into a wall is not practical or may be undesired, and in such case, companion casing part BB (Figure 4), constructed to be secured to the face of a wall or other support, is associated with the same shallow casing part C; it is of substantial depth and coacts with part C, as is later described.

Casing part C has a perimeter formed by opposed parallel side walls 20 and 21 (Figures 5, 7, 8, and 9) and curved or inclined top and bottom walls 22 and 23, the latter merging, by appropriate curvatures, into a front wall 24, being in vertical cross-section externally convex and internally concave. The external surfaces of casing part C, usually painted red, are easily seen where it is associated with recessed casing part B and it can thus be located from all necessary angles even though this shallow casing part C is the only part, in this illustrative embodiment, that projects beyond the surface of the wall in which the station is mounted; the side walls 20 and 21, even though curved along their outer edge to merge into the top and bottom walls 22 and 23, present a substantial vertical expanse so that the station can be readily spotted along the wall on which it is mounted, and at the same time compactness and neatness of appearance are maintained. Where casing part C is associated with a surface-mounted companion casing part BB, both are usually painted red, and the resultant conspicuousness makes for ease of locating the alarm station.

As is better shown in Figure 5, walls 20, 22, 21, and 23 of casing part C form a rectangular outline and, when the part C is in horizontal position with the front wall 24 bottom-most, these walls enclose a generally rectangular space, which, where the front wall 24 is curved or inclined, is of varying depth (Figure 9). Adjacent but spaced from the inner end wall 22 and spaced also from the side walls 20 and 21, there is a relatively large aperture 25 (Figures 5 and 9) in the front wall 24; it may be rectangular or square in shape (Figure 5) and is surrounded by a correspondingly shaped wall, generally indicated by the reference character 26, that stands up (Figures 7 and 9) from the front wall 24 about the periphery of the aperture 25 and that is preferably cast integrally with front wall 24, forming in effect a well that is open at both ends. The four side portions of wall 26 terminate in a plane (see Figures 7 and 9) somewhat below the plane of the edges of casing walls 20, 22, 21, and 23, they are preferably of substantial thickness, and upstanding from their upper continuous edge face (as seen in Figures 5 and 7) is a peripherally continuous locating rib or flange 27, for purposes later described. As shown, this arrangement provides a substantially continuous ledge both to the inside and to the outside of the rib 27.

As is better shown in Figures 5, 8, and 9, there is another opening 28 in front wall 24 which, as seen in the front face of wall 24 (see Figure 1), substantially matches the width of aperture 25 and appears somewhat as an upward extension of the latter, but it is separated from well opening 25 by the transverse wall $26^a$; it is laterally bounded by walls $28^a$ and $28^b$ which are substantially in line with the opposed walls $26^b$ and $26^c$ of the well 26, being in effect integral extensions of the latter, and it is closed off by a curved wall 30, as is better shown in Figure 9. There is thus formed a finger or hand hole, for convenience designated by reference character H, which is open and accessible only from the front face of the front wall 24, somewhat near the upper portion thereof (see Figures 1 and 9).

The well aperture 25 in front wall 24 is closed off at its outer end by the manual operating lever sub-assembly L (Figures 1, 10, and 11) which is in the form of a cast plate-like lever 32, generally rectangular in shape, and provided at its lower inside face with spaced ears $32^a$ and $32^b$ apertured to receive a pivot pin 33, the ends of which are seated in recesses $26^e$ and $26^f$ provided in side walls $26^b$ and $26^c$ of the well 26 (see Figure 9). These recesses are open-ended toward the interior of casing part C, being thus somewhat like slots, so that, with pivot shaft or pin 33 initially assembled to the plate 32 and with its ends projecting laterally from the plate lever 32, these ends can be entered into these slot-like recesses $26^e$ and $26^f$ from their above-mentioned open ends, which are subsequently closed off in a manner later described. The plate-like lever 32 extends beyond the well wall $26^a$ to overlie and partially close off the hand hold H, but it terminates sufficiently away from curved or concave wall 30 (Figure 1) so as to provide ample space in a vertical direction to permit free entry of two or more fingers of the hand into the hand hole H and, guided by the curved face of back wall 30, to take or reach behind the upper end of the lever plate 32, so that the latter may be pulled and swung away and downwardly from the front wall 24, about the pin or shaft 33 as a pivoting axis. On its front face it may bear appropriate legends of instruction, as suggested later on. By such movement of the lever plate 32, the alarm is to be sounded at the central station. The operating lever sub-assembly L comprises other features of construction and instrumentalities as later described, and the sub-assembly L may be fabricated or made up by assembling to it certain of such other parts as are later described and the sub-assembly then assembled to the casing part C by the pivot pin 33.

Of the various parts which lever 32 actuates or with which it coacts, it will be helpful first to describe the code transmitting mechanism which is preferably constructed as the above-mentioned sub-assembly M (Figures 1–4); it is constructed to be seated, as a single unit, against the continuous edge face of the walls of well 26 and be received relatively snugly within the above-mentioned locating flange 27 which thus serves to readily position the sub-assembly M for securing it in place and in relation to other coacting parts, including the plate lever 32. The code transmitting mechanism includes a mechanical motor, the driving energy for which is derived from a wound spring. As a unit, its features are shown in Figures 12–19. It comprises a base or mounting plate 40 (Figures 13, 14, 16, 17, 18, and 19), preferably in the form of a sheet metal stamping, shaped to provide a flat peripheral flange $40^a$ whose periphery is substantially rectangular and dimensioned to neatly fit within the locating flange 27 and to rest peripherally against the inside ledge or edge face of walls 26, as is better shown in Figure 9; at its corners it has holes $40^c$, shown in phantom in Figure 16, through which are passed screws 43 (Figure 9) threaded into four corner holes $26^j$ (Figure 5) of well walls 26, thus detachably securing the base plate 40 and the mechanism carried by it to the front casing part C.

The mounting plate 40 is dished, as is better shown at $40^b$ in Figures 13, 14, 16, 17, and 18, to extend into the well and toward the plane of front wall 24 of the casing part C (Figure 9); it thus serves also to substantially close off the outer end of the well aperture 25, adjacent the inner face of the plate lever 32, so that, when the latter is swung about its pivoting shaft 33, a movement which somewhat uncovers that end of the well, access to the interior of the casing is barred.

Plate 40, adjacent its two lower corners in the flat marginal portion $40^a$, as viewed in Figures 12, 13, and 16–19, has secured to it two posts 41, 42 which, when plate 40 with the code mechanism is set in place as above described, project toward the front wall 24 of casing part C; they are spaced and dimensioned to enter and close off the slot-like rear ends of the bearing recesses $26^e$ and $26^f$ (Figures 5, 7, and 9) into which the ends of lever shaft 33 (Figure 9) are entered by movement thereof toward the front, when lever 32 is assembled to the casing part C. Posts 41, 42 may be of metal, being riveted over or staked in suitable holes in the flange part $40^a$ to secure them to part 40. Putting part 40 in place, therefore, locks the pivot shaft 33 in its bearing recesses and thus completes the assembly of hand lever 32 to the casing part C.

In the dished part $40^b$ of mounting plate 40 is a slot 45 which extends at right angles to the axis of pivoting shaft 33; through it, as later described, mechanical connection is made between the code transmitting mechanism M and the hand lever 32.

The code transmitting mechanism further comprises two spaced relatively heavy parallel frame plates 47 and 48, generally square or rectangular in shape (Figures 12, 13, and 18), and they are held in suitably spaced relation by relatively heavy spacers 51, 52, 53, and 54 positioned at the respective corners of the plates where the latter are provided with appropriate juxtaposed and aligned holes. These frame-spacers may comprise relatively heavy cylindrical studs, shouldered or stepped at their ends for reception into the holes in the frame plates; one end of each may be expanded or headed over at the holes of one of the frame plates, as indicated at 55 (Figures 12 and 15), while at the opposite ends the stepped ends of the stud are internally threaded to receive screws 56 (Figures 17 and 18), thus rigidly securing the plates 47, 48 in parallel spacing while permitting also subsequent disassembly for repair or replacement of parts carried by the frame.

Frame plates 47—48 have corner ears or extensions 49, as shown in Figure 16, bent at right angles to rest against the flange portion $40^a$ of mounting plate 40 (Figures 13 and 18) to which they are secured by screws 57.

The spaced parallel frame plates 47—48 are provided with suitable aligned juxtaposed holes that form bearings or supports for bearings for various shafts of the gear train and spring motor. One of these is a shaft 61 (Figures 18, 15, and 16) which has a drum-like enlargement or shoulder 62 to which is secured, as by pin 63, one end of a flat spring 64 that extends in suitable turns about the shaft and has its remaining or free end formed into a loop $64^a$ that extends about a bushing or enlargement 66 on the frame spacer stud 51. Spring 64 is fastened to shaft 61 closely adjacent the frame plate 48 which can thus act as one side wall to contain the turns of the spring against relative axial displacement, and adjacent the other side of the turns or coils of the spring 64 is a relatively large gear 67 (Figures 18 and 15) coaxial with the shaft 61 and suitably mounted thereon for free relative rotation between itself and the shaft; gear 67 is held against axial displacement in any suitable way, as by washers 68 secured to or carried by the shaft 61 and by one side face of a ratchet wheel 70 fixed to the shaft 61. Ratchet wheel 70 has a suitable number of ratchet teeth, illustratively six, and coacting with it is a pawl 71 that is pivotally carried by a pivot stud 72 on one side face of the gear 67. Pawl 71 is spring-pressed to urge it against the ratchet teeth of ratchet 70, by a spring 73 whose free end bears against the pawl 71 and the other end of which is suitably fixed to the gear 67 (Figure 13).

Pawl 73 and ratchet 70 are preferably made to coact with other parts so that they can function to hold the shaft 61 against being driven, except when desired, under the influence of energy stored in the spring 64 and, when desired, to transmit to other parts the rotary drive of the shaft 61 by the spring. Accordingly, provision is made for controllably holding and releasing gear 67; when held against rotation, thus also holding the pawl 71 carried by it in a fixed position, pawl 71 coacts with the ratchet 70 which turns with the shaft 61 to permit the latter to be turned to further wind up the spring 64, and when gear 67 is released, shaft 61 turns it through the ratchet 70 and pawl 71, as is about to be described.

Spaced from shaft 61 and rotatably supported in bearing holes in the frame plate 47—48 is a shaft 77 that extends also through side plate 48 externally of which it carries a toothed code wheel 78. Code wheel 78 is selected from many, according to the signal or number to be transmitted, and the mounting thereof on shaft 77 is detachable and keyed or pinned, so that any selected code wheel fits always in proper relation to a switch actuator 79 which is engaged by the code teeth.

Preferably, for this purpose, there is a hub or bushing 80 (see Figure 21), flanged at one end as at $80^a$ and threaded at its other end as at $80^b$, that is received on the shaft 77, locked thereto by set screws 81 (Figures 15, 17, and 19). Projecting from flange $80^a$ is a key or pin 82. Each code wheel has a center hole so it can be slid onto hub 80 and an offset smaller hole $78^a$ into which the pin takes, and, after selecting the desired code wheel and so sliding it onto the bushing 80, a lock nut $80^c$ is threaded onto the bushing end $80^b$ to lock the selected code wheel 78 to the shaft 77. The bushing or hub 80 is left locked to shaft 77 by the set screws 81, which are 90° apart, after its rotary position with a code wheel thereon has been initially set to relate the code wheel teeth properly to the rest of the mechanism; thereafter the code wheel can be removed by removing lock nut $80^c$, but it can be subsequently re-assembled to the shaft 77 only in the same relationship. Accordingly, with the hub 80 set, code wheels of a given series for any system or installation cannot be assembled to shaft 77 of their respective mechanisms except always in that same relationship. Figure 17 shows a code wheel with teeth arranged for the signal 3-5-2; in Figure 20 are shown two further code wheels of the same series, namely, for signals 3-5-3 and 3-5-4. All have an offset hole or keyway $78^a$ which in all bears the same angular position to the space or gap $78^c$ between the first and the last tooth. Hence, pin 82 and hole $78^a$ foreclose assembly of any selected code wheel to shaft 77 in other than the proper relation. In the at-rest or home position of the code wheel, this gap stands with an appropriate point in its length, such as its mid-point, overlying the switch actuator 79, later described.

Intermediate of the frame plates 47—48, the code shaft 77 has fixed to it a pinion 83 (Figures 18 and 15) which meshes with the large gear 67; hence, large gear 67 can drive pinion 83 and code-wheel shaft 77 at increased speed of rotation and this drive is always in the same direction, because of pawl 71 and ratchet 70.

At the end of shaft 77 adjacent frame plate 47 is fixed a large gear 84 (Figures 13 and 16) which meshes with a small gear or pinion 85 (see Figures 22 and 13) that has a sleeve-like extension to which is secured a large gear 87, the two gears 85—87 forming a coaxial gear unit which is supported rotatably on a stud shaft 86 (Figure 22) which is fixed to frame plate 47 in any suitable manner. Thus, as shown in Figure 22, the stud shaft 86 may have a flange $86^a$ which can rest against the inside face of frame plate 47 and a short shank $86^b$ received in a hole in the frame plate 47 and headed over as indicated to rigidly secure it in place.

The pinion-and-gear unit 85—87, driven by the large gear 84, is thus driven at a higher speed than is the gear 84, and, as is later pointed out, gear 87 serves to drive certain other parts at a still higher rate of speed.

The gear ratio of drive between shaft 61 and large gear 87 is thus relatively high, being on the order of 1 to 1300. Though the spring 64 be a powerful one and when appropriately wound capable of exerting a substantial driving torque, this high gear ratio makes it possible to hold gear system against actuation by the application to the outer portions of the large gear 87 of only a relatively small force, and because the angular movement of the large gear 87 about its axis is so large (the ratio being on the order of 1300 to 1) in relation to the angular movement of shaft 61, it is possible with great precision and for purposes later described to halt the gear train at any desired point. For these purposes there are provided in the large gear 87 and closely adjacent its outer periphery, a suitable number of holes 88 (Figures 13 and 18) that lie on a circle along which they are equidistantly spaced; illustratively, as shown in Figure 13, there are eight such holes, and positioned in one of them, which is selected as later described, is a pin or stud 90. Stud pin 90 is detachably mounted in the selected hole in any suitable manner. Preferably it comprises a shank $90^a$ (Figure 14) of a diameter equal to that of holes 88 so as to be snugly received therein; the shank $90^a$ is of a length greater than the thickness of the gear 87, and the projecting portion of the shank $90^a$ is provided with a peripheral groove $90^b$ to receive a split spring or snap washer $90^c$ (Figure 13) to hold in against movement out of the selected hole 88.

As viewed in Figure 13, the drive derived from the turning of shaft 61 by spring 64, and the rotation of large gear 87 are clockwise; counter-clockwise as viewed in Figure 18. Coacting with the stud 90 on large gear 87 is a controllably movable stop member 91 that is projectible into the path of rotary movement of stud 90, and conveniently stop member 91 is formed somewhat like a straight-edged hook on the end of a rocker-lever, indicated as a whole at 92, which conveniently is made up of two elongated lever parts 93 and 94 (Figure 19) which may be separately stamped and formed out of suitably heavy sheet steel and suitably secured together; as is better shown in Figure 19, central portions of these two rocker parts 93—94 are apertured and are fixed, as by a press-fit, to a trunnioned shaft 95 whose smaller or trunnioned ends are rotatably received in bearing holes in the frame plates 47 and 48, so that, as shaft 95 pivots, the rocker parts 93—94 can partake of rocking movement.

On one end of part 93 is formed the hook-like stop member 91 that can coact with the stop pin 90 on large gear 87 when the stop pin is in six o'clock position (Figures 18 and 13). As is better shown in Figure 19, that portion of part 94 that extends alongside of and toward the stop member 91 is bent, as shown at $94^a$, to space it away from one arm of rocker part 93 and position it closely adjacent the frame plate 47; its extreme end is bent at right angles to form a laterally extending arm $94^b$ that passes through an elongated slot 96 (Figure 12) in frame plate 48 to the exterior of the latter. Arm $94^b$ is covered over by a sleeve 97 made of any suitable hard insulating material, all for a purpose later described.

The parts 93—94, being secured together and functioning as a single rock-lever entity 92, are spring-biased in a direction to swing the rock-lever 92 counter-clockwise in Figure 13 and clockwise in Figure 18; thus, stop member 91 is urged out of the path of rotary movement of the stop pin 90 projecting from large gear 87 and the insulated arm $94^b$ is urged in downward direction as seen in these two figures. This biasing means comprises a spring 100 (Figures 19, 18, and 13) having several turns that extend about the rock-shaft 95, with one end $100^a$ bent to hook against an edge of frame plate 47 and the other end $100^b$ bent to extend crosswise of and to hook over the mating under-edges of the rock-lever parts 93—94.

The other end of the rock-lever part 94 has an upward extension that provides a cam edge or face 101 (Figure 13) that projects into the path of arcuate movement of a part 102, preferably in the form of a roller, carried by a stud 102a fixed in the side of a gear sector 103; the latter is secured to a heavy shaft 104 whose ends are suitably trunnioned and received in bearing holes in the frame plates 47—48 and it meshes with a gear 106 fixed to the spring-carrying shaft 61 and positioned alongside of ratchet wheel 70 (see Figures 13 and 16). If the drive of gear sector 103 is clockwise in Figure 13, it drives the motor shaft 61 through the pinion 106 in spring-winding direction, and, conversely, if the shaft 61 is driven in reverse direction, by the force of the spring 64, pinion 106 drives gear sector 103 in reverse direction, that is, counter-clockwise as seen in Figure 13.

Drive of gear sector 103 in the direction to wind spring 64 is achieved by the movement of plate-like hand lever 32 in the casing front wall 28 (Figure 1) when that lever is manually swung outwardly and downwardly, and for this purpose there is provided a pivotally mounted driver plate 107 (Figures 13 and 18) which is carried rotatably on the shaft 104 of the gear sector 103; driver plate 107 is connected to the manual lever 32 by a link 108 so that movement of the manual signal lever 32 is communicated to driver plate 107 and movement of the driver plate is communicated to the signal lever. Driver plate 107 (Figures 13 and 18) may be in the form of a stamping of suitably heavy sheet steel, whereby the punch and die operation can give it the desired configuration which includes a round hole in which is secured a bushing 110 to give the driver plate 107 a substantial and large bearing on the shaft 104 on which it is received alongside of the gear sector 103 which is fixed to the shaft 104. Driver plate 107 can thus be swung about the axis of shaft 104 and relative to the gear sector 103, and vice versa. In the space between driver plate hub 110 and frame plate 47 is mounted a heavy biasing spring 111 (Figures 13, 19, and 16) which has a coil of several turns about the shaft 104. One end $111^a$ of spring 111 is hook-shaped and engages a headed stud 112 (Figure 13) projecting from one side face of the driver plate 107, and the other end $111^b$ is hook-shaped and hooks about the frame cross-stud or spacer 54. Spring 111 thus turns driver plate 107 counter-clockwise in Figure 13 and clockwise in Figure 18, whereby, through the link 108 passing through slot 45 (Figure 23) in mounting plate 40 and connecting driver plate 107 to manual signal lever 32, the latter is normally held flush with the front wall of the front casing part, closing the outer open end of the well above described. Thus, spring 111 normally holds the operating signal-lever 32 in readiness to be manually actuated when an alarm signal is to be transmitted.

Connecting link 108 comprises two spaced identical parts $108^a$ and $108^b$ (Figures 15 and 19) between which, at one end, an arm-like extension of the drive plate 107 is received and pivotally connected by a pin 114 (Figure 13) that extends through all three parts; at the other end the spaced parts $108^a$ and $108^b$ are pivotally connected to the inside face of lever 32 by a pin 115 that passes through them and through suitable ears or lugs formed in the lever 32.

Roller part 102 on gear sector 103 (Figure 13) is of an axial length to contact the cam edge 101 on the rock-lever part 94 when gear sector moves counter-clockwise in Figure 13, and driver plate 107 is positioned on the shaft 104 so that its plane intersects the part 102 and also is coincident with the median plane of end portion $93^c$ of rock-lever part 93 (see also Figure 19). Driver plate 107 can thus coact with lever end $93^c$ and by-pass lever part 94 that has the cam edge 101. End portion $93^c$ of the rock-lever part 93 has an upper substantially flat edge face $94^f$ that is stepped downwardly, as at $94^g$, with a substantially vertical intervening edge face $94^h$. The edge faces $94^h$ and $94^g$ form substantially a right-angled notch. Driver plate 107 has a cam edge $107^a$ of substantially the same radius throughout and of an arcuate extent of about 100°, beginning at a leading edge face $107^b$ that is substantially radial and terminating in a radial projection or shoulder $107^c$ of sufficient length to contact frame spacer stud 54 to thereby limit the extent of clockwise swing (Figure 13) of driver plate 107. Thus, also, a strong positive stop is provided to limit the extent to which hand lever 32 can be pulled; shoulder part $107^c$ passes on to engage spacer 54 through the slot 45 in auxiliary well-closure plate 40.

With the manual signal lever 32 in vertical or closed position in the front wall of the casing C, a position in which it is held by the action of the spring 111 on the signal lever through the connecting link 108, as above described, the position of the various parts is substantially as shown in Figure 13 and Figure 18. The roller crank-pin 102 on gear sector 103 stands in engagement with the cam edge 101 on the rock-lever structure 92 and positively holds the rock-lever 92, against the bias of spring 100, with its right end as seen in Figure 13 in lowermost position and with its left end in uppermost position in proximity to the stop pin 90 (on large gear 87) which stands at the six o'clock position. With the left-hand end in upper position, the hook-like stop member 91 (Figures 13 and 18) stands projected into engagement with a side of stop pin 90 on large gear 87 which it holds against rotation, spring 64 straining to drive it, and the entire gear train thus stands halted; accordingly, with large gear 67 likewise halted, pawl 71 holds spring-stressed shaft 61 against rotation by its engagement with a tooth of ratchet 70, and hence the spring-motor shaft 61 can be turned only in a direction to further wind up the spring 64.

With the right-hand rock-lever structure 92 depressed, cam edge $94^f$ stands in a position slightly below the arcuate path of travel of arcuate cam edge $107^a$ of the driver plate 107 (Figure 13); the vertical edge face $94^h$ is thus held out of the path of possible clockwise movement (Figure 13) of the leading radial edge $107^b$ of the driver plate, and such movement is not blocked. Manual lever 32 thus likewise stands unblocked against manual actuation, and is ready and free to be pulled against the bias of spring 111.

If now the manual signal lever 32 is pulled about its horizontal axis, it transmits a clockwise (Figure 13) rotary movement to driver plate 107 by way of link 108, increasing the tension of the spring 111 and bringing the leading driving edge $107^b$ into engagement with roller stud 102 on gear sector 103 and driving the stud 102 ahead of it to rotate the gear sector 103 and to move stud 102 out of holding relation with cam 101. But well before roller stud 102 disengages itself from cam part 101 on rock-lever 92, the arcuate edge face $107^a$ of driver plate 107 overrides the upper edge face $94^f$ of the rock-lever 92 and prevents the spring 100 from tilting the rock lever so that hook-like stop member 91 (Figures 13 and 18) at the other end of the rock lever 92 cannot disengage itself from stop pin 90 on large gear 87. Gear 87 remains held and the gear train, beginning with large gear 87 and including the larger gear 67 that is coaxial with the spring-winding shaft 61, continues to thus stand locked; hence, pawl 71 carried by large gear 67 is held stationary and in position to coact with the ratchet teeth of the ratchet 70 when the latter rotates in the only direction permitted by the still stationary pawl 71 and that is in spring-winding direction of rotation of shaft 61 to which ratchet 70 is fixed.

Accordingly, winding of the spring 64 and storing of additional energy therein take place as the manual operation of signalling lever 32 continues to turn gear sector 103 which, through the smaller gear or pinion 106, turns the spring-winding shaft 61 at a multiplied rate, throughout the complete permissible pull of the signal lever 32, that is, until shoulder $107^g$ on driver plate 107 strikes cross-frame stud 54. For one such complete downward and outward swing of the lever 32, the gear ratios and other parts are preferably so proportioned that at least four ratchet teeth of ratchet 70 are permitted to by-pass the still stationary pawl 71; accordingly, were lever 32 to be released before its permissible range of movement is completed, pawl 71 catches against a ratchet tooth after at least one-quarter of the range of lever movement, or after one-half of the range has completed, or after three-quarters of the range. Also, the gear-train ratios and other controls of the drive of the code-wheel shaft 77 are such that it and the code wheel 78 make four complete revolutions for one complete actuation of the signal lever 32, and, hence, with the above-described pawl and ratchet relationship, code wheel 78, therefore, makes one complete revolution for a one-quarter lever actuation, two revolutions have a one-half lever actuation, and three revolutions for a three-quarter lever actuation. Each revolution of the code wheel transmits the coded signal once. The full swing downwardly and outwardly of the signal lever 32 is about 90° and, accordingly, by the above arrangement, there is achieved certainty that at least one complete revolution of the code wheel (and, hence, at least one code-signal transmission) is effected in the event that the signal lever 32 is not given a full swing.

Moreover and desirably, signal transmission does not take place until the lever has been manually released and is swung to its home position and locked; release of lever 32 also effects return of the driver plate 107 to its home position or starting point, through the linkage 108. This return to home position takes place independently of gear sector 103, and removes leading edge $107^b$ of driver plate 107 from the stud 102. If not in home or starting position, driver plate 107 prevents release of the gear train, for its arcuate cam edge $107^a$ remains over the lever part $94^f$ and holds the rock-lever 92 against tilting to disengage part 91 from stop pin 90 on large gear 87. In home position, driver plate arcuate cam edge $107^a$ is withdrawn from overlapping relation to the part $94^f$ of the rocker lever 92 (see Figure 13) and becomes juxtaposed to the downwardly stepped portion $94^g$, whereupon the spring 100 quickly snaps the rock-lever 92 about its axis to an extent permitted by the engagement of lever part $94^g$ with cam edge $107^a$; driver plate 107 and also lever 32 are locked in home position for now part $94^h$ blocks rotation of driver plate 107 at its leading edge $107^b$. At the same time switch-operating member 97 is moved in downward direction and hook-shaped stop member 91 (Figures 13 and 18) is snapped downwardly and out of engagement with stop stud 90 on large gear 87.

This disengagement releases the gear train and now spring 64 is freed to drive shaft 61 clockwise in Figure 13 and counter-clockwise as seen in Figure 18. With ratchet wheel 70 and pinion 106 (Figures 13 and 16) fixedly secured to the shaft 61, they too are rotated with shaft 61 and with pawl 71 caught behind one of the ratchet teeth (either the first, second, third, or fourth ratchet tooth which pawl 71 overrides during the manual swing of the signal lever 32 according to the range of swing given that lever 32), large gear 67 that carries the pawl 71 is rotated by the ratchet 70 and thus drives the gear train to turn the code wheel shaft 77; the endmost gear of the train as thus far described, namely, large gear 87, rotates at a substantial speed, faster than code shaft 77.

At the same time, pinion 106 on slowly-rotating spring-driven shaft 61 drives gear sector 103 and its roller stud 102 slowly in counter-clockwise direction in Figure 13, slowly moving the part 102 toward the radial edge face $107^b$ of driver plate 107 which is in home position and locked as above described, and thus it cannot impede movement of stud 102 toward its own home position. Thus, roller stud 102 moves toward the cam part 101 (on rocker lever 92) which stands yieldably projected upwardly (as viewed in Figure 13) under the influence of spring 100, to an extent limited by the engagement of the part $94^g$ thereof with the leading portion of arcuate edge face $107^a$ of the driver plate 107.

As roller stud 102 approaches cam 101, lever 32 continues to be held locked in its home position for part $94^h$ stands in front of the leading radial edge face $107^b$ of the driver plate 107 and blocks rotation of the latter. Thus, a repeat actuation of signal lever 32 is prevented until, as is later described, the signal transmission, whether of one, two, three, or four code signals, has been completed and thus the mechanism and the action of alarm signal transmission cannot be interfered with by the only available external operating member, namely, the signal lever 32; the latter cannot be pulled during a signal transmission.

It should be noted at this point that actuation of signal lever 32 to an extent less than the one-quarter range above mentioned is ineffective to set the mechanism into operation, and thus also a fragmentary signal transmission is prevented. This is achieved by the gear ratio between spring-winding shaft 61 and the code wheel shaft 77, together with the relationship of the ratchet teeth of ratchet 70 and the above-described mechanisms controlling the coaction between stop stud 90 on large gear 87 and stop member 91 on rock lever 92, these parts being proportioned and interrelated so that no release of the gear train by disengagement of parts 90—91 can take place unless and until at least one ratchet tooth of ratchet 70 has by-passed the pawl 71 in response to pull of signal lever 32. Any smaller swing of signal lever 32 simply further tensions motor spring 64 and if followed by release of lever 32, the additionally stored energy therein simply rotates the spring-motor shaft 61 and pinion 106 in clockwise direction in Figure 13 and back to starting positions, and pinion 106 simply drives gear sector 103 in counter-clockwise direction (Figure 13) and through roller stud 102 makes certain to return driver plate 107 and signalling lever 32 to substantially their home or starting positions, aided by the spring 111. Roller stud 102 takes up against the cam edge 101 and stops, and rotation of the pinion 106, geared to gear sector 103, is thus also halted at its initial or starting point with the pawl 71 (which has not moved) engaged with that same ratchet tooth which moved away from the pawl upon the initial movement of the signal lever 32.

In like manner any fractional movement of the signal lever in excess of one-quarter or one-half or three-quarters, or the whole of its range of movement is ineffective, for the lever when released at the end of any such excess movement, simply lets the corresponding excess of energy stored in the motor spring 64 rotate the shaft 61 and pinion 106 and ratchet wheel 70 to an extent needed to bring the last by-passed ratchet tooth into engagement with the still stationary pawl 71. Pawl 71 is held against rotary movement inasmuch as the gear train remains locked. Thus, it is also made impossible to transmit one or more code signals plus a fraction of the code signal.

Since gear sector 103 is geared to pinion 106 and hence to ratchet wheel 70, the actions above described also make certain that roller stud 102 on gear sector 103, during its retrograde movement or reverse rotation during signal transmission, remains synchronized with the gear train as a whole, always returns to the same home or starting position, and this is not affected by fractional movements of the signalling lever 32 less than one-quarter or in excess of one-quarter, one-half, three-quarters, or the full range of its possible movement.

As the roller stud 102 approaches its starting position under the drive of spring 64, which drives the gear train that includes code wheel shaft 77 and also large gear 87 with stop member 90 thereon, the roller stud moves into engagement with the inclined cam edge 101 on rock lever 92. Cam edge 101 is so shaped and related to the radius of curvature of the stud roller 102 and to the radius of movement of the two parts that, after initial engagement by the roller stud 102, rock-lever 92 is slowly turned throughout a first portion of its range of swing, against the spring 100, until the upper end of stop member 91 just about clears the rotating stop pin 90, on gear 87, and then is quickly swung through the rest of its swing to quickly project member 91 into the path of pin 90, and halt the gear 87.

The gear train and mechanisms are thus halted at the completion of exactly one, or two, or three, or four revolutions of code wheel shaft 77 and code wheel 78 thereon, according to the initial amount of swing given the signal lever 32. Code wheel 78 is always stopped until about the mid-point of gap $78^c$ in its teeth opposed to the switch actuator 79. At the same time, the above-described actuation of rock lever 92 moves the stop part $94^h$ thereon downwardly out of the path of possible rotary movement of the driver plate 107 and positions the upper cam edge $94^f$ just below the path of swing of the arcuate cam edge $107^a$ of the driver plate 107, thus freeing the latter and also signal lever 32 for a subsequent manual actuation. But it will be seen that the signalling lever 32 is thus made free only after the gear train has been halted and locked, and hence only after the completion of the transmission by the code wheel 78 and switch actuator 79 of the coded alarm signal or signals.

Provision is made to insure easy determination of stoppage of the gear train at a relatively precise point in relation to other parts. If the stop pin 90 on the large gear 87 were to be initially fixed to it at a given single position in its side face, assembly of the gear train and coacting parts could be a tedious, trying, time-consuming cut-and-try procedure even if all the gears and pinions that are paired or mesh were initially to be marked or indexed to indicate the points at which they are to be interengaged in assembly. Even with such indications, an error of one tooth in assembling the gears could and would make a material difference in relation of the point at which the gear train is stopped to the action of other parts in relation to the stop part 91 of the rock lever 92; for example, an error in one direction would advance the actuation of the rock lever 92, and an error in opposite direction would delay it. Also, it is difficult in that manner to corelate the driver plate 107 with the rock lever 92 and the roller stud 102 with the cam 101. Correction of any errors becomes a troublesome and costly matter of disassembly and cut-and-try reassembly, disadvantages which are multiplied when such coding mechanisms and gear trains are manufactured and assembled in substantial quantities.

Large gear 87, which illustratively makes six revolutions for one-sixth of a revolution of the spring-driven motor shaft 61 where the ratchet 70 is provided with six ratchet teeth, is provided with the above-described series of equidistantly spaced holes 88, illustratively eight in number, into any one of which the stop pin 90 may be inserted by its shank $90^a$ and held in place by placing a split spring washer $90^c$ onto the projecting part of the shank which is provided with the groove $90^b$ to receive the washer. With this arrangment the gear train may be assembled without material regard to the peripheral points at which any two mating gears mesh, and thus assembly of any one code mechanism and of many of them in quantity production may be readily achieved and with facility, leaving only the matter of selection of one of the holes 88 in which to set the stop pin 90, in the manner about to be described.

Accordingly, before setting the stop pin 90, spring 64 of the spring motor is partially wound or tightened in order to pre-tension it so that thereafter any subsequent winding thereof winds it more and stores still more energy into it; thereby it is also made certain that the spring is never completely run down and is always sufficiently tensioned to complete the drive of the code wheel 78 whether that is one, two, three, or four revolutions in the illustrative embodiment herein set forth.

Having so pre-tensioned the spring, the gear train is allowed to run under suitable manual control, as by applying a finger to large gear 87 (Figure 13) to function like a brake; at the same time, spring-driven shaft 61 also drives the gear sector 103 slowly, moving the roller stud 102 thereon toward its home position. Stud 102 engages the cam face 101, and starts depressing that end of the rock lever 92 and raising the opposite end that has the stop 91, as above described. Home position of gear sector 103 and its roller stud 102 is determined by the point at which rock lever 92 halts the gear train, and since the latter portion of lever movement is rapid and substantial (to project stop 91 into the path of pin 90), gear train stoppage can take place at varying angles of tilt (throughout this latter portion) of the rock lever 92 and hence at various positions of elevation (as seen in Figure 13) of lever parts $94^f$ and $94^g$ in relation to the arcuate cam edge $107^a$ of driver plate 107; if part $94^f$ is too high, edge $94^h$ blocks subsequent actuating movement of driver plate 107 by the hand lever 32, and if too low, arcuate cam edge $107^a$ of driver plate 107 cannot effectively prevent spring 100 from tilting lever 92 and from prematurely releasing the gear train by disengaging stop 91 from stop pin 90 on gear 87 when hand lever 32 is swung to move gear sector 103 and thus remove roller stud 102 from pressing against the cam 101. Also, if lever part $94^g$ is too low, leading edge $107^b$ of driver plate 107 could by-pass it and lever 32 could be actuated before completion of a signal transmission and thus garble and interfere with the signal. Accordingly, gear-train stoppage has to be effected at a point in the return motion of roller stud 102 where actuation by it of lever structure 92 is at an angle to position its above parts (such as parts $94^f$ and $94^g$) where they cannot disrupt intended coaction of the parts.

Therefore, while braking the large gear 87 with a finger as above described, and just at the moment that roller stud 102 effects depression of the part $94^h$ to just release the driver plate 107 by disengagement from its leading edge face $107^b$ so that swing of plate 107 just carries the edge $107^a$ over the lever edge or part $94^f$ with slight clearance, the gear 87 is stopped; hook-shaped stop member 91 on rock lever 92 is by then, of course, projected upwardly. Thereupon the stop pin 90 is inserted into that hole 88 that is nearest to the hook-shaped stop member 91 which is substantially at the six o'clock position, and it is secured in place by applying the split washer $90^c$. At this stage, bushing 89 on which code wheel 78 is mounted, is checked as to its setting and, with code wheel 78 thereon, it may be manually rotated to bring the gap $78^c$ midway over switch actuator 79, and set screws 81 then tightened to lock it.

Because of the high gear ratio, on the order of 1 to 100, between shaft 61 and large gear 87, this setting is accomplished with great precision; even if, when selecting the nearest desired hole 88, the large gear 87 is moved in one direction or the other by an angular movement greater or less than the angle subtended between two successive holes, great accuracy of setting follows. If there are eight holes in the large gear 87, the precision of setting within such an angle is as 1 is to 100 multiplied by 8, or in the ratio of about 1 to 800. Moreover, by manually rotating the large gear 87 and then setting the pin 90 in gear 87 in the hole 88 nearest the six o'clock position, any desired clearance as between parts $94^h$ and $107^a$ may be achieved easily, quickly, and precisely.

Moreover, should accidental wear ultimately introduce an element of detrimental lost motion or introduce a divergence of timing such as might occur due to wear between the gear sector stud 102 and the cam edge 101, precision of resetting is quickly accomplished to compensate for any such lost motion, for all that need be done is to remove the stop stud 90 from its hole 88 in the large gear 87 and reset it with respect to a different hole 88 selected in the manner above described and as will now be clear.

Also, any unavoidable departures from exact duplication of similar parts in quantity production and assembly present no difficulties, for, by the above features, each assembly is speedily set and such departures easily compensated for.

The mechanism above described actuates a number of other coacting parts, and among these is a speed governor for the spring motor to make certain that the spaced teeth in the code wheel 78 are rotated at uniform angular velocity so that, in turn, the signals controlled thereby, particularly where they are audible signals, are faithfully reproduced as to length, as well as length of spacing intervals therebetween to correspond to the configuration of the code wheel 78 which is illustratively shown in Figure 17 as cut to transmit the signal number 3-5-2. According to the invention described herein, the governor is constructed to be readily set to change the controlled speed of the motor within a wide range, in order that the same spring motor and gear train with code wheel shaft 77 can be made to meet a wide range of practical requirements. For example, where the code wheel, through the switch contacts (later described), controls the actuation of a remote alarm signal in the form of a single-stroke gong, the time interval between successive strokes of the gong can be relatively short and, accordingly, code wheel 78 should be rotated at a relatively high speed, for example, at a speed such that it makes a single revolution in five or six seconds, within which time the station number or signal is and can be transmitted; on the other hand, where the remote alarm device is of a slow-acting type, such as, for example, a motor-driven siren, the time interval between blasts of the siren has to be relatively long to allow for deceleration of the driving motor and for subsequent acceleration, and in such case the drive of the code wheel 78 has to be very slow, such as, for example, on the order of one revolution in thirty or more seconds. The code transmitting mechanism, accordingly, embodies a compact and efficient speed governor capable of ease and speed of adjustment or setting to change the controlled rate of drive of the gear train by the spring 64 and, hence, to change the rate of drive of the code wheel shaft 77 and of the code wheel carried by it.

Preferably, the speed governor is constructed as a compact sub-assembly or sub-unit that can be easily assembled to the gear-train mechanism and, once assembled, is freely and conveniently accessible for speedy and facile change of its setting. In Figure 22 is shown, as above described, the mounting of the large gear 87 with its pinion 85, the two being attached to and rotatably carried on the stud shaft 86 carried by the frame plate 47; stud shaft 86 has a tapered pivot end $86^c$ that points towards the opposite frame plate 48, and intermediate of the pivot part $86^c$ and the straight part of the stud 86, the latter has a peripheral groove $86^e$ to receive a split or slotted washer 120 to hold the gear unit 85—87 against axial shift.

In the frame plate 48, directly opposite the stud shaft 86 and in axial alignment therewith, is a threaded hole 121 that receives a pivot screw 122, with its tapered pivot bearing part $122^a$ projecting toward the pivot part $86^c$ of the stud shaft 86. Interposed between the outer face of frame plate 48 and the head of screw 122 is a spring washer 123 that exerts axial pressure on the screw head to maintain the screw against turning out of its adjusted position, aided by a suitably tight fit of the threads of the screw in the threaded hole 12.

These opposed and aligned pivot bearings $86^c$ and $122^a$ rotatively support the governor unit, which is generally indicated as a whole by the reference character 124, the unit fitting within the narrow space between the plane of the large gear 87 and the inner face of the frame plate 48. The unit comprises a shaft 125 conically recessed at its ends for receiving the bearing pivots $86^c$ and $122^a$; at its left-hand end as seen in Figure 22, the shaft 125 has secured or press-fitted onto it a pinion 126 for driving the shaft 125 and the parts carried by it, preferably by a large gear 127 which meshes with the pinion 126. The large gear 127 is mounted on a hub or sleeve extension of a pinion 130 (Figures 15 and 19) which is freely rotatable on the code-wheel shaft 77; a press-fitted collar 128 holds gear 127 assembled to the hub of pinion 130 which meshes with the above-described large gear 87. As above noted, large gear 87 rotates at a substantial rate of speed and through the just-described gearing, it drives the governor pinion 126 and shaft 125 at a still higher speed.

To the right of pinion 126 as seen in Figure 22, shaft 125 has a larger-diameter portion that is threaded, indicated at 131, which, with the cylindrical right-end portion of the shaft 125, coacts to carry a cylindrical bushing 133 of substantial axial extent. At its left-hand end bushing 133 is counterbored at greater axial length than threaded shaft part 131 and to larger diameter, where it is internally threaded to match the threads on the shaft part 131; the remainder and smaller-diameter part of the bushing neatly fits the shaft 125 for sliding movement relative thereto.

At its right-hand end the hub or bushing 133 is turned down to form a step 134 that provides a cylindrical seat for three parts provided with corresponding holes to snugly fit onto the stepped part 134, one after the other.

One of these parts comprises an elongated plate 136, somewhat rectangular in shape (see Figure 18) which, at its outer ends, has open-ended wide slots 137 and 138. The plate part 136 can be in the form of a stamping and it is proportioned to be symmetrical about its vertical and horizontal center lines and thus to be in good dynamic balance with respect to the axis of a central hole therein by which it fits onto the stepped part 134 and is made to be coaxial with the governor shaft 125. It thus forms two oppositely extending arms.

The next part comprises a flat spring 140 (Figure 18) of relatively thin flat spring stock, provided at its center with a hole to fit over the step 134 and provided at its outer ends with holes $140^a$ and $140^b$ equidistantly spaced from the axis of its center hole. Spring member 140 is also symmetrically constructed for good dynamic balance relative to its transverse central axis.

In the holes $140^a$ and $140^b$ are secured flyweights 141 and 142 which are so shaped and so secured to the spring member 140 that their respective centers of mass fall in a plane considerably displaced, along the axis of the governor shaft 125, from the plane of the normally flat spring member 140 when the parts are in at-rest position. Flyweights 141 and 142, identically constructed, are conveniently in the form of headed solid cylinders of metal, turned with a suitable step at their right-hand ends as seen in Figure 22 for reception into the holes $140^a$ and $140^b$, whence the slightly projecting end portions thereof may be expanded in any suitable manner to simulate heading over or riveting and thus secure the equal flyweights at the respective ends of the flat spring 140 and equidistantly from its axis.

At their ends nearest the flat spring 140, the flyweights are recessed or counterbored to receive a cylindrical plug of suitable non-metallic material such as leather, as indicated at 143 and 144, the latter presenting slightly rounded-over end faces equidistantly spaced from the inner face of the frame plate 48.

The relatively large shank portions of the flyweights 141 and 142 pass freely through the slots 137 and 138 in the cross-plate 136, the arms of which are offset, as during the stamping process, from the center or hub portion of the plate 136 so that the normal at-rest position of the flat spring 140 is in a plane slightly spaced away from the adjacent faces of the arms of the cross-plate 136. The two parts 136 and 140 are clamped in these relative positions onto the stepped part 134 of the bushing 133 by means of a washer 145 against which the outer peripheral portions of the bushing 133 are headed over, as by pressing, spinning, or the like. In the hub of bushing 133, to the right of its internally-threaded part 131, is a set-screw 148 by which the bushing and parts carried thereby are locked to the shaft 125 to rotate therewith.

This small and compact governor sub-unit is thus easily mounted and positioned on the pivot bearings $86^c$ and $122^a$ by simply backing off the screw 122, putting the sub-assembly with its shaft 125 in line with the pivots and advancing the screw 122 sufficiently to give the sub-unit free and easy rotary support free from play. During handling of the sub-unit, and also otherwise, the cross-plate 136 protects the relatively light flat spring 140 against accidental distortion, backing up the two arms of the spring against forced bending to the left in Figure 22, while the headed ends of the flyweights 141—142, which cannot pass through the slots 137 and 138, prevent bending of the flat spring 140 beyond the relatively small angle that brings the headed ends into engagement with the ends of the rigid cross-plate 136. Thus, over-straining of the spring 140 is nicely guarded against, both in handling and in use of the governor structure.

As the governor 124 is rotated under the drive of the gear train, the flyweights 141—142 exert centrifugal forces, each through its center of mass. The centers of mass are displaced considerably from the point of support of the flyweights in the plane of the flat spring 140 and the rotational forces tend to move them outwardly, creating a bending stress or force on each end of the flat spring 140 that acts through a moment arm commensurate with the above-mentioned displacement of the center of mass; the result of this action is that each arm of the flat spring 140 is bent in a direction to bring the leather plug nearer and nearer to, and finally into engagement with, the frame plate 48, as the speed increases. Pressure of engagement increases with speed. Braking thus results to slow the speed of the governor and gear train; any tendency to overbrake and to reduce the speed too greatly, results in lessening the pressure by which the leather plugs are forced against the frame plate. Thus, constancy of speed of rotation is controlled or regulated, and the entire gear train and code wheel thus made always to operate at a constant speed.

The standard at which substantial constancy of speed of drive of the gear train is maintained, is easily and quickly determinable and set, for with the above-described governor construction, all that need be done is to loosen the set-screw 148 (Figure 22) and then manually shift the bushing 133 lengthwise of the shaft 125 in order to change the spacing, in at-rest position, between the leather plugs 143—144 and the frame plate 48; this is achievable very simply and with great precision, due to the threaded connection between the bushing 133 and the threaded part 131 of shaft 125, whereby the bushing 133, when manually swung about the shaft 125 as an axis, the shaft being held against rotation because of its gear connection with the locked gear train, and as a result the bushing 133, with the parts carried thereby, is shifted toward or away from the end plate 48, depending upon the direction in which these parts are manually rotated. The cross-plate 136, with its ends or corners rounded over (Figure 18), serves as a convenient finger piece for so swinging the structure about the shaft 125 to the desired extent, and it thus also protects the flat spring 140 during such adjustment of the governor. It is also used to hold the parts as the set-screw 148 is tightened up to fix the selected setting.

The threaded connection makes certain that the adjustment is positive and precise, and the operator making the adjustment need only bear in mind that the setting he seeks, within the available limits, is a direct function of the number of degrees through which the flyweight-carrying structure is manually swung, as above described. In the position shown in Figure 22, the device is shown with maximum spacing of the friction plugs 143—144 from the frame plate 48; that is a setting for the highest standard of speed constancy, which may be on the order of 2800 R. P. M. As the structure is shifted toward the right relative to shaft 125, this standard of control is progressively lowered, and may be as low as 400 R. P. M. These figures ase illustrative, but they show that the signal transmitting mechanism may be suited within a wide range of requirements. For example, one requirement might be that the code wheel transmit its signal in five seconds, meaning that it should make one revolution in five seconds; for that, the governor structure is set appropriately at or near its highest standard of control of speed constancy. Another requirement might call for completion of the signal in thirty-five seconds, meaning that the code wheel makes one revolution in thirty-five seconds, and for that requirement the governor is set at or near its lowest standard of control, a standard about one-seventh of the standard for sending a signal in five seconds.

The just described governor construction is disclosed and claimed per se in copending application of James E. Russo, Serial No. 171,671, filed July 1, 1950.

The above-described unit mechanism or sub-assembly (Figures 12–19) includes other devices, according to the variety and kind of requirements to be met, which are preferably assembled to it before the entire unit is set into and secured to the walls of the well in the front casing part C. One of these devices comprises a code-signalling-circuit switch that is operated by the code wheel 78; depending upon the type of circuit and other requirements, it embodies various elements, and for that purpose is preferably made up of suitably stacked alternating spring contacts and insulating elements, and for present purposes it is simply designated generally by the reference character SP (Figure 17 and Figures 2, 3, and 4), spring contacts and insulating sheets being piled up and clamped to an L-shaped bracket 151 which is secured by screws to the frame plate 48, one of the springs being provided with a tongue 152 which is positioned in the path of movement of the teeth of the code wheel 78 and is at about the mid-point of the gap $78^a$ (Figures 17 and 20) in the code wheel when the latter is in at-rest position. Whatever the requirement, a corresponding code switch SP is made up and so assembled to the unit mechanism as just described.

Certain test operations are frequently required; for one of these, provision is made, once access to the interior of the signalling station has been gained, as later described, to set the mechanism into action without having to pull the alarm lever 32; accordingly, and as better shown in Figures 15 and 16, the shaft 61, which has to be turned to store energy in the spring 64 (Figure 18), is extended beyond frame plate 47 where it has secured to it gear 153 which meshes with a larger gear 158 that is rotatably mounted on a stud shaft 160 that projects outwardly from the frame plate 47, the latter having a suitable hole therein to receive a reduced portion or shoulder of the stud 160 which is secured in place by heading it over on the inside face of the plate 47. The large gear 158 has a large hub $158^a$ which is closed at its outer end, as at $158^b$ (see Figure 12), and in this outer end is a rectangular slot 161 to receive a handled key so that the large gear 158 can be turned by hand.

Gear 158 is simply slid onto the outer reduced part of the stud shaft 160 and is held against coming off the shaft by an end disk 154 that abuts against the outer end face of smaller gear 153 and overlaps the sides of the teeth of gear 158 (Figures 12 and 16). Assembly of the parts 153—154, fixed to shaft 61, is completed by a nut 155. How the gear train is thus manipulated by a key in the slot 161, in coaction with other parts, is later described.

Mounted on the outside face of frame plate 47, to the left as seen in Figures 2 and 16, and as is better shown in Figure 12, is another pile-up switch assembly, also made up of stacked contact springs and insulating plates, and for present purposes it is simply designated generally by the reference character TP, comprising an L-shaped bracket 163 to which the pile is clamped by screws and by which the sub-assembly is secured to frame plate 47 by suitable screws. It may embody various combinations of switch contacts, all of which are normally held in their at-rest positions but can be shifted or operated, to open or close circuits, by a heavy leaf spring 164 provided with a handle or knob 165 so that it can be manually actuated. As mounted on the frame plate 47, in Figure 12, the handle 165 projects substantially beyond the left-hand end of the unit mechanism, so that when the complete installation is opened up as seen in Figures 2, 3, and 4, the handle 165 projects well above the mechanism, and when the apparatus is faced by the observer as seen in Figure 2, appears uppermost and at the left. Recurring to Figure 12, the sub-assembly or pile-up switch TP is given a position so that the free ends of its contact springs overlie the outwardly projecting arm $94^b$ of the rock lever 92, the arm being surrounded by the insulating sleeve 97 as above described. Embodied in the pile-up structure TP, and for convenience constructed therewith as a unit, is a pair of switch contact springs generally designated by the reference character NI; these are spaced downwardly, as viewed in Figure 12, from the spring contacts of the switch TP so that they can be actuated independently of the latter; the switch contacts of the switch NI are normally open and the lowermost overlie the insulated operating arm $94^b$—97 of the gear train mechanism.

Switch NI is a non-interfering control and is connected to shunt out the remaining local alarm signal stations with which any given station is in closed series circuit, thus to give the station that is first actuated complete control of the signal transmission and without interference with the latter by actuation of a near-by station.

Accordingly, when the lever 32 is pulled to initiate the transmission of the coded alarm signal as above described, with actual signal transmission commencing only after the lever 32 is released and driver plate 107 (Figure 13) restored to home position, so that spring 100 rocks the rock lever 92 to release the gear train by disengagement of stop 91 from gear pin 90 (Figure 18), that same shifting of the rock lever 92 moves insulated rock-lever arm 97 downwardly in Figures 13 and 12 to close the switch NI, and thus to shunt out the above-mentioned other signalling stations. Because of the coaction of the cam parts of driver plate 107 and the parts $94^f$, $94^c$ and $94^g$ of the lever (Figure 13), the non-interfering switch NI cannot be actuated until the code wheel 78 is actually set in motion to transmit the coded signal, and the very moment at which the drive of the code wheel 78 is halted by the coaction of the roller stud 102 with the rock lever 92 at the cam edge 101, the insulated switch arm 97 is tripped in reverse direction and the other stations are immediately restored to the circuit.

Again, depending upon the system requirements, it is necessary sometimes to provide a switch that is connected through suitable circuits to a municipal alarm box or station, or to a local station visual or other source-identifying signal mechanism, illustratively an annunciator, to indicate the source of the alarm without having to wait out the transmission of the coded signal. Accordingly, a switch generally designated by the reference character MA (Figure 17) is provided and illustratively it comprises two normally open spring contacts built into and as part of the pile-up that comprises the code-wheel-operated switch assembly SP. As is better shown in Figure 17, switch MA is remote from the code wheel 78 and is positioned adjacent the pin 170, insulated by a sleeve 171, carried on the end of a crank arm 172 that is secured to the outer end of a shaft 137 carried in suitable bearing holes in the frame plates 47—48 (see Figure 15).

As is better shown in Figures 13 and 18, shaft 173, intermediate of the frame plates 47—48, has secured to it a block 174, adjustably, as by the set-screw 175, and at the lower end of the block 174 (Figure 13) there is secured an operating arm 176 made of any suitable flat sheet-metal stock and of a length to project beyond the ends of the frame plates 47—48 and into the dished portion $40^b$ of the mounting plate 40. A spring 177 (Figure 15) about shaft 173 biases shaft 173 and hence also arm 176 and arm 172 in counter-clockwise direction in Figures 17 and 18, the engagement of block 174 with frame stud 51 limiting that biasing action and thus switch MA is held unactuated. Lever arm 176 has a V-shaped bend $176^a$, whose inclined under-surfaces serve as a cam follower with respect to the upwardly projecting inverted V-shaped parts $108^c$ formed on the parallel links $108^a$ and $108^b$ of the linkage 108 that connects driver plate 107 to the operating hand lever 32.

The normal or at-rest positions of these parts are substantially as shown in Figure 13. The cam follower bend $176^a$ stands depressed in the path of movement toward the right, in Figure 13, of the cam humps $108^c$ on the linkage 108, but the length of lever arm 176 is such that lever 32 has to be pulled and swung by an amount at least equal to that necessary for one ratchet tooth of the ratchet wheel 70 on the spring winding shaft 61 to completely by-pass the stationary pawl 71, that amount of movement, as earlier above explained, being necessary before release of the signal lever will accomplish coded signal transmission of one round.

Accordingly, the moment that the lever 32 has been actuated sufficiently to insure the subsequent transmission of at least one coded signal, the cams $108^c$ actuate the lever arm 176 to swing the shaft 173, which, through its insulated crank pin 170—171, actuates the switch MA, which immediately results in the actuation of the illustrative annunciator located at an appropriate remote point. Even though cams $108^c$ pass beyond the spring-biased cam follower $176^a$ as pull of lever 32 continues, so that switch MA is restored to normal, the switch MA has been actuated, nevertheless, even if only momentarily, and that suffices to trip the desired relays or other electro-responsive devices at the remote point. On the return to home position of the lever 32, cams 108$^c$ again actuate the lever arm 176 and switch MA is again momentarily actuated; such repetition can serve as an added precaution and gives the remote responding device a second opportunity to respond should it have failed on the first.

Aside from the simplest form of signal switch SP for the coded wheel 78, the sub-assembly M (Figures 2, 3, and 4) can thus comprise as many as desired or required of these coacting switch structures, at least some of which may in turn take various forms according to the type or types of alarm systems with which they are to be associated, and this composite sub-assembly M, as earlier above described, is assembled to the casing part C with the peripheral portions of the mounting plate 40 resting within the upstanding rib 27 (Figure 5) and against the ledge of the walls of the well 26, being secured thereto by screws for ready detachability if necessary. It is so assembled to the casing part C after the handle 32, from which project the ends of the shaft or pivot pin 33 (Figure 11), is put in place with its shaft ends seated in the recesses 26$^e$ and 26$^f$ which are open-ended inwardly of the casing part C and which are closed off, to complete the pivotal bearings for the shaft ends, by the entry into them of the studs 41 and 42 that project from the mounting plate 40, as earlier above described. This sub-assembly M, thus projecting rearwardly from the inside face of the casing part C, is now closed over by a box-like casing 180 (see Figures 23 and 24) which is preferably made of any suitable transparent material, preferably a plastic so as not to be fragile. It is preferably cast, molded, and cured in one piece and comprises a flat top wall 181 and four side walls 180$^a$, 180$^b$, 180$^c$, and 180$^d$, the latter dimensioned freely but snugly to encompass the unit mechanism M and at their ends to be received snugly about the upstanding rib 27 in the upper ends of the walls of the well 26, the latter being appropriately grooved or rabbeted, as indicated at 26$^g$ (Figures 5 and 9), to form a substantially continuous seat for the continuous edge of the casing side walls. In side wall 180$^d$ is an aperture 180$^e$ that becomes juxtaposed of the slot 161 in the hub of gear 158 (Figure 12), so that a key may be inserted through the casing wall and into the winding slot.

The upstanding handle 165 of the test switch assembly TP projects through an aperture 181$^a$ formed in a depressed portion 181$^b$ (Figures 23 and 24) formed in the top wall 181, so that the manual switch TP may be operated from the exterior of the casing or cover 180, and with the location of lever 165 closely adjacent one of the side walls of the transparent casing 180, the remaining and large flat area of the top wall 181 is utilized to imprint, in any suitable manner, full instructions typified by those appearing illustratively in Figure 23. Those instructions, of course, will vary according to what switch devices and the like are assembled as part of the unit mechanism M to meet particular requirements.

The top wall 181 is provided with suitable holes 181$^c$ and 181$^d$ which register with holes in ears 48$^a$ and 47$^a$, respectively, that bend over at right angles from the plates 48 and 47, and against which the top wall 181 rests, with screws threaded into the ears detachably holding cover 181 in place.

With the parallel links 108$^a$ and 108$^b$ projecting through the slot 45 in the mounting plate 40 and toward the lever 32, the pivotal connection of the free ends of the links to the ears 32$^c$ and 32$^e$ on the inside face of the lever 32 is completed by an appropriate pin, whereupon spring 111 (Figure 13) can act, as above described, through the driver plate 107 in linkage 108, to hold the plate-like lever 32 flush with the front face of the casing part C and in position to close over the well aperture 26 and partially close the hand hole H. The wall 26$^a$ of the well 26 (Figures 5 and 9) has an inclined face 28$^c$ that forms one of the boundaries of the hand hole H, being the lower wall face when casing part C is in upright closing position as in Figure 1, and in that position foreign matter cannot accumulate in the hand hole.

Lever 32, plate-like in form (Figures 10 and 11), closes all but the upper portion of the hand hole as seen in Figure 1, so that the fingers of the hand can be easily inserted behind the lever to pull it out, and just above the front edge of the inclined wall face 28$^c$, lever 32 has a transverse rectangular aperture 32$^g$ along and from the bottom edge of which (as seen from the right in Figures 10 and 11) there is an inwardly extending wall 32$^h$ which is inclined and which, when lever 32 is in closed or home position, overlies the inclined wall face 28$^c$ of the hand hole H and forms a false bottom therefor so that any foreign matter maliciously or otherwise injected into the hand hole H simply falls out of the downwardly and outwardly inclined false bottom 32$^h$ and rolls or flows out through the transverse aperture 32$^g$. This action is aided by integrally-formed triangularly-shaped side walls 32$^i$ and 32$^j$ which extend inwardly from the upper sides of the plate-like lever 32 and in closed position of the latter may rest closely adjacent the plane side walls of the hand hole H; being integrally cast with the other parts, these side walls also materially strengthen and reinforce the lever structure. Moreover, there is thus formed a protective pocket at the internal upper end of the lever so that the fingers of the hand in pulling the lever are protected against scraping against the walls of the hand hole H.

For some installations it is desirable to provide deterrents against tampering and also a corresponding tell-tale signal, and in such case provision is made for easily modifying the outer casing sub-assembly C and also the sub-assembly L comprising the lever 32, as above described, and these provisions include the mounting of a member made up of an appropriately frangible material such as glass, for co-action with the lever and front casing part. This frangible member is preferably made up in the form of a round glass rod G, shown in Figure 1 as extending crosswise and in front of the lever 32; it is longer than the width of the lever 32, and its ends are supported at the front of the casing part C, preferably by two stirrup structures 183 and 184 (Figures 1, 7, and 9).

The left-hand stirrup 183 (Figures 1 and 7) is substantially U-shaped, with one end closing wall 183$^a$, and it has two cylindrical stud extensions 183$^b$ and 183$^c$ (Figure 9) which are received through holes drilled through an appropriate ledge formed in the side wall 26$^b$ of the well 26 (Figure 7); these extensions 183$^b$ and 183$^c$ are headed over at their inner free ends, as indicated, preferably with interposed washers (Figures 7, 9, and 5), thus securing the stirrup 183 to the casing part C, with its recess flush with the plane of the side edge of the well opening in the front wall of the casing part C.

The other stirrup 184 is also U-shaped (see Figures 7a and 7b), having an end closing wall 184a and two cylindrical but longer extensions 184b and 184c, the latter having aligned notches 184f and 184g intermediate of their ends. These extensions are passed through holes drilled in the ledge formed in the well side wall 26c (see Figure 7) to position stirrup 184 in alignment with stirrup 183 and with the open ends of their recesses facing toward each other (Figure 7).

As shown in Figures 7a and 7b, the free ends of the extensions 184b and 184c are shouldered or stepped to receive washers, as shown in Figures 7 and 5, riveted in place. With the extensions of stirrup 184 of substantial length as shown, stirrup 184 may be moved outwardly (downwardly in Figure 7) to move the stirrup 184 away from the front face of casing part C until the washers abut against the ledge; this range of movement is large enough (see Figure 7) to permit one end of the glass rod G to be slid in under the stirrup 184 and between the projecting portions of the legs or extensions 184b and 184c, whereupon the other end of the glass rod is entered into the pocket or recess of the fixed stirrup 183 and up against the closing wall 183a, whence movable stirrup 184 is pushed inwardly so that it takes over that end of the glass rod, with closing wall 184a barring movement of the rod to the right.

When stirrup 184 is so restored to its normal position, the slots 184f and 184g are just above the face of the wall ledge (see Figure 7), whereupon an L-shaped locking piece 185, carried by a long pin 186 that extends slidably through a hole in the well wall 26c, is actuated to enter these aligned slots and thus hold the stirrup 184 against movement.

The long pin 186 is preferably spring-held in the above-mentioned locking position, preferably by a coil spring 187 that surrounds the free end of the pin 186, and abuts at one end against the wall 26c and at the other against a knob 188. Knob 188 is exposed interiorly of the front casing part C and hence access to it can be gained only from the inside of the casing.

Accordingly, the glass rod is easily and quickly mounted in position across the front face of the hand lever 32, the latter being held in closed or home position as above described. To the observer it appears as a physical barrier against manual movement of the lever 32, and the understanding that breakage results if the lever is pulled, acts as a deterrent to tampering. Preferably, the glass bar or rod G is held sufficiently snug against the front of the lever 32 to take up any material play in the lever mountings, even though the lever is strongly held in closed position by the spring 111 of the gear-train driver plate mechanism, as above described, and for this purpose the lever 32 is preferably provided with a lug 32k (Figures 10, 11 and 1) projecting from its front face and substantially at the mid-point of its width, and it is the lug 32k which engages the glass rod G, which does so substantially at the mid-point of the glass rod, and when the lever is to be pulled to sound in an alarm, the lug 32k can thus exert a bending and breaking stress upon the glass bar at the most efficient point in the latter relative to the spaced supports which the stirrups 183 and 184 provide. Lug 32k is preferably shaped (see Figure 10) to provide an inclined edge for contact with the glass bar and its angle of inclination, in coaction with the circular cross-section of the glass bar, gives this edge a force-multiplying action, somewhat on the principle of the wedge or inclined plane, and in effect to strain or wedge the mid-point of the glass bar downwardly as seen in Figure 1, as well as outwardly away from the face of the front casing part C. Fracture of the rod G is thus facilitated and undue desistance to pulling the lever avoided. These actions are further aided by the force-multiplying action of the lever 32 itself, since it is preferred that the lug 32k be positioned materially nearer the axis 33 of the lever 32 than is the finger-grip portion thereof at the opposite end.

The downward wedging action of the lug 32k coupled with the downward swing of the plate-like lever 32 coact to direct any pieces of the fractured rod G downwardly, and hence away from the person operating the alarm, the broad expanse of the lever 32 and its downward swing acting somewhat like a baffle or shield. Replacement of the broken glass rod G is easily and quickly accomplished once the front casing part C is swung into the horizontal position shown in Figures 2, 3, and 4, and set; the knob 188 (Figure 7) is simply pushed to the left, disengaging the part 185 from the slots, and thus releasing the stirrup 184 for manipulation above described to put in a new glass rod. Restoration of stirrup 184 to its inward position automatically enters the locked part 185 into the slots, under the action of spring 187.

Just below (to the right in Figures 10 and 11) the glass-breaking lug 32k, the plate-like lever 32 has a hole through which projects a pin 190 that is mounted for movement toward or away from the glass rod G which the front face of pin 190 normally engages tangentially; such a mounting may comprise a flat spring 191 (Figures 10 and 11) in a suitable hole in which one end of pin 190 is secured, as by heading it over. Flat spring 191 is secured flatwise against the inner face of lever 32 by a rivet 192 at one end of the spring, and hence spring 191 is biased to hold pin 190 projected beyond the front face of the lever 32, as shown in Figure 10. This bias of spring 191 is overcome, and the pin 190 is pushed and held inwardly, by the glass rod G that extends across the front of the lever 32 (Figure 1), and thus the free end of flat spring 191 is held spaced away from the inside face of lever 32 as long as the glass rod G remains in the stirrup mounting above described. In that position, flat spring 191, adjacent its free end, engages the actuator 193 of a suitable switch mechanism 194, which may be a precision snap-action switch, that is suitably secured and mounted in the space between the mechanism mounting plate 40 and the plate lever 22 (in closed position), preferably by securing it, as by screws, to the well wall 26a (Figures 9 and 5).

Accordingly, with all the parts in normal or home position, glass rod G holds the flat spring 191 pressed inwardly, and thus switch actuator 193 is held in one of its two positions; the switch 194 is connected by appropriate circuits to any remotely-positioned electro-responsive signalling device, such as an annunciator, located, for example, in a principal's or superintendent's office of a school or office building where a number of alarm stations are distributed throughout the building. Such a remote signal is immediately actuated upon the breakage of the glass rod G, whether or not the lever 32 is pulled. If the breakage results from tampering, the remote annunciator is at once actuated, identifying the location of the signal station. Should the lever be pulled an amount insufficient to transmit even a single round, the glass is broken and the switch 194 is actuated by the physical movement of the lever 32 and flat spring 191 outwardly and away from the actuator 193, and immediate remote identification of location results. In either of these cases the remote signal dictates immediate investigation. If the lever is pulled sufficiently to transmit a coded alarm signal, the breakage of the glass and the actuation of the remote signal through the switch 194 also result, and though a coded signal is transmitted, the annunciator identifies the station without having to await completion of the coded signal. In any case, the remote tell-tale signal remains actuated until the broken glass rod is restored.

As shown better in Figure 7, the adjacent faces of the glass-supporting stirrups 183 and 184 are preferably slanted or outwardly divergent at a suitable angle, as at $183^j$ and $184^j$, and adjacent the stirrups, the plate lever 32 is cut back or recessed as at $32^r$ and $32^s$, in Figure 11. In this manner, clearance is provided between each side edge of the lever 32 and its adjacent stirrup, equal to at least the thickness of the glass rod. When the glass rod is fractured, usually at or near its mid-point, the portions or fragments either easily drop out of the stirrup recesses or are tilted by the lever outwardly and forwardly into the respective clearances just described, and drop. Accordingly, a piece of the rod G cannot remain in a stirrup nor can such a piece block continued movement of the lever 32 at the side edge of the latter.

In some installations it is required to provide a key-operated switch which, when actuated by someone in authority, controls the actuation of a remote relay, usually to cause the sounding of additional or other alarm signals, such as other audible signals distributed throughout the building. In such case a switch generally indicated in Figure 5 at 195, is provided; it is carried by or secured to the inner end of an externally-threaded lock casing $196^a$ that extends through a hole $23^f$ provided in the wall 21 (Figures 3 and 5) of casing part C, being locked thereto by nut $196^b$. Externally of wall 23 there projects or is exposed the barrel 196 of the key-tumbler controlled part of the switch 195, the barrel 196 having an appropriate key slot 197 to receive the key. Desirably, this switch, while within the casing structure, is thus made operable from the exterior of the alarm station, for usually it is desired to operate it quickly as soon as the person in authority arrives at the scene and decides that additional alarms should be actuated.

The front casing part, with mechanisms and devices such as those described above assembled to it, is now assembled, as such a sub-assembly, to a wiring panel and supporting frame generally indicated by the reference character F (Figures 2, 3, 4, and 5), which preferably is an open frame, conveniently in the form of heavy sheet-metal stamping of generally rectangular shape and peripherally flanged, as at 201. As is better shown in Figures 3 and 4, the vertical side flanges are extended downwardly to form apertured ears $201^a$ (Figure 5) and $201^b$ (Figures 3 and 4) which just fit in between the side walls 20 and 21 of the casing part C (Figure 5) closely adjacent the rear wall 22 which has integrally formed therewith, and spaced from the joining side walls 20 and 21 thereof, lugs 202 and 203 (Figures 5, 7, 8, and 9), the latter being apertured, as are also the side walls 20 and 21, to take the pivot pins that pass through the holes in the frame lugs $201^a$ and $201^b$. Thus the frame F and sub-assembly or casing part C are hingedly connected together about a horizontal axis and frame F becomes peripherally encompassed by the four side walls 20, 22, 21, and 23 of the casing part C into which the frame F just fits when the two parts are swung together.

Frame F, as is later described, is secured in upright or vertical position, with the axis of pivotal connection at its lower end and horizontal end means are provided to limit the extent of swing of the casing part C downwardly and away from the vertically supported frame F. Such means preferably comprises a pair of pivotally connected links 205 (Figures 2, 3, 4, and 5), one of which is pivotally connected to a lug $201^c$ that is struck up out of the frame F, and the other of which is pivotally connected by a pin 206 mounted in aligned holes in a boss $21^a$ formed in the casing side wall 21 and a lug $24^a$ formed integrally with and on the inside face of the front casing wall 24 (Figures 5, 7, and 8); these links permit downward and outward swing of the casing part C with the elements assembled to it, through an angle of just about 90° (see Figures 3 and 4). The upper link preferably has a slot $205^a$ through which passes the headed pin 207 secured to frame lug $201^c$ and it also has an extension $205^b$ (Figures 3 and 4) shaped about as indicated and adapted to contact and ride along the front face of frame just above the hole out of which the lug $201^c$ is pressed (see Figure 27). When casing part C (Figures 3 and 4) is pushed upwardly, upper link 205 rides along pin 207 via the slot $205^a$, its end edge engages the frame F and cams or levers the links in counter-clockwise direction and insures that the two links 205 fold inwardly, not outwardly.

With frame F thus assembled to the above-described sub-assembly, the appropriate parts of the latter are wired, by suitable insulated conductors to a terminal block carried by the frame F, so that circuit connections to the signalling system may be readily made. The number of signalling circuit conductors to which connection has to be made at the signalling station depends upon various factors, such as the type of system or circuit and the particular requirement as to what circuit controlling devices, in addition to the code-wheel-actuated signal switch SP, that have to be incorporated into the sub-assembly C. The minimum number of circuit conductors for connection into the system is two and, illustratively, the maximum number may be as high as eight, and the latter number is here adopted, for convenience in description, to illustrate such a maximum number.

Referring to Figures 25 and 26, there is made, out of suitable insulating material and preferably by molding out of Bakelite, a long bar 210, generally rectangular in cross-section excepting that at regular intervals it has upstanding from one face thereof transverse ribs 211 of substantial height and which ultimately serve as barriers, and they will be so referred to. Between successive barriers, holes are molded in the bar stock 210, one hole for each interval between successive barriers 22 and between the endmost barriers and the respective end faces of the bar stock itself; these holes are staggered, as shown in Figure 25, so that they form upper and lower straight-line series of holes. The holes of the upper series are indicated at 212, and those of the lower series at 213. All the holes are the same. As is well indicated in Figures 25 and 26, the upper half of each hole is hexagonal in cross-section, and the lower half is circular in cross-section. From such non-conductive molded bar stock, terminal connecting blocks are made up according to the needs of the particular installation, and the frame F is constructed to coact with whatever length of terminal block is thus made up.

As is better shown in Figures 27 and 28, the frame F is cut or stamped to provide two arms or brackets 214 and 215 that extend toward each other and are bent at their fixed ends so that they lie in a plane forwardly of the front face of the frame F. The left bracket 214 is provided with a series of holes 216, and the like bracket 215 has a series of holes 217; the holes 216 and 217 are displaced vertically by the same amount that the holes 213 and 212 of the insulating bar stock of Figure 25 are displaced, and the spacing of the holes 216 and 217 horizontally, in Figure 27, is the same as the horizontal spacing between the holes 213—212, 213—212, etc., of Figure 25. The gap between the adjacent free ends of the brackets 214 and 215 is equal to the length of so much of the bar 210 of Figure 25 as includes three barrier ribs 211.

On the back face of brackets 214, 215 (Figure 27) the brackets are scored transversely of their length and midway between successive holes 216 in bracket 214 and holes 217 in bracket 215, as indicated by the scoring 218 for bracket 214 and the scoring 219 for bracket 215.

If the installation requires only two terminal connectors, the bar 210 of Figures 25 and 26 is sawed off along the line C—C and the cut is made thick enough to remove the barrier rib on the line C—C, thus providing a block 210ª that has four holes and three barrier ribs, as shown in Figures 29 and 30.

If the installation requires eight terminal connectors, the insulating bar 210 of Figures 25 and 26 is cut off to include ten holes and nine barrier ribs, and if it has already been cut off along the line C—C, the next cut is along the line F—F, thus providing a length of block 210ᵇ as shown in Figures 31 and 32.

Into all of the holes of blocks 210ª and 210ᵇ there is now inserted an internally threaded bushing 220 (Figure 33) having an upper hexagonal part 220ª to fit the hexagonal portions of the holes 212 and 213, and having a sleeve part 220ᵇ that fits the cylindrical portion of these holes and projects beyond the face of the block. At the end holes in the blocks 210ª and 210ᵇ, the sleeve ends 220ᵇ of the inserted bushings are spun over, as indicated at 220ᶜ. At the intermediate holes there is slid onto the protruding sleeve ends 220ᵇ a terminal connector 221 and then the protruding sleeve end is spun over, as indicated at 220ᶠ. Into the bushings 220 that intervene the barriers 211 there are now threaded connector screws 222, so that the conductors may be secured on the front face and between successive barriers 211. In like manner, terminal or connector blocks of different lengths, and hence with different numbers of connecting devices, may be prepared.

The 2-connector block 210ª is now assembled to the brackets 214, 215 by bridging it across the free ends of the brackets, with the end areas thereof resting against the rear faces of the brackets, as shown in Figures 34 and 35, the connecting screws 222, vertically displaced, being exposed forwardly of the frame F and with the three barriers 211 projecting forwardly beyond the plane of the brackets 214 and 215; it is secured in place by screws 225 that are passed through the endmost holes 216 and 217 in the brackets and threaded into the bushings at the respective ends of the block 210ª, these bushings being devoid of connector tabs (see Figure 30). The gap between the free ends of brackets 214 and 215 is just sufficient to accommodate the block with three ribs and two intervening connectors.

Where the required number of connectors is greater than two, illustratively the eight connectors of the terminal block 210ᵇ of Figures 31 and 32, the gap between the free ends of the brackets 214 and 215 is widened by breaking off appropriate portions at the scoring 217 and 218 (Figure 28), and in Figures 36 and 37, bracket arms 214 and 215 are shown broken off or shortened to accommodate therebetween the nine spaced ribs with the intervening eight connectors; in that case, one hole 216 in bracket 214 and one hole 217 in bracket 215 remain to overlie the ribless end portions of the block 210ᵇ (Figures 36 and 37) and they become aligned with the correspondingly staggered connector-less bushings in the end portions of the block 210ᵇ, so that the latter can be secured by screws threaded into these end bushings. Were the connector block to have six terminal connectors, two scored sections of each of the brackets 214, 215 of Figure 27 would be broken off, and in like manner the bracket lengths are thus determined for whatever the terminal connector requirement may be.

The various conductors that are connected to the switch mechanisms assembled to the hinged or movable casing part C, as above described, are bunched together and may be taped or held together by an appropriate length of flexible sleeving of insulating material so as to form, in effect, a cable. Such bunched conductors emerge from the mechanism inside of the transparent cover 180 by way of a slot 180ᶠ (Figure 24) in the side wall 180ᵈ of the casing 180, the slot matching the curved cutaway portion 27ª (Figures 9 and 5) in the upstanding rib 27 about which the casing walls seat. From that point on, the bunched conductors, with any such others as may otherwise be needed, are simply run rearwardly, as viewed in Figure 5, toward the hinged connection of the casing part C with the frame F, whence they are passed through a hole 226 (Figure 27) provided in the wide left-hand portion of the frame F, so that they can run upwardly on the rear face of that part of the frame, being somewhat pocketed between the side flange of the casing and a rearwardly-bent flange part 227 of the frame. The conductors are thus led to one end of the rear face of the connector block that extends crosswise of the open frame F, as above described, whence the conductors are fanned out to either side on a line that runs midway of the staggered connector tabs 221 (see Figures 30 and 32) to which they are respectively connected by bending and soldering. Thus, the cable or bunched conductors are neatly compacted and concealed behind the frame F, leaving only the connecting screws 222 (Figures 34 and 37), with their intervening ribs or barriers 211 forwardly exposed and accessible for connection to the circuit conductors, and with color or number identification of the binding screws 222 with the bunched conductors, the connections are easily made.

As above noted, frame F is cut out or open at its major central portions; this open area is substantial, so that when the frame F and the casing C are swung together about the horizontal axis of pivoting, the mechanism M carried by the casing part C and covered over by the transparent cover box 180, freely passes into the opening in the frame F and a substantial part of it stands projected to the rear of the frame F. Though the terminal connector block extends crosswise of the frame F and of the opening therein, it is positioned adjacent the upper part of the frame so as not to interfere with the free movement of the covered mechanism M into or out of the frame opening, and also to coact with other features later described.

As is better shown in Figure 27, frame F is provided with four corner holes 230 and with four inclined corner slots 231 for selectively assembling the sub-assembly comprising the frame F and the horizontally-hinged casing part C and the mechanisms carried by it, all wired and connected up to the terminal block in the frame F, to the companion casing part B of Figure 3 or the companion casing part BB of Figure 4, and thus also to accommodate and close over the parts of the mechanism that project rearwardly through the frame F. These companion casing parts B and BB are also constructed to meet the standards or requirements for safe wiring installations, as by the use of conductor-carrying conduit, etc. Where the wiring is concealed or in the walls, the casing counterpart B of Figures 3 and 3ª is employed, for it is constructed to be set into a suitable recess in such a wall; and where the wiring is surface wiring, or where the signal station has to be mounted on a wall or other surface, the casing counterpart BB of Figures 4 and 4ª is employed.

The casing part B, for a recessed installation, is preferably made of heavy sheet metal and can be formed out of a sheet-metal stamping to provide a back wall 233 (Figures 3 and 3ª), opposed side walls 234 and 235, and top and bottom walls 236 and 237 which can be flanged at their ends, as indicated at 238, to provide the regions overlapping with the side walls 234 and 235 for spot welding. In length and breadth, the casing part B is materially smaller than the length and breadth of the frame F (Figure 27), so that the four-part peripheral flange 201 of the frame F can encompass the open end of the casing part B with considerable looseness. The five faces of the casing part B may also be provided with suitably located knock-outs, one of which is indicated at 240, to facilitate mechanical connection thereto of conductor-carrying conduit, etc., and also with suitable holes 239 to fasten the casing B, as by screws or nails in the recess formed in a wall indicated at W in Figure 3.

There are provided inwardly-directed ears or lugs adjacent the open end of the casing part B, as indicated at 241, illustratively four in number, and conveniently comprising cut and bent portions of the sheet metal of the side walls 234 and 235 and the top wall 236; they are provided with threaded holes, as shown in Figure 3ª. These threaded holes receive fastening screws 242 (Figure 3) that pass through the inclined slots 231 in the frame F (see Figure 27) to fasten the sub-assembly F—M—C securely to the casing counterpart B, in the relationship shown in Figure 3, in which the peripheral frame flange 201 takes over the smaller open end of the box casing B and is spaced from the walls of the latter sufficiently to abut edgewise against the finished wall surface, such as plaster or the like. The inclination of the walls 231 in the frame F permits tilting adjustment in securing the frame F in place, so that the latter stands plumb even though the inset casing part B is out of plumb. Moreover, the lugs or ears 241 (Figure 3) extend inwardly from the front edge of the casing part B, and the frame flange 201 is of sufficient length to insure that the frame F rests flatwise against the surface of the wall W, even though the box casing B projects more or less or not at all from the wall and even though its front edge is not parallel to the wall surface.

A building may thus be wired up and provided with recessed casing parts B in course of its construction, and upon completion of plastering or wall finishing, the folded-together assemblage F—M—C delivered and assembled to be installed in the box casing B, as above described, whereupon the conductors that are brought into the recessed casing B are connected to the binding screws 222 of the terminal block carried by the frame F. Each conductor is brought to its binding screw 222 between two spaced barriers 211 and, if desired, and with the staggered relation of the binding screws 222, some of the conductors can be brought over the top edge of the terminal block and the others around the bottom edge, it being noted that all these connections are made with facility on the front face of the terminal block and, hence, facing the workman.

With the circuit conductors connected to the binding post 222, the terminal block and its connections are now closed over and protected by a heavy plate-like shield 250 made of an insulating material, preferably one that is not brittle, such as heavy sheet cellulose acetate; in Figures 34 to 37 the shield 250 is shown in open position, and in Figure 2 it is shown in shielding position. In length and breadth, it is dimensioned to cover over the terminal block regardless of the selected length that the latter has, as above described.

Where the terminal block is less than the full or maximum length, as is illustrated in Figures 34 and 35 with respect to the terminal block 210ª, the shield 250 is pivotally mounted, as by a bolt 251 that passes through the outermost hole 217 in the extension 215 (see also Figure 27), and the hole in the shield 250 for the bolt 251 is in the upper right-hand corner; so that the shield 250 clears the barriers 211, the bolt has a collar 252, and under the head of the bolt is a spring washer 253 which is tensioned by the nut 254 to frictionally hold the shield 250 in whatever position it is swung about the bolt as an axis.

At its left-hand end the shield 250 has a slot 250ª to ride over the neck 255ª of a headed and shouldered bolt 255 that passes through the endmost hole 216 in the bracket 214, where it is held by a nut 256. In closed position the shield 250 is thus dependably held against being forced out of its own plane and is thus maintained in position to cover over the binding screws 222 and the conductors leading to them.

Where the terminal block is of maximum or full length, as is illustrated in Figures 36 and 37 with respect to the terminal block 210ᵇ, the shield 250 is again mounted, as above described, by means of the bolts 251 and 255 that pass, respectively, through the outermost holes 217 and 216 in the frame brackets; underlying those holes, as is better shown in Figure 37, are the endmost ribless portions of the connector block 210$^b$ and also the threaded bushings in these end portions, and accordingly these bushings provide the nuts for the bolts 251 and 255 which are threaded into them, so that the bolts or screws not only secure the terminal block in place, but also mount the shield for action and manipulation as above described.

Moreover, and in either case, the shield 250, because of the stop action of the neck 255$^a$ of the bolt 255, can be swung into open position only by movement of its left-hand end upwardly, as indicated in Figures 34 and 36, and in such position a substantial portion of the shield 250 projects beyond the upper edge of the frame F and also overlies and blocks off a horizontal slot 257 near the lower edge of the upper cross-part of the frame F (Figures 27, 34, and 36). As is later described, slot 257 receives a latch 260 carried by the front wall 23 of the casing part C to hold the latter in closed position, as shown in Figure 1. Accordingly, casing part C and the mechanism carried thereby cannot be swung into closed position unless and until the shield plate 250 is swung downwardly, in Figures 34 and 36, to close over the connecting terminal block, for portions of the shield 250 that project beyond the upper edge of the frame F block the movement of the wall 23 of casing part C which has to ride over that edge, and even if shield 250 clears the upper edge of frame F, it still remains in position to block off the slot 257 and thus prevent the latch 260 from entering it.

As above noted, frame F (Figure 27) has four corner holes 230 to facilitate assemblage of the sub-assembly C—M—F to the casing counterpart BB of Figures 4 and 4$^a$. Casing part BB for surface mounting, illustratively in the form of a casting, has a back wall 270 and integrally formed opposed side walls 271 and 272 and top and bottom walls 273 and 274. Back wall 270 has suitable holes 270$^a$ to secure it, as by screws, to the face of a wall or support indicated at WS, and preferably holes 270$^a$ are so distributed that they will overlie the holes 241 of a wall-recessed connector box (like that of Figure 3$^a$), in which case such a box serves as the support for part BB, by screws threaded into holes 241; in the latter case, wall 270 has a break-out or thin web 270$^b$ which is broken out for passage of conductors into casing part BB. The walls, such as top and bottom walls 273 and 274, can have reinforced threaded holes 273$^a$ and 274$^a$ for connection thereto of tubular conduit to bring the circuit conductors into and out of the casing counterpart BB.

As seen in Figure 4$^a$, the side, top, and bottom walls of the part BB have broad faced-off and continuous edge faces, and the top and side parts of the continuous rearwardly extending flange 201 of the frame F rest edgewise against the broad edge face of the top and side walls of the part BB. The rear wall 22 of casing part C, when closed, rests flush against the broad edge face of the bottom wall 274. The four corner holes 230 in frame F overlie the threaded holes 275 in the ears or posts 276 formed integrally with the side walls of casing part BB. Screws 277 (Figure 4) pass through the holes 230 and are threaded into the lug holes 275, thus securing the frame F with the casing part C and mechanism M, to the surface-mounted casing part BB; with the latter initially plumbed, the just-described assemblage by the secrews 277 insures that the casing part C is likewise plumb and also has its side walls parallel to the side walls of the surface-mounted part BB.

A building or the like may be wired up with tubular conduit carrying conductors and with as many casing counterparts BB wall-mounted and pipe-connected, and upon completion of such work, the folded-together assemblages F, M, C delivered and assembled, in the manner just described, each to its own box casing BB; the conductors that are brought into the casing part BB are then connected to the binding screws 222 of the terminal block carried by the frame F and the shield 250 is placed in closing position, whereupon the casing part C with the mechanism M can be swung upwardly and into the closing position shown in Figure 1, and thus, as in the case of the wall-recessed installation of Figures 3 and 3$^a$, a substantial portion of the mechanism M is carried upwardly and into the interior of the casing part BB.

Particularly where the installation has many conductors, some of which pass through the conduit casing part (B in Figure 3 or BB in Figure 4), because they are special conductors related to other local stations than the one housed in the particular connector box part, it is desirable to preclude such conductors, or the sometimes cumbersome insulated connectors where connections are made, from mechanically interfering with the accommodation of the mechanism M in the box part B or BB, and in such case the back wall of the wall-supported casing part is provided with an auxiliary housing-like part into which the mechanism M swings and substantially telescopes and out of which it is easy to keep the undesired conductors such as those above mentioned. Such a housing-like part is illustrated in Figures 4 and 4$^a$ and is designated generally by the reference character 280, and where the casing counterpart is cast, the part 280 can be conveniently cast integrally therewith, particularly integral with the back wall 270, which thus forms the back wall of the housing part 280. Projecting forwardly in Figure 4$^a$ and to the left in Figure 4, and of substantial length in those directions, are the opposed side walls 280$^a$ and 280$^b$ and top and bottom walls 280$^c$ and 280$^d$ formed integrally with the back wall 270 and spaced apart from each other at distances materially greater than the length and width of the mechanism M, as viewed from above in Figure 3 or Figure 4. There is thus provided substantial clearance for the easy and free entry of the encased mechanism M into the front open end of the housing part 280 as the casing part C is swung to closing position to carry the mechanism upwardly and inwardly into the casing counterpart. Also, a substantial portion of the encased mechanism M enters the auxiliary housing part 280 and gives added protection thereto.

Preferably, the walls of the housing part 280 are rounded off at their corners (see Figure 4$^a$) to avoid sharp edges and to provide funnel-like entry and exit ends for the relatively deep and wide channels that are formed between the walls of the casing part BB and the walls of the housing part 280, for the above-mentioned conductors are led in these channels as they pass from one conduit connection 273$^a$ to the other 274$^a$, or vice versa, the walls of housing 280 preventing such conductors from coming into engagement with the mechanism M, even if these conductors are pulled via one of the conduits.

To facilitate conductor pulling during wiring up of the system, the top and bottom walls 280$^c$ and 280$^f$ (Figures 4 and 4$^a$) are cut out, as at 281 and 282, in line with the common vertical axis of the conduit connections 273$^a$ and 274$^a$ and throughout areas materially greater than the area of the conduit connector openings themselves, the cutouts being rounded over at their edges (Figure 4) and also rounded in contour or shape throughout a radius materially greater than the radius of the holes 273$^a$ and 274$^a$. Accordingly, conductors can be pulled, during wiring installation, right through the connector wall casing part without being obstructed by the auxiliary housing part 280, for the straight line of pull from one conduit connection through the other tensions the pulled conductor right through the rounded and large cutouts 281, 282 without risk of the conductor or its insulation abrading thereagainst. Moreover, in that manner conductors may be pulled even through a completed alarm signal installation, for, to gain access to the particular wall connector casing part, the front casing part C has to be swung into open position, as in Figure 4, and that movement moves the mechanism M out of the interior housing part 280 and clears the latter for pulling of conductors, as above described. Conductors so pulled, if not to be connected to the particular local mechanism, are then pulled at the local installation sufficiently to gain enough slack to lift them out of the cutouts 281, 282 and move them over the walls of the housing part 280 and into the above-mentioned channels to either side of the latter. The back wall of the housing part 280 can bear a legend of instruction, as in Figure 4$^a$, such as "Keep wires out."

The latch 260 can take any convenient form; preferably it is a spring latch so that it automatically latches and locks the parts C and F together, and it also has suitable provision for operating it by a key or like device on the exterior of the closed enclosure C—B. Illustratively, and referring to Figure 6, the latch 260 may be shaped as there shown to provide it with a camming edge 260$^a$ to cam its way past one of the narrow end edges of the slot 257 and to have a slot 260$^b$ therein so that it can take in back of the metal of the frame F. Latch 260 is secured to a stud shaft 261 (see also Figures 5 and 9) that is rotatively mounted in a boss 23$^b$ formed on the inside of the wall 23 and provided with a stepped hole in which the pin or shaft 261 is rotatively mounted, with the slotted head 262 of the shaft 261 seated deep in the outer and large end of the hole. The slotted head 262 is thus hidden, and in Figure 1 is in an inconspicuous location; with a flat key or a screwdriver inserted into the hole and into the slot of the head 262, the latch 260 may be manually controlled.

The latch is spring-biased in locking or closing direction by a coil spring 263 (Figure 6) set into a hole in a stepped part of the boss 23$^b$, with its outer or free end taking over the shank of a headed stud 264, the head of which provides a large bearing contact with a shoulder formed on the latch 260, whereby the spring biases the latch 260 in counter-clockwise direction in Figure 6 to an extent permitted by the engagement of a shoulder-like extension 260$^c$, on the other side of the pivot pin 261 from the spring 263, with a stepped portion of the boss 23$^b$.

The spring 263 thus holds the latch 260 in hooked engagement, through the slot 257, with the heavy sheet-metal of the frame F; the slotted or hooked part 260$^b$ (Figure 6) is located so that, in locked position, the line of pull or force tending to swing open the horizontally pivoted sub-assembly C—L—M is substantially through the axis of the latch pivoting stud 261 and, hence, no material moment of force can in that way be exerted tending to swing the latch 260 in unhooking direction. Moreover, with the parts in closed position, as in Figure 1, a substantial portion of the mechanism M and other parts carried by the casing part C falls to the rear of the horizontal pivoting axis of the casing part B or BB, and thus the weight of such portion acts in a direction to tend to hold the sub-assembly C—M against swinging movement and thus aids the latch in holding the parts in mechanism-enclosing position.

To take up possible play in the parts when in locked and enclosing relation, it is preferred to interpose a spring between the casing part C and the frame F, to coact, by its reaction, in maintaining the hooked part 260$^b$ of the latch 260 in snug engagement behind slotted part of the frame F; illustratively, a flat bowed spring 265 (Figures 5, 6, and 9) may be employed for this purpose, and it is riveted or staked, as at 266, to a flat face of the boss 23$^b$ formed on the inside of the wall 23 of casing part C. As better appears in Figures 6 and 9, the two arms of bowed spring 265 normally project beyond the plane of the edges of the walls of casing part C, and when the latter is in closed position, the arms engage the top cross-part of the frame F and yield as the latch 260 is cammed through the slot 257, and thereafter the two spring arms remain under strain and take up any possible play between the parts. When the latch is released by the key, the spring 265 tends to start the swinging movement of casing part C in opening direction, causing a desirable quick response to the operation of the key, whence the casing part can be guided by hand in its downward swing to the horizontal position shown in Figures 2, 3, and 4. Links 205 unfold and stop the downward and outward swing to halt the casing part C in its horizontal position, making the mechanism readily accessible and presenting and holding it in a completely convenient position, in fact, just as though the mechanism were laid out on a work table. For example, if the installation is unfolded as above described, for the purpose of restoring a glass rod, all that need be done is to place the finger of one hand on the button or knob 188 (Figure 5 and 7), which is preferably painted a bright color like yellow, push it inwardly to disengage the latch from the legs of the stirrup 184 which either drops downwardly as seen in Figure 7 or is easily pulled downwardly with the other hand, whereupon insertion of a new glass rod in the stirrups 183 and 184 is easily accomplished in the manner earlier above described, being further facilitated by the clearances provided by the slanting faces 183$^j$ and 184$^j$ of the stirrups.

If the apparatus is so unfolded for test or local drill purposes, full instructions appear on the top wall of the transparent housing 180 (see Figures 23 and 24) in a position easily and conveniently read, and the parts to be manually manipulated or actuated being also compactly and readily accessible. These operations, according to the instructions, do not require technical knowledge of the switching arrangements or mechanical features of the construction, and this advantage will be better understood after brief description of several typical installations and circuit arrangements, of the many that are possible, to meet correspondingly broad ranges of specified requirements. Such consideration will also aid in better understanding the above described flexibility of the terminal or connector block assembly.

Figure 38:
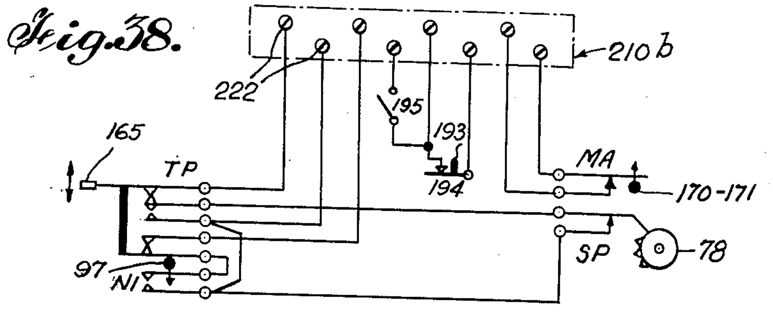

In Figure 38 is shown a simplified and diagrammatic circuit arrangement illustrative of a goodly number of requirements to be met in a single installation and diagrammatically showing how a folded-up sub-assembly F—C—M may be completed and wired up and then shipped to the job for assembly to the wall casing counterpart B or BB, leaving only the conductors in the latter to be connected to the binding screws 222 of the terminal block at the top of the frame F. In Figure 38 is indicated the terminal block 210b of Figures 36 and 37, provided with eight binding screws 222.

Code signal switch SP, actuated by code wheel 78, and the shunt non-interfering switch NI, and the test switch TP have their spring contact blades electrically interconnected as shown in Figure 38 and, as so interconnected, are provided with three conductors that run to three of the connectors 221 on the back of the terminal block 210b. Switch MA has its two contacts connected to two other tabs on the back of the terminal block 210b, and the break-glass switch 194 and the key-operated switch 195 can have one conductor in common and hence require only three conductors to lead them to three other connecting tabs 221 on the back of the terminal block 210b. There are thus eight circuit connections to be made to the eight binding screws 222, with the conductors that are brought into the wall casing part B or BB.

Breaking the glass rod G causes the switch 194 (see also Figure 9) to open and it remains open until the glass rod is replaced and the switch actuator 193 thereby restored to circuit-closing position. Whatever signal is actuated by switch 195, remains actuated until the glass rod is replaced.

Switch MA, actuated by the crank pin 170—171 (Figure 17) is frequently connected into a circuit that leads to a municipal or city fire alarm box which otherwise is not connected to the local building fire alarm system, or, as above noted, it may lead to a local building panel, ofttimes in the building superintendent's office, where it actuates an annunciator or other appropriate signalling device, including an audible signal.

Typical normal switch contact relationships are as shown in Figure 38. A typical installation appears as seen in Figure 1, folded together and closed. Pulling the lever breaks the glass, with results upon the break-glass switch 194 as just described. Switch MA is actuated, that is, opened on a closed circuit, the instant that the lever 32 is pulled far enough to effect the ultimate transmission of one round; it can thus actuate a local annunciator or audible signal, or, in known manner, electromagnetically trip the municipal or city fire alarm box, thus sounding the alarm at the municipal fire station. As soon as the lever 32 is released and is returned home as above described, the gear train is set into motion and starts the code wheel 78 rotating, and the moment that the gear train starts, the arm 97 (Figure 12) actuates the switch NI to close it and hold it closed, thus shunting out other local signalling stations and preventing them from interfering, and switch NI continues to be held closed until the moment when the gear train and code wheel 78 stop. Assuming that the switch SP has transmitted a coded signal to the building office and also sounded a local audible signal, for example, on the building floor where the particular station is located, someone in authority arriving at the signal station might then have to decide that a general building alarm should be sounded, that is, audible signals, for example, on all floors of the building, and in that case he uses a key to actuate the switch 195 through the externally accessible keyhole 197 (see Figures 3, 4, and 5), and to do this he need not even take the time to open or unfold the local signal station.

If the local station is to be actuated for fire drill, it is simply unfolded, using a simple form of flat key to actuate the latch by way of the slotted stud 262 accessible at the top of the casing part C (Figure 1), and the casing part C is let down into its horizontal position as shown in Figures 2, 3, and 4. A flat key is then inserted through the left-hand wall of the transparent housing 180, as seen in Figures 2 and 23, through the hole 180e in Figure 24, so that it enters the slot 161 (Figure 12) in the hub of the side gear 158, and the key is simply turned to wind up the spring 64 of the gear train; as is clear from the description of the gear train, the key can be turned only in one direction, and as it is turned the spring-winding shaft 61 turns (see Figure 13) and, through the gear 106, gear sector 103 is turned in clockwise direction, moving the roller 102 away from the cam edge 101 of the rock lever 92 and thus permitting the spring 100 to tilt the rock lever and move the stop part 91 (Figure 18) on its other end and out of engagement with the stop pin 90 on the large gear 87, thus permitting the gear train to run and setting the code wheel 78 into rotation; as the rock lever 92 is tilted, as just described, part 94h (Figure 13) rides or snaps upwardly in front of the radial edge 107b of the driver plate 107, thus locking the latter. The roller 102 on the gear sector 103 limits the extent to which the spring can be wound by the key to an amount equivalent to four ratchet teeth on the ratchet 70 and hence to four rounds of signal, since the roller 102 cannot move clockwise, as seen in Figure 13, beyond the edge 107g of the driver plate, that edge standing in the path of rotary movement of the roller 102 and blocking further movement of the latter inasmuch as the driver plate 107 remains stopped by the engagement of the rock lever part 94h with the radial edge 107b.

The main spring cannot be overwound, and the maximum range throughout which the mechanism can be actuated by the winding key is positively limited, as just described, to a winding operation which is equivalent to four rounds, just the same as a single complete pull of the lever 32 effects a winding operation that results in a maximum of four rounds of signal. It is possible, of course, with the winding key, to turn the spring-winding shaft 61 throughout a range equal to one round, two rounds, or three rounds, according to how many ratchet teeth are made to by-pass the pawl 71 (Figure 13), and this may be determined by listening to the clicking sounds made by the pawl snapping over a ratchet tooth. It will be noted that gear 158 (Figures 12, 15, and 16), into the hub 158b of which the key is inserted for hand winding, is considerably larger than its mating gear 153 which is on the spring-winding shaft 61; there is, therefore, a substantial gear ratio of drive, and this is large enough, being on the order of two to one, to insure that a very small rotation of the key, and hence of gear 158, turns shaft 61 throughout a substantial amount to have the pawl 71 by-pass one of the six ratchet teeth 70; with six ratchet teeth, about one-twelfth of a turn of key-driven gear 158 is enough to by-pass one ratchet tooth. When the gear train runs its course and completes transmission of the drill signals, by the code-wheel actuated switch SP, the gear sector 103 completes its counter-clockwise return movement (Figure 13) under the drive of the gear 106, whereupon the stud roller 102 engages the cam edge 101 on the rock lever 92 to project the stop member 91 (Figure 18) into the path of the pin 90 on the large gear 87, thus halting the gear train at its normal at-rest position, and the depression of the right-hand parts (Figure 13) of the rock lever 92 moves the parts $94^f$, $94^h$, and $94^g$ downwardly to the position shown in Figure 13, thus freeing the driver plate 107 at its radial edge $107^b$ for subsequent actuation by the pull lever 32.

In that manner a drill signal is sounded, purely locally, in the building equipped with the signalling station. The switch MA (Figure 38), which is frequently connected to a municipal alarm box to actuate the latter, remains unactuated, as does also the break-glass switch 194, for during such a drill actuation of the station, lever 32 is left alone and hence switch MA remains unactuated and the glass rod remains unbroken. Non-interfering switch NI is actuated, however, remaining actuated from the moment that manual winding commences to move the stud roller 102 (Figure 13) away from the rock lever 92 until the roller 102 is returned to its home position, as above described.

If it is desired to inspect the operation of the gear train, the casing structure is again unfolded to bring it to the position shown in Figure 2 and, following the instructions on the casing 180 (Figure 23), the test knob or handle 165 that projects upwardly through the top wall of the transparent casing 180, and by which the test switch TP is actuated, is pushed and held away from the operator and hence toward the frame F (Figure 2), the key is inserted through the side aperture $180^e$ and engaged in the hub of the gear 158 and turned, as above described in connection with the fire drill operation, but with the switch TP held as described, by way of the handle or knob 165, the circuits are re-arranged so that, though the code wheel 78 is driven and its switch SP operated, no alarm is transmitted or sounded; this is usually called a "silent" test, and the transparent casing permits the inspector to watch the mechanism in action. As indicated in Figure 23, the large letter "S" appears on the instructions to indicate the direction in which the knob 165 is pushed and held. By reference to Figure 38, the resultant position of the switch contacts of switch TP (pushed downwardly in Figure 38 for the silent test) closes a shunt around the switch SP at the second and third switch contacts of switch TP. Though non-interfering switch NI remains closed during the running of the gear train, its circuit remains open at the two lowermost contacts of switch TP which stand separated during the "silent" test.

If it is desired to test only the alarm circuit, the knob 165 of the switch TP is actuated forwardly (Figures 2 and 23), or toward the operator, and, as a guide for that direction of movement, the housing 180 bears the letter "A" (Figure 23) toward which the knob 165 is moved for the alarm test. That corresponds to an upward movement in Figure 38 and that effects a separation between the two uppermost switch contacts of switch TP, effecting a circuit interruption manually, just as switch SP when actuated by the code wheel 78 effects a circuit interruption to transmit a signal impulse.

Figure 39:
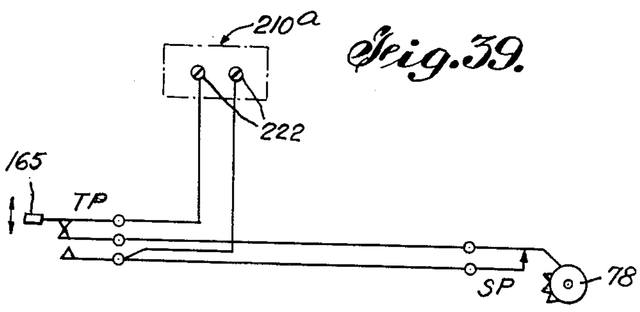

In Figure 39 is diagrammatically indicated the circuit arrangement for a simpler electrical installation, illustratively one that requires only two terminal connectors in the terminal block, such as the terminal block $210^a$ of Figures 34 and 35 above described. In Figure 39 terminal block $210^a$, with two binding posts, is indicated, in contrast to the terminal block $210^b$ of Figure 38 where eight binding posts are utilized. In the installation of Figure 39, the internal circuit connections of the station are shown, with the station embodying the signal switch SP, and, because it does not embody a non-interfering switch NI, it has a simpler form of test switch TP, as shown. In making up the signal station for Figure 39, the break-glass switch 194 is simply omitted from the assembly, and if the break-glass deterrent is not desired, the glass rod G and the stirrups 183 and 184 (Figures 1 and 7) are simply omitted. The municipal signal switch MA is likewise omitted from the assembly, as is also its actuating mechanism comprising the crank arm 172, shaft 173, and actuating lever 176. Alarm test and silent test are effected as before with this simple form of switch TP. An alarm test is effected by simply moving the knob 165 upwardly in Figure 39, opening the circuit for signal impulse transmission, while the switch SP remains closed. For silent test the knob 165 is pushed and held downwardly in Figure 39, thus shunting the switch SP so that the gear train mechanism can run and drive the code wheel 78 without signal transmission. For local fire drill the key is used to wind the spring of the gear train, the test switch knob 165 remaining in normal position; fire drill actuation is effected in this manner where the glass-breaking deterrent is employed across the lever 32, but where that is omitted, fire drill can be effected by simply pulling the lever 32 to effect local alarm transmission.

Figures 40, 41, 42, 43:
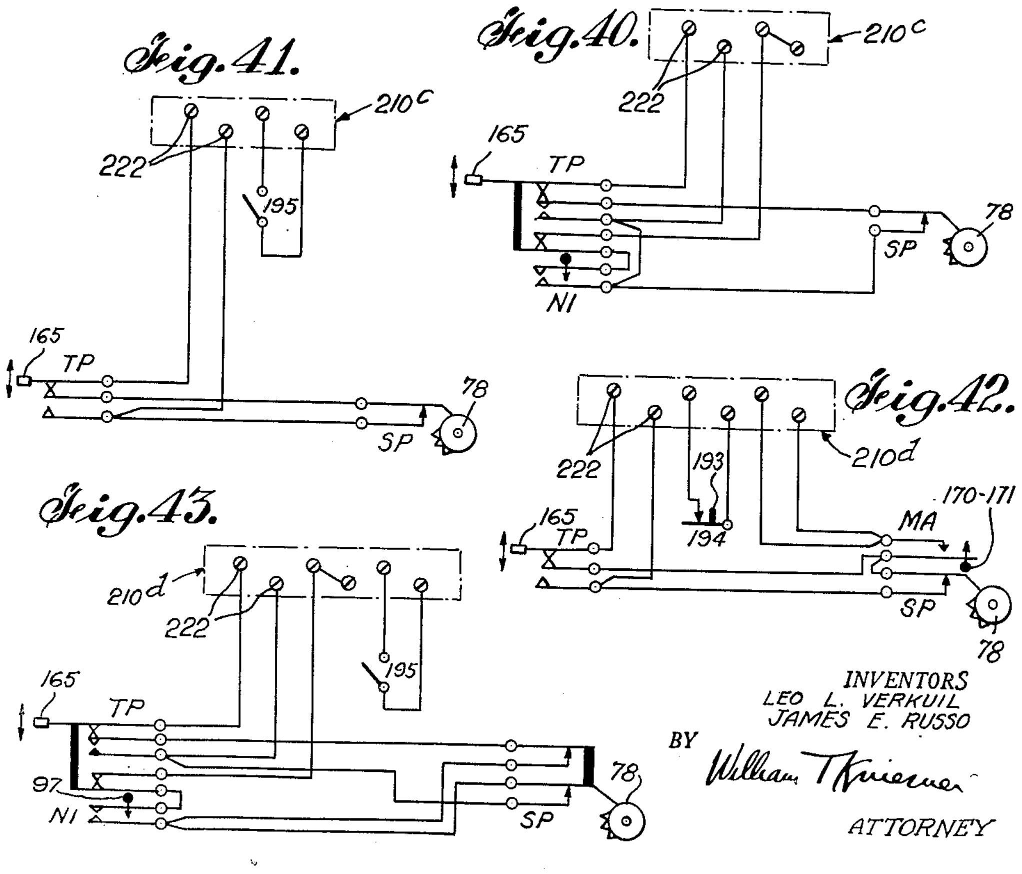

As above noted, the requirements to be met vary widely, and as further illustrative of the adaptability of the above-described apparatus to meet these requirements, Figures 40 to 43 illustrate diagrammatically a few of these many other conditions to be met. In Figure 40 the system requirements are like those of Figure 39, except that a non-interfering switch NI is also required. In such case the switches TP, NI, and SP are interconnected, as is diagrammatically shown in Figure 40, and connected to a terminal block $210^c$ provided with four binding posts, and in that case the terminal block $210^c$ is mounted on the brackets 214, 215 of Figure 27 after breaking off two scored sections from each bracket. In Figure 41 is indicated how still another requirement is met, wherein the system of Figure 39 is to have also a general alarm key-operated switch 195 which in such case is assembled to the casing part C in the manner above described, and as shown in Figures 1 and 5. Here, again, a four-terminal block $210^c$ is used. Another installation might require, in addition to the requirements of Figure 39, a break-glass switch 194 and a municipal connection switch MA, and in such case the circuit arrangement is as diagrammatically indicated in Figure 42, with a terminal block $210^d$ having six binding posts, being secured to the brackets 214, 215 of the frame F of Figure 27 after three scored sections are broken off each bracket. Figure 43 further illustrates the wide adaptability of the apparatus, diagrammatically indicating a circuit arrangement utilizing a different type of switch SP according to the system requirements, other switching arrangements being now clearly understood in view of the description of other illustrative circuit arrangements. Also, it is to be understood that more than one-toothed or code wheel and a corresponding number of coacting switches may be employed, according to the particular system requirement. It will also be understood that the instructions provided on the transparent casing 180 (Figure 23) are appropriately varied or changed according to the particular coacting assemblage and, therefore, that the instructions appearing in Figure 23 are merely illustrative.

Referring to Figure 12, the heavy spring arm 164 of the switch TP has a reduced end part or shank 164ª which slidably carries a small square plate 166 of plastic or other non-conductive material, the plate 166 having a central hole through which the shank 164ª passes; a spring 167 extends about the shank 164ª and normally presses the plate 166 to the left in Figure 12, and with the housing 180 (over the mechanism—Figures 23 and 24) and the handle 165 projecting through the hole 181ª, the plate 166 is pressed and held against the under face of the depressed wall 181ᵇ, thus closing off the hole 181 throughout whatever shifting movement the shank or arm 164ª partakes relative to the hole 181ª.

Though the hole 181ª is thus maintained sealed, the housing 180 may be readily removed for repair, replacement, alteration, or further inspection of the gear train mechanism and related parts by simply removing the screws 179, 179 (Figure 2) and lifting off the housing.

It will thus be seen that there has been provided in this invention a fire alarm signal station box in which the various objects heretofore noted and indicated, together with many thoroughly practical advantages, are successfully achieved.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. A fire alarm signal station box comprising a casing part substantially open at its front and having entry means for conductors, an open frame mounted at the front of said casing part and having spaced terminal block supports with means for changing the length of the spacing therebetween, a second casing part closing over said first casing part and having means connecting it to said frame for downward pivoting movement of substantially ninety degrees, the front wall of said first casing part having an aperture of substantial size surrounded by inwardly projecting walls forming a well, a gear train mechanism including a driving motor and signal switch means and conductors leading from the latter, said mechanism being secured adjacent the inner end of said well and projecting through said open frame and into said first casing part, an alarm lever at the front end of said well and pivoted for movement outwardly from said front wall for actuating said mechanism, a terminal block having terminals with front and rear connectors, the terminals numbering substantially the same as said switch conductors and the length being proportional to the number of its terminals, the spacing between said supports being changed according to said length to leave said connectors unobstructed for connection thereto of said first-mentioned conductors and said switch conductors, locking means to hold said second casing part in closing position and against being swung downwardly upon actuation of said lever, a shield overlying the front of said terminal block and having a length to cover over the longest spacing between said spaced supports, and means supporting said shield for movement out of terminal-block covering position along a path to project said shield as an obstacle to completing the closing relation of said second casing part to said first casing part.

2. A fire alarm signal station box as claimed in claim 1, in which said supporting means for said shield comprises means pivotally supporting it from said frame for swinging movement out of terminal-block covering position and into the path of closing movement of said first casing part relative to said second casing part whereby said shield has to be moved into covering position before said second casing part can be closed over said first casing part and the two locked together.

3. A fire alarm signal station box as claimed in claim 1, in which said locking means comprises two interengageable parts, one on said second casing part and the other on said open frame and in which said path of movement of said shield provided by said supporting means traverses the space between said two interengageable parts when said second casing part is in open position whereby said shield blocks interengagement of said two lock parts.

4. A fire alarm signal station box as claimed in claim 1, in which said supporting means for said shield comprises means pivotally supporting it from said frame and is provided with coacting means confining the pivoting movement of said shield toward block uncovering position to such direction that a portion of the shield remote from its axis of pivoting moves along said path.

5. A fire alarm signal station box comprising a casing part substantially open at its front and attachable to a support and having means for the entry thereinto of conductors, an open frame having means for securing it to the front of said casing part, said frame having near its top spaced supports of which at least one is transversely scored for severing it to change the spacing between said supports, a second casing part having means hingedly connecting it at its lower end to said frame for pivoting movement about a horizontal axis limited to substantially ninety degrees, said second casing part having therein an aperture of substantial size surrounded by inwardly projecting walls forming a well, a gear train mechanism including a driving motor and signal switch means and secured adjacent the inner end of said well and thereby projecting through said open frame and into said first casing part and having conductors leading from said switch means, an alarm lever normally closing the front end of said well and pivoted for movement outwardly from said front wall for actuating said mechanism, locking means for holding said second casing part in closing position to said first casing part, a terminal block having a number of terminals substantially the same as the conductors leading from said switch means which are connected thereto, said block having a length commensurate with said number and being bridged across said supports for connection thereto of said first-mentioned conductors, a shield of insulating material overlying the front side of said terminal block and having a length commensurate with the longest terminal block that can be carried by said supports, and means supporting said shield from said frame independently of a severable part of said support.

6. A fire alarm signal station box comprising a casing part substantially open at its front and attachable to a support and having means for the entry thereinto of conductors, an open frame having means for securing it at the front of said casing part, said frame having opposed spaced terminal block supports with means for changing the spacing therebetween according to the length of terminal block carried thereby, a second casing part having means hingedly connecting it at its lower end to said frame for pivoting movement about a horizontal axis limited to substantially ninety degrees, said second casing part having front, side, and end walls peripherally overlying the open front of said first casing part to close it and said front wall having therein an aperture of substantial size surrounded by inwardly projecting walls forming a well, a gear train mechanism including a driving motor and signal switch means with a plurality of conductors leading from the latter, said mechanism being secured adjacent the inner end of said well and projecting through said open frame past the line of said supports and into said first casing part, an alarm lever normally closing the front end of said well and pivoted for movement outwardly from said front wall for actuating said mechanism, a terminal block bridged across and secured to said spaced supports and having a number of terminals with front and rear connectors corresponding substantially to the number of conductors leading from said switch means, said block having a length commensurate with the number of its terminals and the spacing between said supports being commensurate with the length of said terminal block to leave said connectors unobstructed for connection thereto of said first-mentioned conductors and said switch conductors, and locking means holding said second casing part in closing position.

7. A fire alarm signal station box comprising a casing part substantially open at its front and attachable to a support and having means for the entry thereinto of conductors, an open frame having means for securing it at the front of said casing part, said frame having opposed spaced terminal block supports with means for changing the spacing therebetween according to the length of terminal block carried thereby, a second casing part having means hingedly connecting it at its lower end to said frame for pivoting movement about a horizontal axis limited to substantially ninety degrees, said second casing part having front, side, and end walls peripherally overlying the open front of said first casing part to close it and said front wall having therein an aperture of substantial size surrounded by inwardly projecting walls forming a well, a gear train mechanism including a driving motor and signal switch means with a plurality of conductors leading from the latter, said mechanism being secured adjacent the inner end of said well and projecting through said open frame past the line of said supports and into said first casing part, an alarm lever normally closing the front end of said well and pivoted for movement outwardly from said front wall for actuating said mechanism, switch means carried internally of said second casing part but externally of said well and having key-controlled actuating means accessible through a wall of said second casing part, with conductors leading from said switch means, a terminal block bridged across and secured to said spaced supports and having a number of terminals with front and rear connectors corresponding substantially to the number of conductors leading form said switch means, said block having a length commensurate with the number of its terminals, and means holding said second casing part closed against the pull of said lever.

8. A fire alarm signal station box comprising a casing part substantially open at its front and attachable to a support and having means for the entry thereinto of conductors, an open frame having means for securing it at the front of said casing part, said frame having opposed spaced terminal block supports with means for changing the spacing therebetween according to the length of terminal block carried thereby, a second casing part having means hingedly connecting it at its lower end to said frame for pivoting movement about a horizontal axis limited to substantially ninety degrees, said second casing part having front, side, and end walls peripherally overlying the open front of said first casing part to close it and said front wall having therein an aperture of substantial size surrounded by inwardly projecting walls forming a well, a gear train mechanism including a driving motor and signal switch means with a plurality of conductors leading from the latter, said mechanism being secured adjacent the inner end of said well and projecting through said open frame past the line of said supports and into said first casing part, a spring-biased alarm lever normally closing the front end of said well and pivoted for movement outwardly from said front wall, said lever having operative connections with said mechanism to actuate it only upon a complete cycle of lever movement and switch means with conductors leading therefrom and actuated in response to outward pivoting movement of said lever, a terminal block bridged across and secured to said spaced supports and having a number of terminals with front and rear connectors corresponding substantially to the number of conductors leading from said switch means, said block having a length commensurate with the number of its terminals and having said switch conductors connected thereto, and means holding said second casing part closed against the pull of said lever.

9. A fire alarm signal station box comprising a casing part substantially open at its front, an open frame having means for securing it at the front of said casing part, said frame carrying a terminal block having a number of terminal connectors, a second casing part having means hingedly connecting it at its lower end to said frame for pivoting movement about a horizontal axis limited to substantially ninety degrees, said second casing part having front, side, and end walls peripherally overlying the open front of said first casing part to close it and said front wall having therein an aperture of substantial size surrounded by inwardly projecting walls forming a well, a gear train mechanism including a driving motor and signal switch means with a plurality of conductors leading from the latter to said terminal connectors, said mechanism being secured adjacent the inner end of said well and projecting through said open frame and into said first casing part, an alarm lever normally closing the front end of said well and pivoted for movement outwardly from said front wall for actuating said mechanism, a frangible member bridged across said aperture and in front of said lever with switch means within said second casing part having means for actuating it in response to breakage of said member and having conductors leading to said terminal connectors, and a shield for covering over said terminal block, said shield having means movably mounting it for shifting into two positions, in one of which it covers said terminal block and in the other of which it blocks closing movement of said second casing part relative to the first casing part.

10. A fire alarm signal station box comprising a casing part substantially open at its front, an open frame having means for securing it at the front of said casing part, a second casing part having means hingedly connecting it at its lower end to said frame for pivoting movement about a horizontal axis limited to substantially ninety degrees, said second casing part having therein an aperture of substantial size surrounded by inwardly projecting walls forming a well, a gear train mechanism including a driving motor and signal switch means secured adjacent the inner end of said well and having a housing thereover and interfitted with the walls of said well, said housing and mechanism therein projecting through said open frame and into said first casing part and having a manual switch means actuator and a manual actuator for said gear train mechanism, both actuators being accessible through the walls of said housing, and an external manual controller substantially closing said aperture in said second casing part for actuating said mechanism, a wall of said housing that is brought into view upon swinging said second casing part away from said first casing part throughout said ninety degrees bearing instructions for manipulating said two actuators.

11. A fire alarm signal station box comprising a casing part substantially open at its front and attachable to a support and having means for the entry thereinto of conductors, an open frame having means for securing it at the front of said casing part, said frame having opposed spaced terminal block supports with means for changing the spacing therebetween according to the length of terminal block carried thereby, a second casing part having means hingedly connecting it at its lower end to said frame for pivoting movement about a horizontal axis limited to substantially ninety degrees, said second casing part having front, side, and end walls peripherally overlying the open front of said first casing part to close it and said front wall having therein an aperture of substantial size surrounded by inwardly projecting walls forming a well, a gear train mechanism including a driving motor and signal switch means with a plurality of conductors leading from the latter, said mechanism being secured adjacent the inner end of said well and projectng through said open frame past the line of said supports and into said first casing part, an alarm lever normally closing the front end of said well and pivoted for movement outwardly from said front wall for actuating said mechanism, a frangible member bridged across the front end of said well and in front of said lever with switch means mounted in said well behind said lever and responsive to breakage of said member and having conductors leading therefrom, a terminal block bridged across and secured to said spaced supports and having a number of terminals with front and rear connectors corresponding substantially to the number of conductors leading from said switch means, said block having a length commensurate with the number of its terminals, and means holding said second casing part against pivoting under the pull of said lever against said frangible member.

12. A fire alarm signal station box comprising a casing part substantially open at its front, an open frame having means for securing it at the front of said casing part, said frame carrying a terminal block having a number of terminal connectors, a second casing part and having means connecting it to said frame for downward pivoting movement of substantially ninety degrees, said second casing part having therein an aperture surrounded by inwardly projecting walls forming a well, a gear train mechanism including signal switch means secured adjacent the inner end of said well and projecting through said open frame and into said first casing part, with conductors leading from said switch means to said terminal connectors, a lever substantially closing said aperture and pivoted for movement outwardly from said second casing part for actuating said mechanism, a shield for covering said terminal block and having means movably mounting it for shifting into two positions in one of which it covers said terminal block and in the other of which it blocks closing movement of said second casing part relative to the first casing part, and means for locking said second casing part against downward pivoting movement under the pull of said lever.

13. A fire alarm signal station box comprising two companion casing parts enclosing a gear train mechanism including a driving motor and signal switch means, means for connecting said two casing parts for relative separating movement to gain access to said mechanism, at least one of said casing parts having means for entering conductors thereinto, a terminal block supported within one of said casing parts and having terminal connectors for said conductors and for conductors leading from said switch means, a shield for covering over said terminal block, and means movably mounting said shield for shifting into two positions in one of which it covers said terminal block and in the other of which it blocks relative movement between said companion casing parts into enclosing position.

14. A fire alarm signal station box comprising a casing part substantially open at its front and attachable to a support and having means for the entry thereinto of conductors, an open frame having edge flanges and having means for securing it at the front of said casing part, a second casing part having means hingedly connecting it to said frame for closing said first casing part, said second casing part carrying electric signalling means on the inside thereof for connection to said conductors and that projects through said open frame and into said first casing part, and means for locking said second casing part against swinging out of closing relation to said first casing part.

15. A signal station box as claimed in claim 14, in which said first casing part is adapted to be supported in a recess in a wall, said frame having an expanse greater than that of the open front of said first casing part and said edge flanges extending rearwardly from the frame whereby said edge flanges can engage the wall surface about said recess.

16. A signal station box as claimed in claim 15, in which said second casing part has peripheral portions that substantially envelope said frame laterally.

17. A signal station box as claimed in claim 14, in which the expanse of said frame is substantially the same as that of the open front of said first casing part, the edge flanges of said frame resting against said first casing part adjacent the opening in its front and thereby aligning said frame with said first casing part.

18. A signal station box as claimed in claim 17, in which said second casing part has peripheral portions overlying the edge flanges of said frame and has an external peripheral contour substantially matching that of said first casing part.

19. A signal station box as claimed in claim 14 provided with a terminal block bridged across said frame out of the path of movement of said signalling means through said frame, said terminal block having front and rear connectors for respectively connecting thereto said first-mentioned conductors and conductors leading from said signalling means.

20. A signal station box as claimed in claim 19, in which said terminal block is provided with a shield, and means movably mounting said shield for movement into two positions in one of which it stands in shielding relation to said terminal block and in the other of which it blocks completion of closing movement of said second casing part relative to said first casing part.

21. A fire alarm signal station box comprising a casing part substantially open at its front, an open frame having means for securing it at the front of said casing part, a second casing part having means hingedly connecting it to said frame, said second casing part having front, side, and end walls peripherally overlying the open front of said first casing part to close it and said front wall having therein an aperture of substantial size surrounded by inwardly projecting walls forming a well, a manual actuator carried by said front wall at said aperture and movable in a cycle of two strokes, gear train mechanism including a driving motor and gear-train-responsive signal switch means secured as a unit adjacent the inner end of said well and projecting through said open frame and into said first casing part, and actuating connections between said actuator and said mechanism for actuating the latter only after the completion of said cycle of movement of said actuator.

22. A fire alarm signal station box as claimed in claim 21 having signal switch means mounted in said well, and means for actuating said last-mentioned switch means in response to movement of said actuator less than the first stroke of said cycle of movement.

23. A fire alarm signal station box as claimed in claim 21 provided with means for halting said gear train in response to a predetermined operation thereof, signal switch means and means for setting it in response to an actuation of said manual actuator throughout a complete cycle, and means for restoring it to unactuated condition in response to the halting of said gear train.

24. A fire alarm signal station box as claimed in claim 21 having a frangible member and means for breaking it in response to initial movement of said manual actuator, and switch means carried by said second casing part and having means for actuating it in response to breakage of said frangible member.

25. A fire alarm signal station box as claimed in claim 21, in which said manual actuator is in the form of a lever substantially closing over said aperture and having means mounting it for movement in one stroke away from said aperture and on reverse stroke into aperture-closing position, said means comprising pivoting studs on the lever and opposed bearing slots therefor, said slots being open toward the inner end of said well, and means carried by said mechanism for closing said slots and entered thereinto upon assembly of said mechanism to said second casing part.

26. A fire alarm signal station box as claimed in claim 21 having a frangible member with means supporting it in the path of the first stroke of movement of said actuator to break it during said first stroke of movement.

27. A fire alarm signal station box as claimed in claim 26, in which said supporting means comprises a holder having means movably mounting it to facilitate mounting of said frangible member, and means accessible only from the inside of said second casing part for controlling movement of said holder.

28. A fire alarm signal station box as claimed in claim 21, in which said manual actuator comprises a lever pivotally supported in relation to said aperture, a frangible member bridged across said aperture, and means responsive to movement of said lever in its first stroke of movement to break said frangible member.

29. A fire alarm signal station box comprising a casing having a wall provided with an aperture of substantial size surrounded by inwardly projecting walls forming a well, said wall having adjacent said aperture a hand hole internally walled in, a gear train mechanism including signal switch means secured as a unit adjacent the inner end of said well, a lever substantially closing said aperture and having a handle portion extended over said hand hole, and operative connections extending in said well from said lever to said gear train mechanism.

30. A fire alarm signal station box as claimed in claim 29, in which said lever is provided with an inwardly projecting downwardly and outwardly inclined wall member that enters said hand hole and normally forms a false bottom therefor.

31. A fire alarm signal station box comprising a casing having a wall provided with an aperture of substantial size surrounded by inwardly projecting walls forming a well, a lever substantially closing said aperture and having shaft means to form an axis of pivoting, said well having internally thereof open bearing means for receiving said shaft means, signal switch means secured as a unit adjacent the inner end of said well and having means closing off said open bearing means, and means forming an actuating connection between said signal switch means and said lever.

32. A fire alarm signal station box comprising a casing having a wall provided with an aperture of substantial size surrounded by inwardly projecting walls forming a well, an actuating lever substantially closing said aperture and having means pivotally supporting it for movement out of closing position, a gear train mechanism secured as a unit adjacent the inner end of said well and having barrier means extending across the well to bar access to said mechanism when said lever is in open position, and operative connections passing through said barrier means for actuating said gear train mechanism from said lever.

33. A fire alarm signal station box as claimed in claim 32, in which said barrier means comprises a base plate for said gear train mechanism, said base plate being apertured for the passage therethrough of said operative connections.

34. A fire alarm signal station box as claimed in claim 32, in which the means for pivotally supporting said lever comprises complementary bearing parts of which one is associated with the walls of said well and the other is carried by said gear train unit.

35. A fire alarm signal station box comprising a casing having a wall provided with an aperture of substantial size surrounded by inwardly projecting walls forming a well, an actuating lever substantially closing said aperture and having means pivotally supporting it for movement out of closing position, a gear train mechanism secured as a unit adjacent the inner end of said well, the inner ends of said well walls having an inner ledge and an outer ledge with said gear train mechanism set against said inner ledge, operative connections between said lever and said gear train mechanism, and a housing encasing said gear train mechanism and having the walls thereof seated against said outer ledge.

36. A fire alarm signal station box comprising a casing having a wall provided with an aperture of substantial size surrounded by inwardly projecting walls forming a well, an actuating lever substantially closing said aperture and having means pivotally supporting it for movement out of closing position, a gear train mechanism secured as a unit adjacent the inner end of said well, operative connections between said lever and said gear train mechanism for actuating the latter only after a predetermined minimum movement of said lever, and a switch having an actuator adjacent the outer end of said well and responding to initial movement of said lever.

37. A fire alarm signal station box comprising a casing having a wall provided with an aperture of substantial size surrounded by inwardly projecting walls forming a well, an actuating lever substantially closing said aperture and having means pivotally supporting it for movement out of closing position, a gear train mechanism secured as a unit adjacent the inner end of said well, operative connections between said lever and said gear train mechanism for actuating the lever only after a predetermined minimum movement of said lever, a frangible member, said lever having means adapted to break said frangible member upon initial lever movement, and switch means having an actuator responsive to breaking of said frangible member.

38. A fire alarm signal station box comprising a casing having signal switch means internally thereof and an externally accessible manual actuator therefor, a frangible member, said actuator having means for breaking said member upon movement of said actuator, and a switch having a movable operator having means for actuating it in one direction in response to movement of said manual actuator and for actuating it in opposite direction in response to replacement of said frangible member by an unbroken member.

39. A fire alarm signal station box comprising a casing having signal switch means internally thereof and an external actuating lever therefor, a wall of said casing having an aperture with means mounting said actuator for movement outwardly of said aperture, a frangible member, holders for said frangible member, one on each side of said aperture, to support said frangible member in the path of outward movement of said actuator, means mounting at least one of said holders for movement to facilitate assembly of said frangible member, and means operable from the inside of said casing for controlling the position of said movably mounted holder.

40. A fire alarm signal station box as claimed in claim 39, in which said movable holder has a shank and said wall has a guideway therethrough for receiving said shank, said last-mentioned means comprising a latch on the inside of said casing wall and coacting with said shank to hold it against movement or to release it for movement.

41. A fire alarm signal station box as claimed in claim 39, in which said holders have juxtaposed socket-like recesses for receiving the respective ends of said frangible member, said actuator and at least one of said holders having coacting means providing a clearance therebetween of a dimension commensurate with the cross-section of said frangible member whereby a broken portion of the latter is prevented from blocking continued movement of said actuator in outward direction.

42. A fire alarm signal station box comprising a casing provided with an aperture of substantial size surrounded by inwardly projecting walls forming a well, signal switch means secured as a unit adjacent the inner end of said well, a lever substantially closing over said aperture and mounted for pivoting movement relative to the open end of said well, the walls of said well adjacent its outer end having ledge means coacting to limit inward swing of said lever, a frangible member of a length to extend crosswise of said lever and having two holding means therefor, one at each side of said aperture, and means coacting with said ledge means for movably supporting at least one of said holding means.

43. A fire alarm signal station box as claimed in claim 42, in which said movably supported holding means is provided with a shank and said ledge means has a guideway therein for movably receiving said shank, and manually controllable means coacting with a wall of said well for holding or releasing said shank.

44. A fire alarm signal station box as claimed in claim 42, in which said two holding means comprise stirrup-like members for receiving the respective ends of said frangible member, said stirrup-like members having shanks provided with means for securing them to said ledge means.

45. A fire alarm signal station box as claimed in claim 44, in which the securing means for at least one of said stirrup-like members comprises a guideway in the ledge means for receiving the shank of one stirrup-like member for sliding movement relative thereto, and manually controllable latch means carried by said well walls for locking said last-mentioned shank against sliding movement.

46. A fire alarm signal station box comprising a casing having an aperture in a wall thereof, a gear train mechanism including signal switch means and having therein a reversibly movable operator pivoted on an axis parallel to said wall and spring means normally biasing and holding said operator in home position, a manual actuator having means pivoting it at said aperture on an axis parallel to said wall for movement into and out of a home position, and means mechanically connecting said actuator and said operator for conjoint movement whereby said spring means also biases said actuator in its home position.

47. A fire alarm signal station box comprising a casing having an aperture in a wall thereof surrounded by inwardly projecting walls forming a well, a gear train mechanism including signal switch means and having therein a shaft parallel to said wall carrying a reversibly movable operator element and an actuating element adapted to be driven by said operator element upon pivoting movement in one direction, a stop pin rotated by said gear train, a stop arm engageable with said stop pin and having control means therefor comprising means responsive to movement of said actuating element to free said stop arm for movement to disengage itself from said pin and means responsive to movement of said operator element for preventing disengagement of the stop arm from said stop pin until said operator element returns to starting position together with means responsive to the return of said operator to starting position to lock the latter in home position, an external manual actuator adjacent said aperture having means pivotally mounting it on an axis parallel to said first axis, and a reversible driving connection through the front end of said well between said manual actuator and said operator whereby said manual actuator and said operator element operate in unison and said actuator is locked in starting position and released therefrom according as said operator is locked or released.

48. A fire alarm signal station box comprising a casing having therein a gear train mechanism and signal switch means and an externally operable manual actuator having means mounting it for movement in a cycle of two strokes, said gear train mechanism comprising a plurality of gears for controlling said switch means, a spring-driven shaft having a one-way drive connection with said plurality of gears and adapted to wind its spring when driven in opposite direction, a reversibly movable actuating member to drive said shaft in spring-winding direction and driven in reverse direction when the spring drives said shaft, a reversibly movable driver member having a reversible lost-motion driving connection with said actuating member to drive the latter in spring-winding direction on one stroke of movement and to permit it to return to starting position independently of said actuating member, a reversible driving connection between said driver member and said manual actuator, a stop member rotatable with said gears, movable stop means coacting with said stop member to halt and release said gears, and coacting control means for said movable stop means, one of which is responsive ot the movement of said actuating member and the other of which is responsive to movement of said driver member, and controllable maens for rotationally setting said stop member relative to said gears to time the coaction therewithof said stop means.

49. A fire alarm signal station box as claimed in claim 48 in which said controllable timing means comprises means mounting said stop member on one of said gears and means for selectively positioning said stop pin along an arc whose radius is at the center of said one gear.

50. A fire alarm signal station box as claimed in claim 48, in which said controllable timing means comprises a support rotatable with one of said gears and means for selectively securing said stop member thereto at any one of a plurality of locations spaced angularly about the axis of rotation of said support.

51. A fire alarm signal station box as claimed in claim 48, in which said setting means comprises a part rotatable with said gears and having means forming a plurality of seats distributed throughout a substantial arc, said stop member having a part securable to any one of said seats.

52. A fire alarm signal station box as claimed in claim 48, in which said setting means comprises a shank on said stop member and a plurality of recesses in the side of one of said gears and subtending a substantial angle, each recess being dimensioned to receive said shank, whereby said stop member may be selectively located at any one recess.

53. A fire alarm signal station box comprising a gear train mechanism comprising a plurality of gears and having signal switch means, with means operated by said gears for controlling said switch means, a stop member rotatable with said gears, a shaft with a driving spring and a one-way driving connection with said plurality of gears, an actuating member to drive said shaft in spring-winding direction and driven by the latter in reverse direction under the force of the spring, a reversibly movable operator to drive said actuating member in spring-winding direction, spring means to bias said operator to starting position, stop means for coaction with said stop member and having means for controlling its engagement and disengagement relative to said stop member, said controlling means comprising means responsive to movement of said actuating member in spring-winding direction to free said stop means for disengaging movement and to move it in engaging direction in response to completion of reverse movement of said actuating member together with means responsive to movement of said operator to prevent disengaging actuation of said stop means until said operator returns to starting position, and means supporting said stop member for rotation with said gears and providing a plurality of selectable locations therefor, said locations subtending a substantial angle, whereby the position of said stop member relative to said gears in rotational direction may be selected.

54. A fire alarm signal station box comprising casing means having therein a gear train mechanism including a driving motor and signal switch means, said gear train mechanism comprising a plurality of gears for controlling said signal switch means, and means for controlling the starting and stopping of said gears comprising two coacting members of which one has means supporting it to partake of rotative movement with said plurality of gears and means for securing it to said supporting means and providing for selectable shift of its position in rotational direction relative to said supporting means.

55. A fire alarm signal station box comprising casing means having therein a gear train mechanism and signal switch means actuated thereby, additional switch means, a manual actuator accessible at the front of said casing means and having means movably mounting it for movement in a cycle of two strokes, actuating connections between said external actuator and said mechanism for actuating the latter only after the completion of said cycle of movement, and means for actuating said additional switch means in response to actuation of said manual actuator less than said cycle of movement thereof.

56. A fire alarm signal station box as claimed in claim 55, in which said external actuator comprises a lever and said mounting means therefor comprises pivoting means for the lever for movement thereof toward or away from said casing means, said actuating connections comprising a link connected to said lever and passing through the wall of said casing means, and said means for actuating said additional switch means comprises means coacting with said link.

57. A fire alarm signal station box comprising a casing having an aperture of substantial size in a wall thereof, a gear train mechanism including signal switch means and having therein a reversibly movable operator pivoted on an axis parallel to said wall and spring means normally biasing and holding said operator in home position, a manual actuator comprising a plate-like lever of an area to substantially close said aperture, said lever when in aperture-closing position substantially merging with the external face of said wall and having means pivoting it at said aperture on an axis parallel to said wall for movement into and out of aperture-closing home position, and means mechanically connecting said plate-like actuator and said reversibly movable operator for conjoint movement whereby said spring means also biases said actuator in its home aperture-closing position.

58. A fire alarm signal station box comprising a casing having an aperture in a wall thereof, a gear train mechanism including a driving motor and signal switch means actuatable by said mechanism and having therein a reversibly movable operator pivoted on an axis parallel to said wall for movement in a cycle of two strokes and spring means normally biasing and holding said operator in home position, actuating connections between said operator and said gear train mechanism and driving motor for actuating the latter to drive the gear train mechanism only after the completion by said operator of said cycle of movement and return of said operator to home position by said spring means, said actuating connections including means for locking said operator in home position in response to completion of said cycle of movement and means for releasing said locking means in response to completion of a signal-actuating drive of said gear train mechanism by said motor, a manual actuator having means pivoting it at said aperture on an axis parallel to said wall for movement into and out of a home position, and means mechanically connecting said actuator and said operator for conjoint movement whereby said spring means also biases said actuator in its home position and said actuator is locked in its home position and against manual actuation until released by operation of said lock-releasing means.

59. A fire alarm signal station box comprising a casing having a relatively large substantially rectangular aperture in a vertical wall thereof and having adjacent an upper portion of the aperture an internally walled-in hand hole, a gear train mechanism including a driving motor and signal switch means actuatable by said mechanism and having therein a reversibly movable operator pivoted on an axis parallel to said wall for movement in a cycle of two strokes and spring means normally biasing and holding said operator in home position, actuating connections between said operator and said gear train mechanism and driving motor for actuating the latter to drive the gear train mechanism only after the completion by said operator of said cycle of movement and return of said operator to home position by said spring means, said actuating connections including means for locking said operator in home position in response to completion of said cycle of movement and means for releasing said locking means in response to completion of a signal-actuating drive of said gear train mechanism by said motor, a manual actuator comprising a substantially rectangular plate-like lever adapted to substantially close over said aperture with an upper end thereof partially overlying said hand hole when said plate-like lever is in closing relation to said aperture so that said upper end forms a handle portion for manual engagement, said plate-like lever having means at its lower end pivoting it at said aperture on a horizontal axis parallel to said wall for downward swinging movement of the lever out of, and upward swinging movement into, aperture-closing home position as said handle portion is moved away from or toward said hand hole, and means mechanically connecting said plate-like lever actuator and said operator for conjoint movement whereby said spring means also biases said actuator in its home position to position said handle portion in hand-hole overlying relation and both are locked in said home positions and against manual actuation until released by operation of said lock-releasing means.

60. A signal station box as claimed in claim 59 in which the portion of said plate-like lever that overlies said hand hole has an aperture therein and is provided with an inwardly projecting and downwardly and outwardly inclined baffle wall that extends from the bottom edge of the last-mentioned aperture and that enters said hand hole and normally forms a false bottom therefor to guide foreign matter there-along for discharge through said hand-aperture.

61. A fire-alarm signal station box comprising a casing part substantially open at its front and attachable to a support and having means for the entry thereinto of circuit conductors, an open frame having edge flanges and having means for securing it at the front of said casing part, a second casing part having means hingedly conecting it to said frame for closing said first casing part, said second casing part carrying electric signalling means on the inside thereof for connection to said conductors and that projects through said open frame and into said first casing part, said frame carrying a terminal block positioned out of the path of movement taken by said signalling means as said second casing part is swung relative to said frame into closing relation to said first casing part, said terminal block having connectors and said electric signalling means having flexible conductors leading therefrom and connected to said connectors, whereby said frame and second casing part and signalling means therein may be assembled as a unit to said first casing part by said securing means and said circuit conductors then connected to said terminal block connectors, and means for locking said second casing part against swinging out of closing relation to said first casing part.

62. A fire alarm signal station box comprising a casing part substantially open at its front and attachable to a support and having means for the entry thereinto of circuit conductors, an open frame having edge flanges and having means for securing it at the front of said casing part, a second casing part having means hingedly connecting it to said frame for closing said first casing part, said second casing part carrying electric signalling means on the inside thereof for connection to said conductors and that projects through said open frame and into said first casing part, a terminal block having a plurality of connectors to which said circuit conductors are connectible and said signalling means having a plurality of flexible conductors connected to said connectors, said terminal block having a length substantially proportional to the number of connectors required for said conductors and said frame having spaced terminal block supports provided with means for changing the length of spacing therebetween according to the length of said terminal block, and means for locking said second casing part against swinging out of closing relation to said first casing part.

63. A fire alarm signal station box as claimed in claim 29, in which said lever handle portion has an aperture therein overlying said hand hole, said handle portion of said lever being provided with an inwardly projecting downwardly and outwardly inclined wall member that extends from the bottom edge of the aperture in said handle portion and that enters said hand hole and normally forms a false bottom therefor to guide foreign matter along said false bottom for discharge through said handle-aperture.

64. A fire alarm signal station box comprising a casing having therein a gear train mechanism and signal switch means and an externally operable manual actuator in the form of a plate-like lever having means pivotally mounting it for movement in a cycle of two strokes and in directions toward and away from a wall of said casing, said gear train mechanism comprising a plurality of gears for controlling said switch means, a spring-driven shaft having a one-way drive connection with said plurality of gears and adapted to wind its spring when driven in opposite direction, a reversibly movable actuating member to drive said shaft in spring-winding direction and driven in reverse direction when the spring drives said shaft, a reversibly movable driver member having a reversible lost-motion driving connection with said actuating member to drive the latter in spring-winding direction on one stroke of movement and to permit it to return to starting position independently of said actuating member, spring means for returning said driver member to starting position, a reversible driving connection between said driver member and said manual actuator whereby the two operate in unison and conjointly move out of and return to starting position, a stop member rotatable with said gears, movable stop means coacting with said stop member to halt and release said gears, coacting control means for said movable stop means, one of which is responsive to the movement of said actuating member in spring-winding direction to condition said movable stop means for movement out of stopping relation to said stop member and operates to move said movable stop means into stopping relation to said stop member upon return drive of said actuating member in reverse direction and the other of which is responsive to movement of said driver member and operates to hold said movable stop means against movement in gear-releasing direction until said driver member and said external manual actuator have in unison completed a cycle of movement of one stroke in spring-winding direction and a return stroke to starting position, means responsive to return of said driver member to starting position for holding it and said manual actuator against movement out of starting position with means responsive to the subsequent actuation of said stop means in gear-stopping direction by the return drive of said actuating member in said reverse direction for releasing said driver member and manual actuator for movement out of said starting position thereof, and controllable means for rotationally setting said stop member relative to said gears to time the coaction therewith of said stop means in relation to the starting position of said driver member and its mechanically connected manual actuator.

65. A fire alarm signal station box comprising a gear train mechanism comprising a plurality of gears and having signal switch means with means operated by said gears for controlling said switch means, a stop member rotatable with said gears, a shaft with a driving spring and a one-way driving connection with said plurality of gears, an actuating member mounted for movement about an axis to drive said shaft in spring-winding direction and driven by the latter in reverse direction under the force of the spring, said actuating member having a laterally projecting stud, a reversibly movable operator coaxial with said actuating member and having a part engageable with said stud to drive said actuating member in spring-winding direction, spring means to bias said operator to starting position, stop means for coaction with said stop member and having means for controlling its engagement and disengagement relative to said stop member, said controlling means comprising movable means with which said stud coacts and responsive to movement of said actuating member in spring-winding direction to free said stop means for disengaging movement and to move it in engaging direction in response to completion of reverse movement of said actuating member together with cam means coacting with said movable means and responsive to movement of said operator to prevent disengaging actuation of said stop means until said operator returns to starting position with means responsive to disengaging actuation of said stop means to block movement of said operator out of starting position until said stop means is actuated in disengaging direction, and means supporting said stop member for rotation with said gears and providing a plurality of selectible locations therefor, said locations subtending a substantial angle whereby the position of said stop member relative to said gears in rotational direction may be selected and the timing of said blocking action in relation to the starting position of said operator determined.

66. A fire alarm signal station box comprising a casing part having a relatively large four-sided opening at its front whereby it is substantially open at its front, said casing part being attachable to a support and having means for the entry thereinto of circuit conductors, an open four-sided frame overlying said open front of said first casing part and having peripheral edge flanges defining a four-sided area commensurate with that of said four-sided opening and having means coacting with said edge flanges for securing it at the front of said casing part whereby access to the latter is gained through the opening defined by said four-sided frame, a second casing part having a relatively large four-sided opening at its rear whereby it is substantially open at its rear and having means hingedly connecting it to said frame for closing said first casing part when said second casing part and said frame are as a unit assembled to said first casing part by said securing means, a terminal block secured to and bridged across two sides of said frame and having connectors for connecting thereto said first-mentioned conductors, said second casing part carrying electric signalling means on the inside thereof with wiring connecting it to said connectors for connection to said conductors when the latter are connected to said connectors, said electric signalling means projecting through the opening in said open frame and past said terminal block and into said first casing part when said second casing part is in closing relation to said first casing part, and means for locking said second casing part against swinging out of closing relation to said first casing part.

67. A fire alarm signal station box comprising a casing part substantially open at its front and attachable to a support and having means for the entry thereinto of circuit conductors, an open frame having edge flanges and having means coacting with said edge flanges for securing it at the front of said casing part, a second casing part having means hingedly connecting it at its lower end to said frame to swing upwardly about a horizontal axis for closing said first casing part when said second casing part and said frame are as a unit assembled to said first casing part by said securing means, means coacting between said frame and said second casing part for limiting swinging of said casing part in downward direction to substantially ninety degrees whereby said second casing part, when swung to uncover said first casing part, assumes a substantially horizontal position, said second casing part carrying electric signalling means on the inside thereof for connection to said conductors comprising a gear train mechanism that has a driving motor and signal switch means with a housing thereover, said housing and mechanism therein projecting through said open frame and into said first casing part when the second casing part is in closing relation to the first casing part and having a manual actuator for said switch means and a manual actuator for said gear train mechanism, both actuators being accessible through the walls of said housing whereby they may be operated when said second casing part is swung into horizontal position, and means for locking said second casing part against swinging out of closing relation to said first casing part.

68. A fire alarm signal station box comprising a casing part having a relatively large opening at its front whereby it is substantially open at its front, said casing part being attachable to a support and having means for the entry thereinto of circuit conductors, an open peripherally continuous frame defining an opening overlying that of the open front of said casing part and having edge flanges and means for securing it at the front of said casing part, a second casing part having rearwardly extending wall portions to receive said frame therein and substantially envelop it laterally and having means hingedly conencting it to said frame to swing into and out of closing relation to said first casing part when said second casing part and said frame are as a unit assembled to said first casing part by said securing means, said second casing part carrying electric signalling means on the inside thereof for connection to said conductors comprising a gear train mechanism that has a driving motor and signal switch means with a housing thereover, said housing and mechanism therein projecting through the opening in said open frame and projecting through the frame and into said first casing part when the second casing part is in closing relation to the first casing part and having a manual actuator for said switch means and a manual actuator for said gear train mechanism, both actuators being accessible through the walls of said housing whereby they may be operated when said second casing part is swung out of closing position, a manual controller accessible from the exterior of said second casing part and having means supporting it for movement and having actuating connections with said electric signal means, and means for locking said casing part in closing position and against swinging out of closing relation to said first casing part under the stress of manual actuation of said exterior controller.

69. A fire alarm signal station box comprising a casing part substantially open at its front and attachable to a support and having means for the entry thereinto of conductors, an open frame having edge flanges and having means coacting with said edge flanges for securing it at the front of said casing part, a second casing part having means hingedly connecting it at its lower end to said frame to swing upwardly about a horizontal axis for closing said first casing part, said second casing part carrying electric signalling means on the inside thereof for connection to said conductors and that projects through said open frame and into said first casing part when the second casing part is swung into closing relation, means for limiting swinging movement of said second casing part in downward direction to substantially ninety degrees and comprising a pair of links pivotally connected together at their adjacent ends and means at their other ends pivotally connecting them respectively to said frame and to said second casing part at points spaced from the axis of hinged connection between the latter, one of said last-mentioned means comprising a pin and slot pivotal connection and an extension on the link coacting, in response to swinging movement toward closing position of said second casing part and in response to the lost motion provided by said pin and slot connection, to swing the link inwardly and prevent said pair of links from folding in a direction away from the axis of the hinged connection of said second casing part to said frame, and means for locking said second casing part against swinging out of closing relation to said first casing part.

70. A fire alarm signal station box comprising a casing part substantially open at its front and attachable to a support and having means for the entry thereinto of conductors, an open frame having edge flanges and having means coacting with said edge flanges for securing it at the front of said casing part, a second casing part having means hingedly connecting it to said frame for closing said first casing part, said second casing part carrying electric signalling means on the inside thereof for connection to said conductors and that projects through said open frame and into said first casing part, a manual actuator accessible externally of said second casing part for controlling actuation of said electric signalling means, said second casing part having means movably mounting said actuator for movement out of and into a home position, a rod of frangible material having means supporting it in exposed position on said second casing part and operatively related to said manual actuator, said actuator having a part engaging said frangible rod to break it in response to movement of said actuator out of home position, and means for locking said second casing part against swinging out of closing relation to said first casing part and against swinging movement under the stress of manual actuation of said manual actuator.

71. A fire alarm signal station box comprising a casing part substantially open at its front and attachable to a support and having means for the entry thereinto of conductors, an open frame having edge flanges and having means coacting with said edge flanges for securing it at the front of said casing part, a second casing part having means hingedly connecting it to said frame for closing said first casing part, said second casing part carrying electric signalling means on the inside thereof for connection to said conductors and that projects through said open frame and into said first casing part, a manual actuator accessible externally of said second casing part for controlling actuation of said electric signalling means, said second casing part having means movably mounting said actuator for movement out of and into a home position, a frangible member in the form of a rod of frangible material, said second casing part having socket means for supporting said rod with a portion thereof that is spaced from said socket means positioned in the path of actuating movement of a part of said actuator, said part having an inclined rod-engaging edge that exerts a wedging action on the rod to break it upon movement of said actuator out of home position, and means for locking said second casing part against swinging out of closing relation to said first casing part and against swinging movement under the stress of rod-breaking actuation of said manual actuator.

72. A fire alarm signal station box comprising a casing part substantially open at its front and attachable to a support and having means for the entry thereinto of conductors, an open frame having edge flanges and having means coacting with said edge flanges for securing it at the front of said casing part, a second casing part having means hingedly connecting it to said frame for closing said first casing part, said second casing part carrying electric signalling means on the inside thereof for connection to said conductors and that projects through said open frame and into said first casing part, a manual actuator accessible externally of said second casing part for controlling said electric signalling means, said second casing part having means movably supporting it for movement out of and into a home position, a rod of frangible material, said second casing part having means for holding said frangible member in exposed position on said second casing part and in the path of movement of a part of said actuator, said holding means comprising a holder having means mounting it from said second casing part movably thereby to facilitate holding engagement with said frangible rod and means accessible from the inside of said second casing part for controlling movement of said holder whereby said second casing part has to be swung into open position for assembly of a frangible rod member thereto, and means for locking said second casing part against swinging out of closing relation to said first casing part.

73. A fire alarm signal station box comprising a casing part having a back wall and peripheral side walls terminating in a large front opening the plane of which is substantially parallel to said back wall whereby said casing part is substantially open at its front, said casing part being attachable to a support and having means for the entry thereinto of circuit conductors, a peripherally continuous open frame of relatively small thickness overlying said casing part at its open front and having edge flanges and having screw means threaded into said casing part for securing it at the front of said casing part, said edge flanges coacting to limit the position of said frame in a direction toward and away from said plane, a second casing part having means hingedly connecting it to said frame for covering over said screw means and for closing said first casing part and having peripheral portions interfitting with said frame whereby one is peripherally receivable into the other, said second casing part carrying electric signalling means on the inside thereof for connection to said conductors and that projects through said open frame and into said first casing part, and means for locking said second casing part against swinging out of closing relation to said first casing part and out of covering relation to said screw means.

74. A fire alarm signal station box comprising a casing part substantially open at its front and attachable to a support and having means for the entry thereinto of conductors, an open frame having edge flanges and having means coacting with said edge flanges for securing it at the front of said casing part, a second casing part having means hingedly connecting it to said frame to swing about a horizontal axis for closing said first casing part when said frame is secured by said securing means, said second casing part carrying electric signalling means on the inside thereof for connection to said first-mentioned conductors and having an externally accessible manual actuator with means mounting it for reversible movement in directions transverse to said horizontal axis with operating connections through a wall of said second casing part for actuating said signalling means in response to actuation of said external actuator, said electric signalling means projecting through said open frame and into said first casing part when said second casing part is swung into closing position, and means for locking said second casing part against swinging out of closing relation to said first casing part and against movement when said manual actuator is manually moved.

75. A fire alarm signal station box comprising casing means having a back casing part attachable to a support and provided with means for entry thereinto of circuit conductors and having a front casing part, said casing means having therein a gear train mechanism and signal switch means actuated thereby and additional switch means with means supporting them therein independently of said back casing part, a manual actuator accessible at the front of said casing means with means associated with said front casing part for movably mounting said actuator for movement in a cycle of two strokes, there being actuating connections between said external actuator and said mechanism for actuating the latter only after the completion of said cycle of movement and means for actuating said additional switch means in response to actuation of said manual actuator less than said cycle of movement thereof, said casing means having therein a terminal block having a plurality of connectors which are connected by a plurality of conductors to said switch means, and a mounting member at the rear of said front casing part and hingedly connected thereto and forming a combined mounting for the front casing part and for said terminal block to form therewith a wired-up sub-unit independent of said back casing part, said member having means for securing said member to said back casing part, thereby to hingedly support said front casing part to close over or to uncover said back casing part, with a portion of said member projecting into the space enclosed by said two casing parts, and means securing said terminal block to said portion of said member and thereby locate it to be made accessible, for connection of said circuit conductors of said back casing part to said connectors, when said front casing part is swung into uncovering position.

76. A signal station box as claimed in claim 14 in which said edge flanges extend rearwardly from said frame for aligning and spacing the frame from said first casing part and in which said frame is provided with a terminal block bridged across said frame out of the path of movement of said signaling means through said frame, said terminal block having front and rear connectors for respectively connecting thereto said first-mentioned conductors and conductors leading from said signaling means and flexible conductors connected to said signaling means and leading therefrom to the region adjacent the axis of said hingedly connecting means and thence extending in back of said frame to said terminal block rear connectors to which they are respectively connected whereby, when said second casing part and said frame are as a unit assembled to said first casing part by said securing means and said second casing part thereupon swung out of closing relation to said first casing part, said front connectors are accessible for connection thereto of said first-mentioned conductors.

77. A fire alarm signal station box comprising a casing having signal switch means internally thereof and an externally accessible manual actuator therefor, a frangible member having two spaced supports carried by said casing to hold and position said frangible member, said actuator having means for breaking said frangible member upon movement of said actuator from a home position, said means being engageable with said frangible member intermediate of said spaced supports, and a switch having a movable operator having means for actuating it in one direction in response to movement of said manual actuator to break said frangible member and for actuating it in opposite direction in response to replacement of said frangible member by an unbroken member, said last-mentioned means comprising a movable member that is set and positioned by the unbroken member when the latter is positioned by said spaced supports and said actuator is in home position.

78. A fire alarm signal station box comprising a casing having signal switch means internally thereof and an externally accessible manual actuator therefor, a frangible member having two spaced supports carried by said casing to hold and position said frangible member, said actuator having means for breaking said frangible member upon movement of said actuator from a home position, said means being engageable with said frangible member intermediate of said spaced supports, and a switch having a movable operator having means in the form of a spring-biased element carried by said manual actuator which is engaged and held against its spring bias by said frangible member when said actuator is in home position, for actuating said movable operator in one direction in response to movement of said manual actuator to break said frangible member and for actuating it in opposite direction in response to replacement of said frangible member by an unbroken member.

79. A fire alarm signal station box comprising a casing having signal switch means internally thereof and an externally accessible manual actuator therefor having means mounting it for movement out of and back into a home position, a frangible member with two spaced supports carried by said casing for holding and positioning said frangible member, said actuator having a part that is moved toward and away from a portion of said frangible member intermediate of said supports according as said manual actuator moves out of or back into home position, said actuator having means for breaking said frangible member upon movement of said actuator out of home position, and a switch having a movable operator having means for actuating it in one direction in response to movement of said manual actuator out of home position and for actuating it in opposite direction in response to replacement of said frangible member by an unbroken member, said means comprising a movable element engaged and positioned by the unbroken member in response to positioning of the latter by said spaced supports, said element having means movably supporting it by said manual actuator part whereby it moves with the latter in response to movement of said manual actuator out of home position.

80. A fire alarm signal station box comprising a casing having signal switch means internally thereof and an externally accessible manual actuator therefor in the form of a plate-like lever pivotally movable out of and back into a home position, a frangible member and supporting means carried by said casing for holding and positioning said frangible member, said lever having means for breaking said frangible member upon movement of said actuator lever out of home position and having an aperture in which is a reversibly movable plunger element and which is juxtaposed to said frangible member when said lever is in home position whereby said frangible member holds said plunger element in retracted position relative to said aperture and said plunger element is freed for movement upon breaking of said frangible member, and a switch having a movable operator having means for actuating it in one direction in response to movement of said manual actuator out of home position or in response to breaking of said frangible member and for actuating it in opposite direction upon return of said actuator lever to home position and in response to replacement of said frangible member by an unbroken member, said last-mentioned means comprising a spring-biased arm having means mounting it in coacting relation to said operator and to said lever and said plunger element, said plunger element holding said spring-biased arm in one position against its spring bias when said lever is in home position and the plunger element is held retracted by an unbroken member of said supporting means and said spring-biased arm being movable out of its aforesaid position when said plunger element is freed, by breaking of said frangible member, for movement out of retracted position.

LEO L. VERKUIL.
JAMES E. RUSSO.

REFERENCES CITED

The following references are of record in the file of this patent:

UNITED STATES PATENTS

| Number | Name | Date |
|---|---|---|
| 1,051,946 | Burroughs | Feb. 4, 1913 |
| 1,124,799 | Pool | Jan. 12, 1915 |
| 1,182,833 | Brockway | May 9, 1916 |
| 1,194,931 | Avery | Aug. 15, 1916 |
| 1,205,319 | Beach et al. | Nov. 21, 1916 |
| 1,208,205 | Potter | Dec. 12, 1916 |
| 1,465,425 | Durbin | Aug. 21, 1923 |
| 1,530,658 | Faller | Mar. 24, 1925 |
| 1,588,496 | Reeve | June 15, 1926 |
| 1,697,140 | Reeve | Jan. 1, 1929 |
| 1,704,389 | Janson | Mar. 5, 1929 |
| 1,704,697 | Carnahan | Mar. 12, 1929 |
| 1,844,449 | Stewart et al. | Feb. 9, 1932 |
| 1,857,040 | Bulen | May 3, 1932 |
| 2,026,385 | Heyde | Dec. 31, 1935 |
| 2,356,989 | Getz et al. | Aug. 29, 1944 |